United States Patent
Kogiso et al.

(10) Patent No.: US 9,846,594 B2
(45) Date of Patent: Dec. 19, 2017

(54) WORKFLOW CONTROL APPARATUS AND METHOD THEREFOR

(71) Applicant: FUJITSU LIMITED, Kawasaki-shi, Kanagawa (JP)

(72) Inventors: Shoichi Kogiso, Nagoya (JP); Takamasa Ohashi, Toyoake (JP); Yusuke Kuchiwaki, Nagoya (JP); Masakazu Furukawa, Yoro (JP); Masahiro Fukuda, Nagoya (JP); Takashi Ikezaki, Yatomi (JP)

(73) Assignee: FUJITSU LIMITED, Kawasaki (JP)

( * ) Notice: Subject to any disclaimer, the term of this patent is extended or adjusted under 35 U.S.C. 154(b) by 794 days.

(21) Appl. No.: 14/222,729

(22) Filed: Mar. 24, 2014

(65) Prior Publication Data

US 2014/0297354 A1    Oct. 2, 2014

(30) Foreign Application Priority Data

Mar. 27, 2013    (JP) ................................ 2013-066846

(51) Int. Cl.
| | |
|---|---|
| *G06F 9/48* | (2006.01) |
| *G06F 9/46* | (2006.01) |
| *G06Q 10/06* | (2012.01) |
| *G06F 9/50* | (2006.01) |

(52) U.S. Cl.
CPC .............. *G06F 9/48* (2013.01); *G06F 9/46* (2013.01); *G06Q 10/06* (2013.01); *G06Q 10/0631* (2013.01); *G06Q 10/0633* (2013.01); *G06Q 10/06311* (2013.01); *G06Q 10/06316* (2013.01); *G06F 9/50* (2013.01)

(58) Field of Classification Search
None
See application file for complete search history.

(56) References Cited

U.S. PATENT DOCUMENTS

| | | |
|---|---|---|
| 2009/0323096 A1 | 12/2009 | Oshima |
| 2010/0070422 A1 | 3/2010 | Kikuchi et al. |
| 2012/0117570 A1 | 5/2012 | Ozaki et al. |

FOREIGN PATENT DOCUMENTS

| | | |
|---|---|---|
| JP | 2005-31892 A | 2/2005 |
| JP | 2009-251927 | 10/2009 |
| JP | 2010-009243 | 1/2010 |
| JP | 2012-99030 A | 5/2012 |
| WO | 2008/152910 A1 | 12/2008 |

OTHER PUBLICATIONS

Japanese Office Action dated Sep. 6, 2016 for corresponding Japanese Patent Application No. 2013-066846, with Partial English Translation, 8 pages.

*Primary Examiner* — Qing Wu
(74) *Attorney, Agent, or Firm* — Fujisu Patent Center

(57) ABSTRACT

A control unit of a workflow control apparatus identifies, among tasks included in a plurality of workflows, tasks using the same resource based on workflow definition information, and determines the execution sequence of the identified tasks based on the content of each of the identified tasks defined in the workflow definition information. The control unit identifies, among the identified tasks, one or more tasks whose execution is omissible based on the content of each of the identified tasks and the execution sequence of the identified tasks.

18 Claims, 55 Drawing Sheets

| NAME OF EXCLUSIVE SECTION HAVING ACQUIRED EXCLUSIVE RIGHT | NAME OF EXCLUSIVE SECTION ACQUIRING EXCLUSIVE RIGHT | | | | |
|---|---|---|---|---|---|
| | A | B | C | A+X | A+Y |
| A | ○ | × | × | ○ | ○ |
| B | × | ○ | × | × | × |
| C | × | × | ○ | × | × |
| A+X | ○ | × | × | ○ | × |
| A+Y | ○ | × | × | × | ○ |

○:CONTENTION　×:NO CONTENTION

FIG. 8

FIG. 14
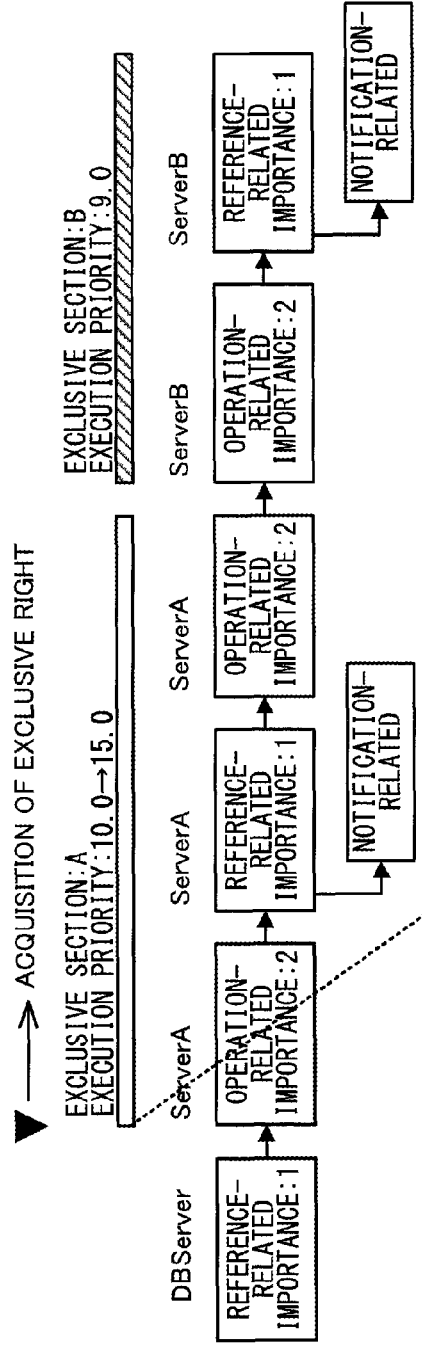
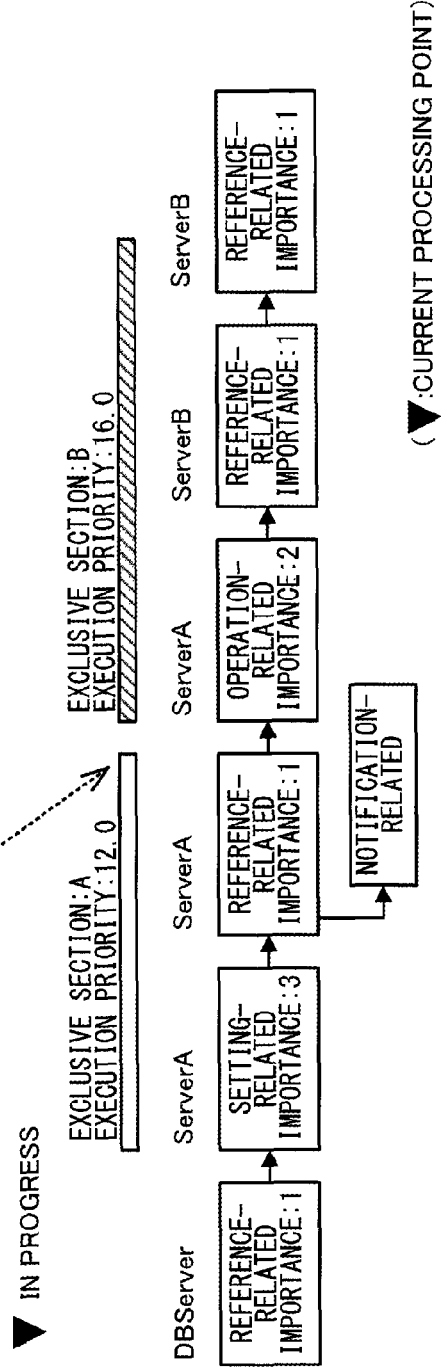

OPTIMIZATION CONTROL WORKFLOW LIST

| EXCLUSIVE RESOURCE NAME | INSTANCE NAME | DATE AND TIME OF EXECUTION | STATUS |
|---|---|---|---|
| EXCLUSIVE RESOURCE X | INSTANCE 1 | ... | COMPLETED |
| | INSTANCE 2 | ... | RUNNING |
| EXCLUSIVE RESOURCE Y | INSTANCE 1 | ... | COMPLETED |
| | INSTANCE 2 | ... | COMPLETED |
| EXCLUSIVE RESOURCE Z | INSTANCE 1 | ... | RUNNING |

131 WORKFLOW MANAGEMENT TABLE

| WORKFLOW NO. | COMPO-NENT NO. | OPERATION COMPONENT NAME | OPERATION TARGET | OPERATION SERVICE OR RESOURCE | ... | OUTPUT | ... | NEXT COMPO-NENT NO. |
|---|---|---|---|---|---|---|---|---|
| 1 | 0 | START | – | – | ... | – | ... | 1 |
| | 1 | ACQUISITION OF OPERATION TARGET OR RESOURCE | – | – | ... | VARIABLE 2 | ... | 2 |
| | 2 | SERVICE STOP | VARIABLE 1 | VARIABLE 2 | ... | VARIABLE 3 | ... | 3 |
| | 3 | CONFIRMATION OF SERVICE STOP | VARIABLE 1 | VARIABLE 2 | ... | VARIABLE 3 | ... | 4, 5 |
| | 4 | SERVER STOP | VARIABLE 1 | – | ... | – | ... | 6 |
| | 5 | MAIL TRANSMISSION (ERROR NOTIFICATION) | – | – | ... | – | ... | 99 |
| | 6 | SERVER START-UP | VARIABLE 1 | – | ... | – | ... | 7 |
| | 7 | CONFIRMATION OF SERVER START-UP | VARIABLE 1 | – | ... | – | ... | 8, 9 |
| | 8 | SERVICE START-UP | VARIABLE 1 | VARIABLE 2 | ... | VARIABLE 3 | ... | 10 |
| | 9 | MAIL TRANSMISSION (ERROR NOTIFICATION) | – | – | ... | – | ... | 99 |
| | 10 | CONFIRMATION OF SERVICE START-UP | VARIABLE 1 | VARIABLE 2 | ... | VARIABLE 3 | ... | 11, 99 |
| | 11 | MAIL TRANSMISSION (ERROR NOTIFICATION) | – | – | ... | – | ... | 99 |
| | 99 | END | – | – | ... | – | ... | – |
| ... | | ... | ... | ... | ... | ... | ... | ... |

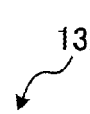

132 OPERATION COMPONENT DEFINITION TABLE

| OPERATION COMPONENT NAME | COMPONENT TYPE | OPERATION/ CONFIRMATION TARGET | OPERATIONAL IMPORTANCE |
|---|---|---|---|
| SERVER START-UP | OPERATION-RELATED | SERVER | 2 (MEDIUM) |
| CONFIRMATION OF SERVER START-UP | CONFIRMATION-RELATED | SERVER | 1 (LOW) |
| SERVER STOP | OPERATION-RELATED | SERVER | 2 (MEDIUM) |
| CONFIRMATION OF SERVER STOP | CONFIRMATION-RELATED | SERVER | 1 (LOW) |
| SERVICE START-UP | OPERATION-RELATED | SERVICE | 2 (MEDIUM) |
| CONFIRMATION OF SERVICE START-UP | CONFIRMATION-RELATED | SERVICE | 1 (LOW) |
| MAIL TRANSMISSION | NOTIFICATION-RELATED | - | 1 (LOW) |
| SOFTWARE INSTALLATION | SETTING-RELATED | SERVICE | 3 (HIGH) |
| ... | ... | ... | ... |

FIG. 30

134 INSTANCE MANAGEMENT TABLE

| INSTANCE NO. | WORK-FLOW NO. | COMPONENT NO. (CURRENTLY BE-ING EXECUTED) | HOST NAME | SERVICE NAME | USER ID | INITIATION METHOD COEFFICIENT | EXCLUSIVE SECTION NO. | SCHEDULED TIME OF COMPLETION | ... |
|---|---|---|---|---|---|---|---|---|---|
| 1 | 1 | 5 | VARIABLE 1 | VARIABLE 2 | USER 2 | 1 | 1 | 20:10 | ... |
| 1 | 1 | 5 | VARIABLE 1 | | USER 2 | 2 | 2 | 20:10 | ... |
| 2 | 1 | 1 | VARIABLE 1 | VARIABLE 2 | USER 2 | 3 | 3 | 20:12 | ... |
| 2 | 1 | 1 | VARIABLE 1 | | USER 2 | 1 | 4 | 20:12 | ... |
| 11 | 2 | 1 | VARIABLE 1 | | USER 1 | 2 | | 20:15 | ... |
| ... | ... | ... | ... | ... | ... | ... | ... | ... | ... |

FIG. 32

135 EXCLUSIVE INFORMATION MANAGEMENT TABLE

| EXCLUSIVE SECTION NO. | COMPONENT NO. (LOCK START) | COMPONENT NO. (LOCK RELEASE) | EXECUTION PRIORITY | OPERATIONAL URGENCY |
|---|---|---|---|---|
| 1 | 1 | 5,9,10,11 | 2 | 1 |
| 2 | 4 | 8 | 2 | 1 |
| 3 | 1 | 5,9,10,11 | 2 | 1 |
| 4 | 4 | 8 | 2 | 1 |
| ... | ... | ... | ... | ... |

FIG. 33

136 EXCLUSIVE RIGHT ACQUISITION HISTORY TABLE

| INSTANCE NO. | WORKFLOW NO. | EXCLUSIVE SECTION NO. | START-WAITING TIME | START TIME | COMPLETION TIME | ... |
|---|---|---|---|---|---|---|
| 1 | 1 | 1 | 5:00 | 20:10 | | ... |
| 2 | 2 | 4 | 0 | 20:03 | | ... |
| 3 | 3 | 1 | 0 | 20:00 | 20:10 | ... |
| 3 | 3 | 2 | 10:00 | | | ... |
| ... | ... | ... | ... | ... | ... | ... |

FIG. 34

137 USER COEFFICIENT TABLE

| USER ID | USER COEFFICIENT | ... |
|---|---|---|
| USER 1 | hostA | ... |
| USER 2 | serviceA | ... |

FIG. 35

138 INITIATION METHOD COEFFICIENT TABLE

| INITIATION METHOD | INITIATION METHOD COEFFICIENT | ... |
|---|---|---|
| MANUAL INITIATION | 2 | ... |
| SCHEDULED INITIATION AT SPECIFIED TIME | 1 | ... |
| INITIATION WITH NOTICE FROM MONITORING SYSTEM | 3 | ... |

FIG. 36

140a OPTIMIZATION TARGET COMPONENT DEFINITION TABLE

| OPERATION COMPONENT NAME | OPTION 1 | OPTION 2 | OPTION 3 | OPTION 4 | OPTION 5 | OPTION 6 | ... |
|---|---|---|---|---|---|---|---|
| SERVICE START-UP | hostname | service | ostype | username | execusername | execpassword | ... |
| SERVICE STOP | hostname | service | ostype | username | execusername | execpassword | ... |
| WORK UNIT START-UP | hostname | wuname | operationtype | systemname | mwtype | mwinstallpath | ... |
| WORK UNIT STOP | hostname | wuname | operationtype | systemname | mwtype | mwinstallpath | ... |
| ... | ... | ... | ... | ... | ... | ... | |

FIG. 38

OPTIMIZATION TARGET COMPONENT DEFINITION TABLE 140b

| Go | | Back | |
|---|---|---|---|
| OPERATION COMPONENT | OPTION | OPERATION COMPONENT | OPTION |
| SERVICE START-UP | hostname | SERVICE STOP | hostname |
| | service | | service |
| | ostype | | ostype |
| | username | | username |
| | password | | password |
| | execusername | | execusername |
| | exepassword | | exepassword |
| WORK UNIT START-UP | hostname | WORK UNIT STOP | hostname |
| | wuname | | wuname |
| | oparationtype | | oparationtype |
| | systemname | | systemname |
| | mwtype | | mwtype |
| | mwinstallpath | | mwinstallpath |
| | ostype | | ostype |
| | usename | | usename |
| | password | | password |
| | execusername | | execusername |
| | exepassword | | exepassword |
| ... | ... | ... | ... |

141 OPTIMIZATION CONTROL WORKFLOW MANAGEMENT TABLE

| OPTIMIZATION CONTROL WORKFLOW NO. | COMPO-NENT NO. | OPERATION COMPONENT | WORKFLOW NO. | OMISSION FLAG | EXECUTION WAIT | NEXT COMPONENT NO. | NEXT COMPONENT NO. AFTER OMISSION |
|---|---|---|---|---|---|---|---|
| 1 | 0 | START | - | - | - | 1 | 1 |
| | 1 | SERVICE STOP | 1 | OFF | - | 2 | 2 |
| | 2 | COMMAND EXECUTION | 1 | OFF | - | 3 | 5 |
| | 3 | SERVICE START-UP | 1 | ON1 | - | 4 | 5 |
| | 4 | SERVICE STOP | 2 | ON1 | 6 | 5 | 5 |
| | 5 | FILE COPY | 2 | OFF | - | 6 | 6 |
| | 6 | SERVICE START-UP | 2 | OFF | - | 7 | 99 |
| | 7 | SERVICE START-UP | 3 | ON2 | - | 99 | 99 |
| | 99 | END | - | - | - | - | - |
| 2 | 0 | START | - | - | - | 1 | 1 |
| | 1 | SERVICE STOP | 5 | OFF | - | 2 | 2 |
| | 2 | CONFIRMATION OF SERVICE STOP | 5 | OFF | - | 3 | 5 |
| | 3 | SERVER STOP | 5 | ON1 | - | 4 | 5 |
| | 4 | SERVER START-UP | 8 | ON1 | - | 5 | 6 |
| | 5 | CONFIRMATION OF SERVER START-UP | 8 | OFF | - | 6 | 7 |
| | 6 | SERVICE START-UP | 8 | OFF | - | 7 | 99 |
| | 7 | CONFIRMATION OF SERVICE START-UP | 8 | OFF | - | 99 | 99 |
| | 8 | END | - | - | - | - | - |
| ... | ... | ... | ... | ... | ... | ... | ... |

142 EXECUTION RESULT MANAGEMENT TABLE

| OPERATION COMPONENT | OUTPUT INFORMATION | DEFAULT VALUE | ACTUAL EXECUTION RESULT |
|---|---|---|---|
| SERVICE START-UP | message | "The operation component was successful." | "The operation component was successful." |
| | returnCode | 0 | 0 |
| SERVICE STOP | message | "The operation component was successful." | — |
| | returnCode | 0 | — |
| SERVER START-UP | message | "The operation component was successful." | "The operation component was successful." |
| | returnCode | 0 | 0 |
| | server_start_result | "hostname", Return_code, "Output", "Message", "xxxxx", 0, "Success" | "hostname", Return_code, "Output", "Message", "xxxxx", 0, "Success" |
| ... | ... | ... | ... |

FIG. 41

WORKFLOW CONTROL APPARATUS AND METHOD THEREFOR

CROSS-REFERENCE TO RELATED APPLICATION

This application is based upon and claims the benefit of priority of the prior Japanese Patent Application No. 2013-066846, filed on Mar. 27, 2013, the entire contents of which are incorporated herein by reference.

FIELD

The embodiments discussed herein are related to a workflow control apparatus and a method therefor.

BACKGROUND

A business system is composed of many resources including a number of apparatuses, such as servers, storages, and network equipment; and programs, such as operating systems (OS), middleware, and applications installed on the apparatuses. In a situation where a plurality of such business systems are in operation, a data center carries out operational work, such as monitoring and maintenance, of the business systems.

In recent years, Runbook Automation (RBA) has attracted attention as a technology for advancing operations automation by expressing operational work of business systems in workflows. RBA is expected to have various effects including reduction in operation load with simple tasks, reduction of human errors, and reduction in operational costs.

As for technology related to workflows, there is provided, for example, a workflow system for acquiring, from connected devices, information of valid combinations of a plurality of functions and allowing a user to edit a workflow based on the information.

Japanese Laid-open Patent Publication No. 2010-009243

Workflow designers design individual workflows trying not to include unnecessary tasks. However, it is not easy for the designers to design each workflow by considering relationships of tasks among a plurality of workflows. Therefore, in a situation where a plurality of workflows are executed, omissible and unnecessary tasks may be executed. The execution of unnecessary tasks leads to problems such as a prolonged execution time for the entire process and an increase in the network load.

SUMMARY

According to one embodiment, there is provided a computer-readable storage medium storing therein a computer program. The computer program causes a computer to perform a procedure including identifying, among tasks included in a plurality of workflows individually including one or more tasks using a resource, a plurality of tasks using the resource based on workflow definition information that defines content of each of the tasks included in the plurality of workflows; determining an execution sequence of the identified tasks based on the content of each of the identified tasks, defined in the workflow definition information; and identifying, among the identified tasks, one or more tasks whose execution is omissible based on the content of each of the identified tasks and the execution sequence.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates a lock contention relationship of the exclusive sections;

FIG. 14 is a second part illustrating the example of acquisition of an exclusive right (execution right) by a workflow in a case where there is a change in execution priority during execution of workflows;

FIG. 27 illustrates a display example of an optimization control workflow list;

FIG. 29 illustrates an example of a workflow management table;

FIG. 30 illustrates an example of an operation component definition table;

FIG. 32 illustrates an example of an instance management table;

FIG. 33 illustrates an example of an exclusive information management table;

FIG. 34 illustrates an example of an exclusive right acquisition history table;

FIG. 35 illustrates an example of a user coefficient table;

FIG. 36 illustrates an example of an initiation method coefficient table;

FIG. 38 illustrates an example of a first optimization target component definition table;

FIG. 39 illustrates an example of a second optimization target component definition table;

FIG. 40 illustrates an example of an optimization control workflow management table;

FIG. 41 illustrates an example of an execution result management table;

DESCRIPTION OF EMBODIMENTS

Figure 1:
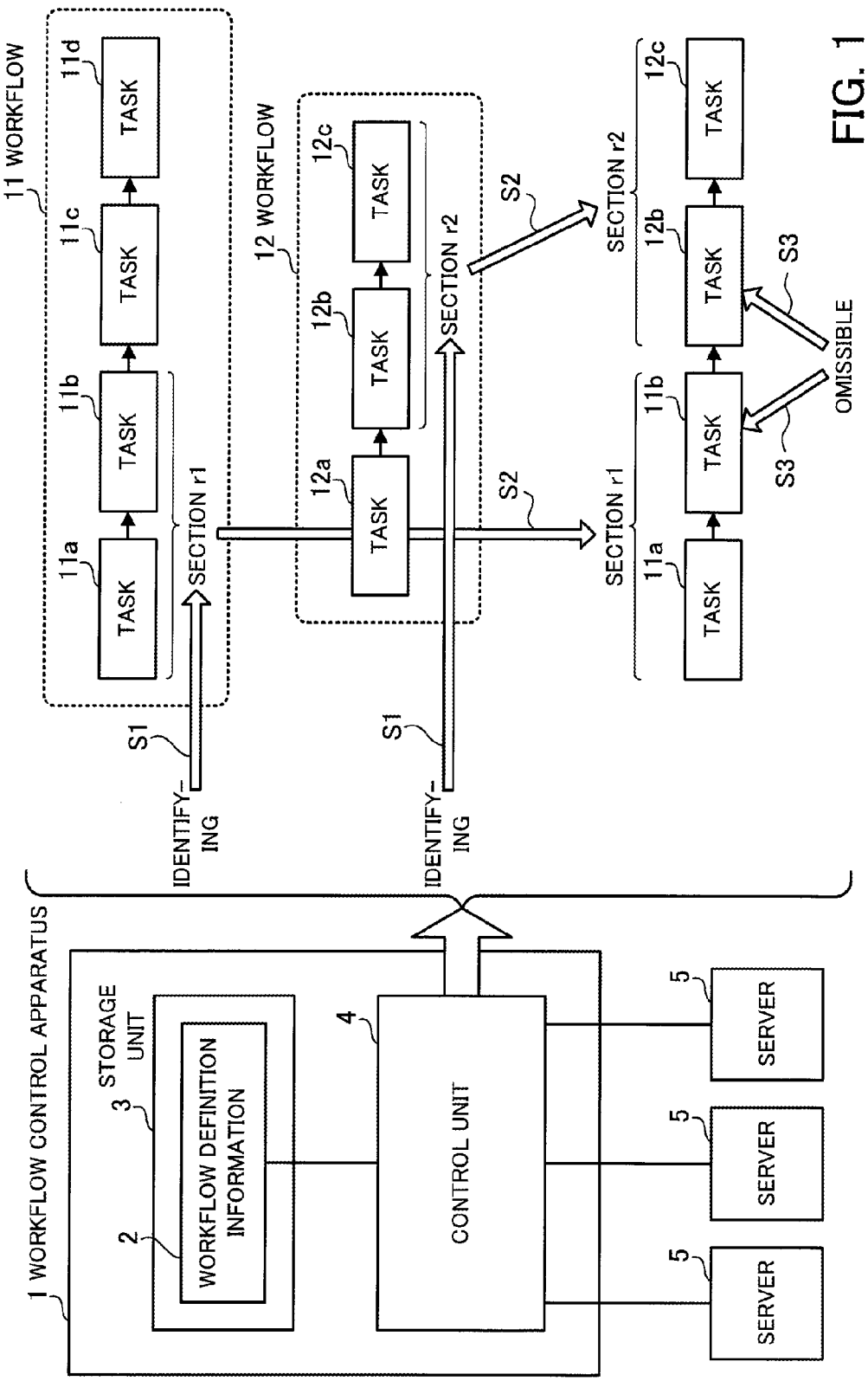
FIG. 1 illustrates a configuration and processing example of a workflow control apparatus according to a first embodiment.

Several embodiments will be described below with reference to the accompanying drawings, wherein like reference numerals refer to like elements throughout.

(a) First Embodiment

FIG. 1 illustrates a configuration and processing example of a workflow control apparatus according to a first embodiment. A workflow control apparatus 1 is an apparatus for controlling execution of a plurality of workflows, and includes a storage unit 3 storing therein workflow definition information 2; and a control unit 4.

In the workflow definition information 2, the content of tasks included in a plurality of individual workflows is defined. Each workflow includes one or more tasks. Each task included in a workflow is for carrying out some sort of operation on a resource, for example, monitoring and maintenance of the resource. The term 'resource' here means, for example, an external apparatus of the workflow control apparatus 1 or a program to be executed by the external apparatus. According to the example of FIG. 1, servers 5 are illustrated as an example of such external apparatuses. A plurality of workflows may individually include tasks using the same resource.

Based on the workflow definition information 2, the control unit 4 identifies, among the tasks included in the workflows, a plurality of tasks using the same resource. Then, based on the content of each of the identified tasks, defined in the workflow definition information 2, the control unit 4 determines an execution sequence of the tasks. Subsequently, based on the content of each of the identified tasks and the determined execution sequence of the tasks, the control unit 4 identifies one or more tasks whose execution is omissible among the tasks. In this manner, the control unit 4 is able to identify tasks whose execution is omissible among a plurality of workflows.

Workflows 11 and 12 are illustrated on the right side of FIG. 1. Using the example of the workflows 11 and 12, the following explains an example of processing performed by the control unit 4. The workflow includes tasks 11a to 11d, and the workflow 12 includes tasks 12a to 12c. The control unit 4 identifies, among the tasks included in the workflows 11 and 12, tasks using resource R, for example (step S1). Assume that, in the workflow 11, the tasks 11a and 11b are identified as tasks using resource R. In the following description, a section in which the tasks 11a and 11b are sequentially executed is referred to as 'section r1'. Assume on the other hand that, in the workflow 12, the tasks 12b and 12c are identified as tasks using resource R. A section in which the tasks 12b and 12c are sequentially executed is referred to as 'section r2'.

Next, the control unit 4 determines an execution sequence of the tasks 11a, 11b, 12b, and 12c based on the content of each of the tasks 11a, 11b, 12b, and 12c, which content is defined in the workflow definition information 2 (step S2). Assume here that the sequence is determined as the tasks 11a, 11b, 12b, and 12c in the stated order. Note that the determination of the execution sequence is based on calculation, for example, of execution priority of the sections r1 and r2.

Subsequently, based on the content of each of the tasks 11a, 11b, 12b, and 12c and the determined execution sequence of the tasks 11a, 11b, 12b, and 12c, the control unit 4 identifies, among the tasks 11a, 11b, 12b, and 12c, tasks whose execution is omissible (step S3). Assume here that the execution of the tasks 11b and 12b is determined to be omissible. Note that when subsequently the time to execute each of the tasks 11b and 12b comes, the control unit 4 is able to skip the tasks 11b and 12b and execute the task 12c.

According to the above-described process, focusing on the content of tasks using the same resource facilitates analysis and comparison of the content of tasks, which in turn facilitates identifying omissible tasks and also improves the accuracy of the identification. For example, by identifying tasks using the same resource, it is possible to easily identify, among the tasks, tasks whose content is the same and tasks having contents opposite to each other.

In addition, focusing on the execution sequence determined based on the content of tasks using the same resource enables appropriate determination on selecting tasks whose content is compared to each other in order to identify omissible tasks. For example, because a plurality of tasks using the same resource are not executed concurrently in time, the execution sequence of the individual tasks is clearly determined in time series. For example, in the case where one or both of two consecutive tasks are omissible, it is possible to appropriately determine these two consecutive tasks.

As for sections (for example, the sections r1 and r2 of FIG. 1) included in individual workflows, in which sections tasks using the same resource are executed, the execution is preferably carried out for each of the sections in a mutually exclusive manner. This enables the consistency of the content and results of the tasks to be maintained, and also improves the processing efficiency.

According to the first embodiment, the workflow control apparatus 1 identifies omissible tasks by focusing on tasks using the same resource, to thereby determine an execution sequence not based on individual tasks, but based on individual sections executed in a mutually exclusive manner. As a result, it is possible to determine omissible tasks by comparing the content of appropriate tasks. In the case of the workflows 11 and 12 of FIG. 1, for example, the comparison is made between the sections r1 and r2, which thereby limits pairs of tasks to be compared to two pairs of the tasks 11a and 12c and the tasks 11b and 12b. In addition, it is possible to reduce the likelihood of losing the processing consistency when the execution of tasks determined to be omissible is skipped.

(b) Second Embodiment

Figure 2:
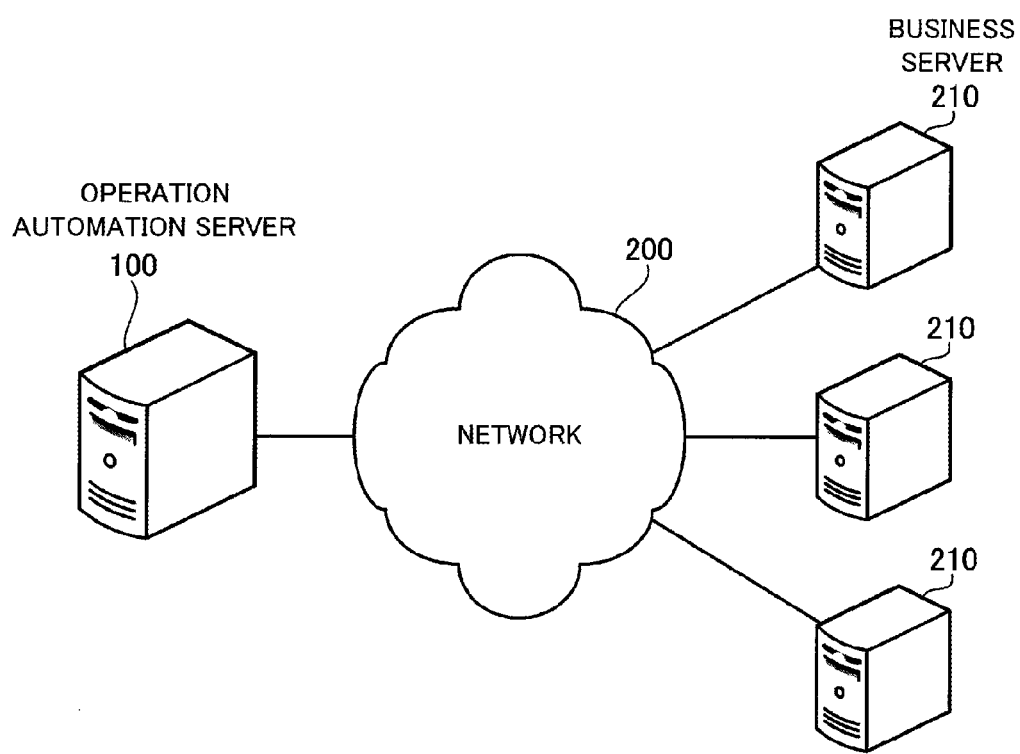
FIG. 2 illustrates a configuration example of an operational system according to a second embodiment.

FIG. 2 illustrates a configuration example of an operational system according to a second embodiment. The operational system of FIG. 2 includes an operation automation server 100 and one or more business servers 210. The operation automation server 100 and the business servers 210 are connected to each other via a network 200. The business servers 210 carry out various types of business processes. The operation automation server 100 manages operational work, such as monitoring and maintenance, of the business servers 210 by automating the operational work. Using RBA, the operation automation server 100 manages operations of the business servers 210 according to workflows describing operational work procedures of the business servers 210.

Figure 3:
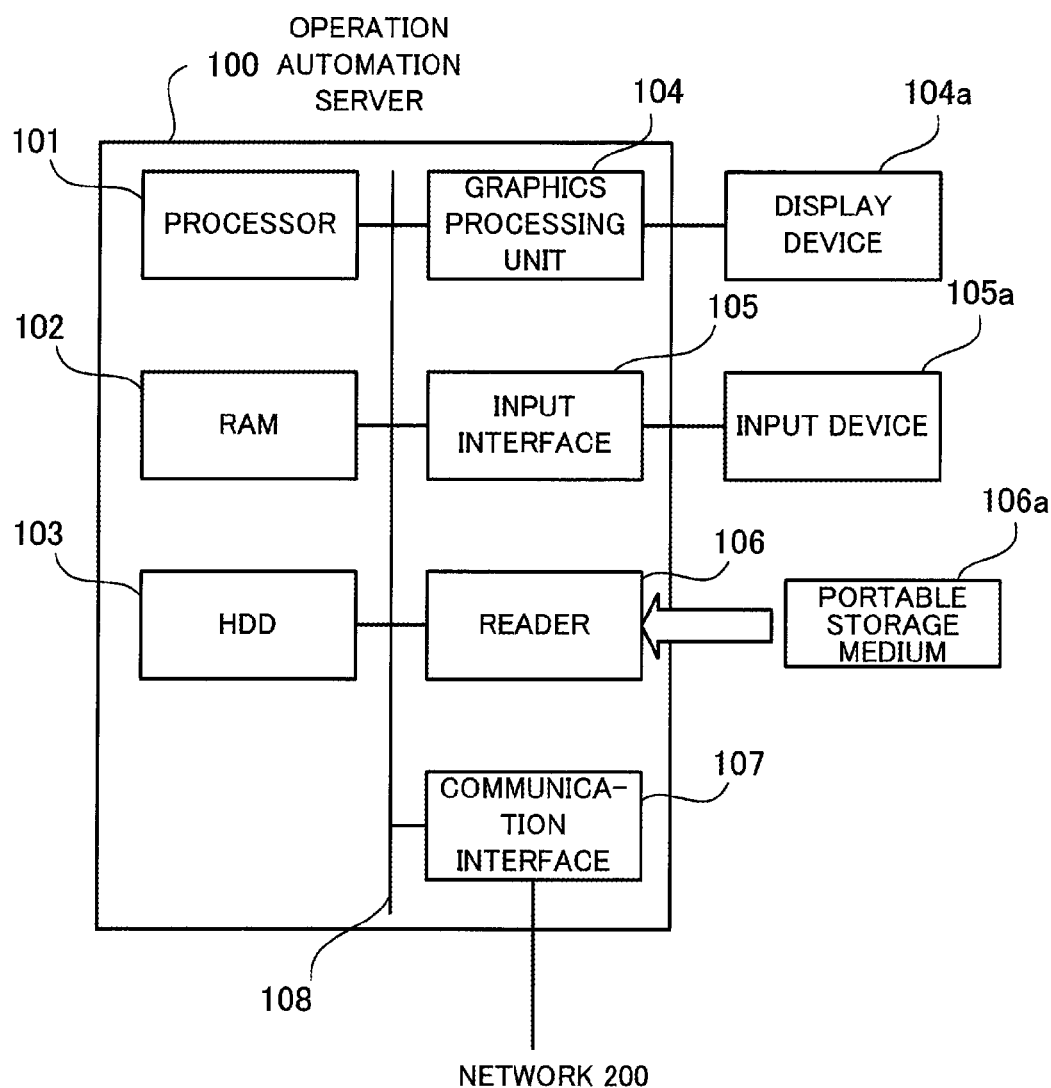
FIG. 3 illustrates an example of a hardware configuration of an operation automation server.

FIG. 3 illustrates an example of a hardware configuration of an operation automation server. The operation automation server 100 is implemented, for example, as a computer of FIG. 3. Overall control of the operation automation server 100 is exercised by a processor 101. To the processor 101, a random access memory (RAM) 102 and a plurality of peripherals are connected via a bus 108. The processor 101 may be a multi-processor. The processor 101 is, for example, a central processing unit (CPU), a micro processing unit (MPU), a digital signal processor (DSP), an application specific integrated circuit (ASIC), or a programmable logic device (PLD). Alternatively, the processor 101 may be a combination of two or more of these devices.

The RAM 102 is used as a main storage device of the operation automation server 100. The RAM 102 temporarily stores therein at least part of an OS program and application programs to be executed by the processor 101. The RAM 102 also stores therein various types of data to be used by the processor 101 for its processing. The peripherals connected to the bus 108 include a hard disk drive (HDD) 103, a graphics processing unit 104, an input interface 105, a reader 106, and a communication interface 107.

The HDD 103 is used as a secondary storage device of the operation automation server 100. The HDD 103 stores therein the OS program, application programs, and various types of data. Note that, as a secondary device, a different type of non-volatile storage device such as a solid state drive (SSD) may be used in place of the HDD 103.

To the graphics processing unit 104, a display device 104a is connected. According to an instruction from the processor 101, the graphics processing unit 104 displays an image on a screen of the display device 104a. A cathode ray tube (CRT) display or a liquid crystal display, for example, may be used as the display device 104a.

To the input interface 105, an input device 105a is connected. The input interface 105 transmits signals output from the input device 105a to the processor 101. The input device 105a is, for example, a keyboard or a pointing device. Examples of the pointing device include a mouse, a touch panel, a tablet, a touch-pad, and a track ball.

On the reader 106, a portable storage medium 106a is loaded. The reader 106 reads data recorded on the portable storage medium 106a and transmits the read data to the processor 101. The portable storage medium 106a may be an optical disk, a magneto optical disk, or a semiconductor memory, for example.

Via the network 200, the communication interface 107 transmits and receives data to and from different apparatuses such as the business servers 210.

The hardware configuration described above achieves processing functions of the operation automation server 100. Note that the business servers 210 of FIG. 2 and the workflow control apparatus 1 of FIG. 1 may also be individually implemented as a computer with the hardware of FIG. 3.

Figure 4:
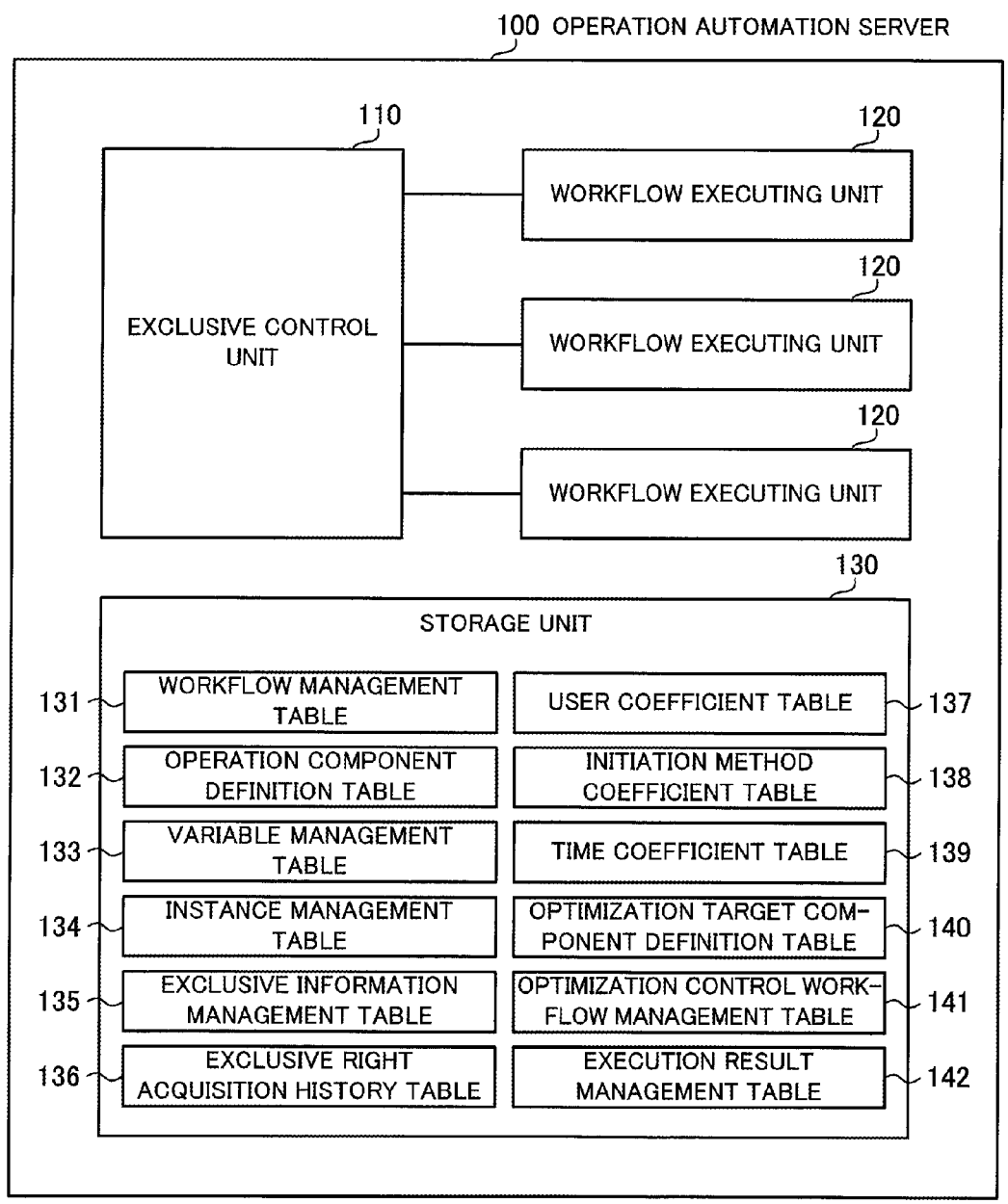
FIG. 4 is a block diagram illustrating a configuration example of processing functions of the operation automation server.

FIG. 4 is a block diagram illustrating a configuration example of processing functions of an operation automation server. The operation automation server 100 includes an exclusive control unit 110 and workflow executing units 120. Processes of the exclusive control unit 110 and the workflow executing units 120 are implemented, for example, by execution of predetermined programs by the processor 101 of the operation automation server 100.

The exclusive control unit 110 manages the execution of workflows. The term 'exclusive section' in this specification refers to a predetermined section of a workflow, in which exclusive control is exercised. The term 'exclusive control' refers to control exercised in the case where a plurality of workflows are running at the same time and contention would take place if the workflows use a common resource at the same time. The exclusive control allows only one workflow to run at a time and puts other workflows into a process wait state, to thereby avoid the contention for the resource. The exclusive control unit 110 dynamically determines exclusive sections during the execution of the workflows. Once determining the exclusive sections, the exclusive control unit 110 controls an execution sequence of the workflows according to anticipated operation priority. In addition, the exclusive control unit 110 removes redundant operations to thereby optimize the operation procedure.

The workflow executing units 120 execute workflows under the control of the exclusive control unit 110. The workflow executing units 120 are provided in one-to-one correspondence with workflows. That is, in the case where a plurality of workflows are executed, there are provided a plurality of workflow executing units 120. Note in the following that when simply referred to as 'the workflow executing unit 120', it means one of the workflow executing units 120, associated with a workflow concerned.

The operation automation server 100 also includes a storage unit 130 for storing various types of information used for processes of the exclusive control unit 110 and the workflow executing units 120. The storage unit 130 stores therein the following tables: a workflow management table 131, an operation component definition table 132, a variable management table 133, an instance management table 134, an exclusive information management table 135, an exclusive right acquisition history table 136, a user coefficient table 137, an initiation method coefficient table 138, a time coefficient table 139, an optimization target component definition table 140, an optimization control workflow management table 141, and an execution result management table 142.

The workflow management table 131 stores therein information of operation components included in individual workflows. The operation component definition table 132 stores therein definition information of the operation components.

The variable management table 133 stores therein variable names and values used in instances. The instance management table 134 stores therein information managed for each of the instances.

The exclusive information management table 135 stores therein information of exclusive sections. The exclusive right acquisition history table 136 stores therein history information regarding exclusive right (execution right) acquisition of the exclusive sections.

The user coefficient table 137 stores therein user coefficients for individual users. The initiation method coefficient table 138 stores therein initiation method coefficients for individual workflow initiation methods. The time coefficient table 139 stores therein time coefficients for individual remaining time periods until an operation is completed.

The optimization target component definition table 140 stores therein information of operation components targeted for optimization (that is, targeted for execution omission). The optimization control workflow management table 141 stores therein information of optimization control workflows each assembled for a different exclusive resource. The execution result management table 142 stores therein information regarding execution results for the operation components targeted for optimization.

Next described in detail are processes carried out by the operation automation server 100. First, 'dynamic exclusive control during execution of workflows' that is a basic process of the operation automation server 100 is described, which is then followed by a description of 'operation procedure optimization control by removing redundant operations'.

<Dynamic Exclusive Control during Execution of Workflows>

During the execution of a plurality of workflows, the operation automation server 100 dynamically determines appropriate exclusive sections according to the progress of each workflow. When a workflow starts running, the exclusive control unit 110 provisionally determines exclusive sections based on types of operation components included in the workflow and resources (operation targets and variables) to be used by the operation components. Based on the provisionally determined exclusive sections, the exclusive control unit 110 dynamically determines exclusive sections when the workflow is running in view of the progress of the execution of other workflows and their exclusive control situation. Here, the term 'operation components' refers to scripts directed to the business servers 210 so as to cause the business servers 210 to automatically execute individual tasks included in workflows.

In addition, when determining exclusive sections, the exclusive control unit 110 takes into account a workflow having acquired an exclusive right, information of scheduled acquisition of an exclusive right by other workflows having yet to acquire the exclusive right, and execution priority, and thereby exercises exclusive control based on a prediction. Therefore, the exclusive control unit 110 makes timely and appropriate changes to the operation sequence of workflows.

Figure 5:
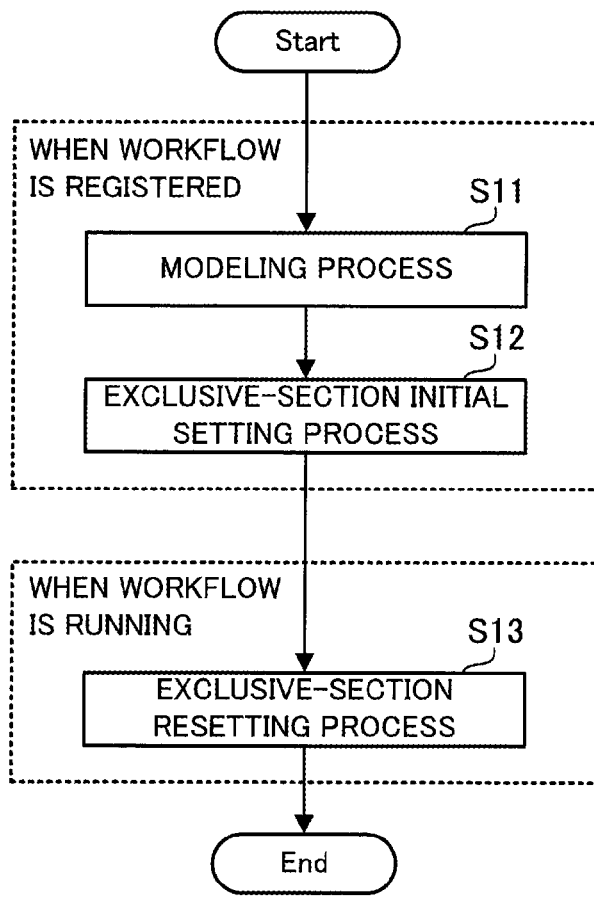
FIG. 5 is a flowchart illustrating an example of an overall process of the operation automation server.

FIG. 5 is a flowchart illustrating an example of an overall process of an operation automation server. When a workflow is registered in the operation automation server 100, the exclusive control unit 110 carries out a modeling process (step S11) and an exclusive-section initial setting process (step S12). In addition, when the workflow is running, the exclusive control unit 110 carries out an exclusive-section resetting process (step S13).

First explained are the processes carried out when a workflow is registered. The modeling process (step S11) includes the following processing. That is, the exclusive control unit 110 groups operation components of the registered workflow by the content of the operation components, and then defines operational importance of each group. For example, the exclusive control unit 110 sets the operational importance of setting-related operation components, such as information registration in the business servers 210 and network setting, to 'high' (or '3'). In addition, the exclusive control unit 110 sets the operational importance of operation-related operation components, such as restart of the OS and start-up of a service, to 'medium' (or '2'). The exclusive control unit 110 sets the operational importance of reference-, confirmation-, and notification-related operation components, such as confirmation of the server/service status, to 'low' (or '1'). This allows operation components defined in the workflow to be models (i.e., simplified representations), as explained in FIGS. 6A and 6B below. In a modeled workflow, the operational importance is determined for each operation component.

Figure 6A:
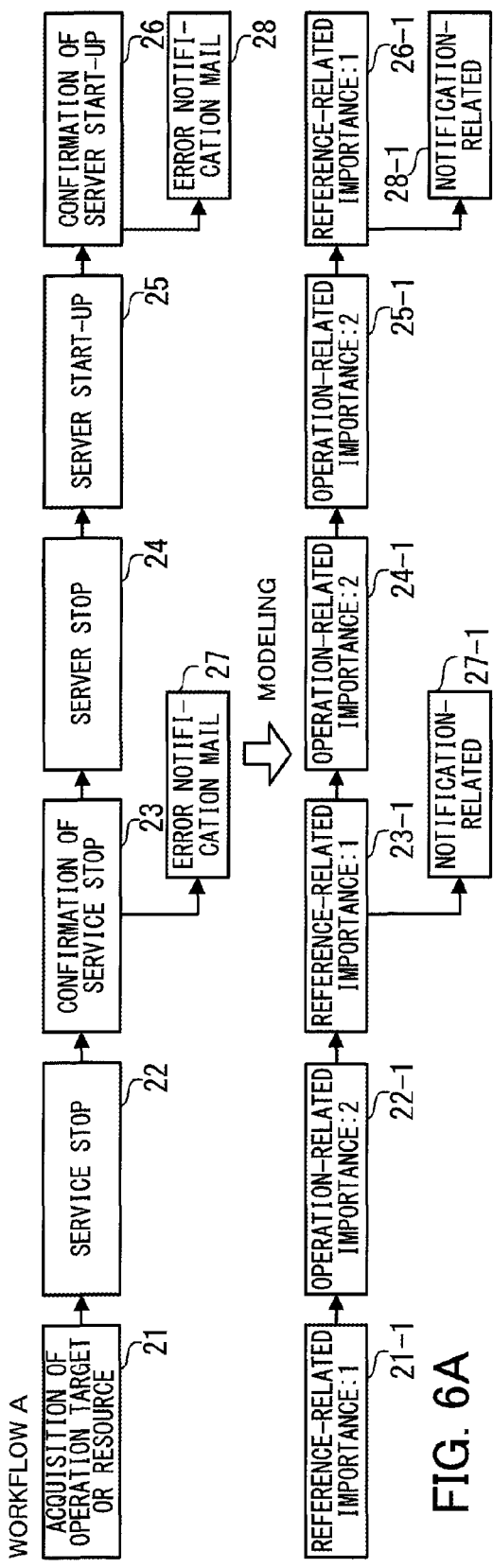
FIGS. 6A and 6B illustrate modeling of operation components defined in workflows.
Figure 6B:
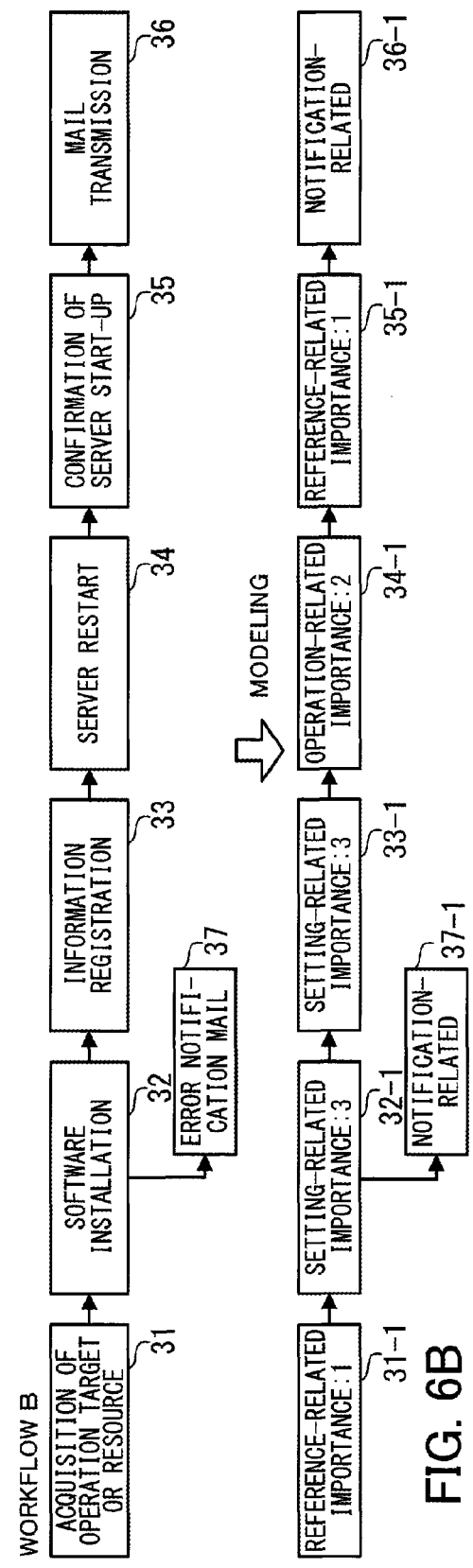

FIGS. 6A and 6B illustrate modeling of operation components defined in workflows. According to an example of FIG. 6A, the following operation components are defined in workflow A: acquisition of operation target or resource 21; service stop 22; confirmation of service stop 23; server stop 24; server start-up 25; confirmation of server start-up 26; and error notification mail 27 and 28. According to an example of FIG. 6B, the following operation components are defined in workflow B: acquisition of operation target or resource 31; software installation 32; information registration 33; server restart 34; confirmation of server start-up 35; mail transmission 36; and error notification mail 37.

When workflow A is modeled, the individual operation components are changed as follows: acquisition of operation target or resource 21 is modeled into a reference-related operation component 21-1 with an importance of 1; service stop 22 is modeled into an operation-related operation component 22-1 with an importance of 2; confirmation of service stop 23 is modeled into a reference-related operation component 23-1 with an importance of 1; server stop 24 is modeled into an operation-related operation component 24-1 with an importance of 2; server start-up 25 is modeled into an operation-related operation component 25-1 with an importance of 2; confirmation of server start-up 26 is modeled into a reference-related operation component 26-1 with an importance of 1; and error notification mail 27 and 28 are individually modeled into notification-related operation components 27-1 and 28-1.

When workflow B is modeled, the individual operation components are changed as follows: acquisition of operation target or resource 31 is modeled into a reference-related operation component 31-1 with an importance of 1; software installation 32 is modeled into a setting-related operation component 32-1 with an importance of 3; information registration 33 is modeled into a setting-related operation component 33-1 with an importance of 3; server restart 34 is modeled into an operation-related operation component 34-1 with an importance of 2; confirmation of server start-up 35 is modeled into a reference-related operation component 35-1 with an importance of 1; and mail transmission 36 and error notification mail 37 are individually modeled into notification-related operation components 36-1 and 37-1.

Subsequently, the exclusive-section initial setting process (step S12 of FIG. 5) is carried out, which includes the following processing. As described in FIGS. 7A, 7B and 8 below, the exclusive control unit 110 automatically determines exclusive sections based on (i) the same operation targets and the use of the same variables and (ii) flows of resources (passing of variables) used by individual operation components. Specifically, to determine an exclusive section, the exclusive control unit 110 checks whether or not consecutive operation components have the same operation target server, or have the same operation target server and the same operation content (such as a service, and software to be installed). Note that 'A' in the notation of [exclusive section: A] is referred to as the exclusive section name. For example, a section whose operation target is server A is defined by the notation [exclusive section: A]. Similarly, a section whose operation target is server B is defined by the notation [exclusive section: B]. In addition, within [exclusive section: A], a section whose operation content is service X is defined by the notation [exclusive section: A+X]. Within [exclusive section: A], a section whose operation content is InstallSoftY is defined by the notation [exclusive section: A+Y]. A section in which output information of an operation component is input to the subsequent operation component is defined by the notation [exclusive section: C].

Figure 7A:
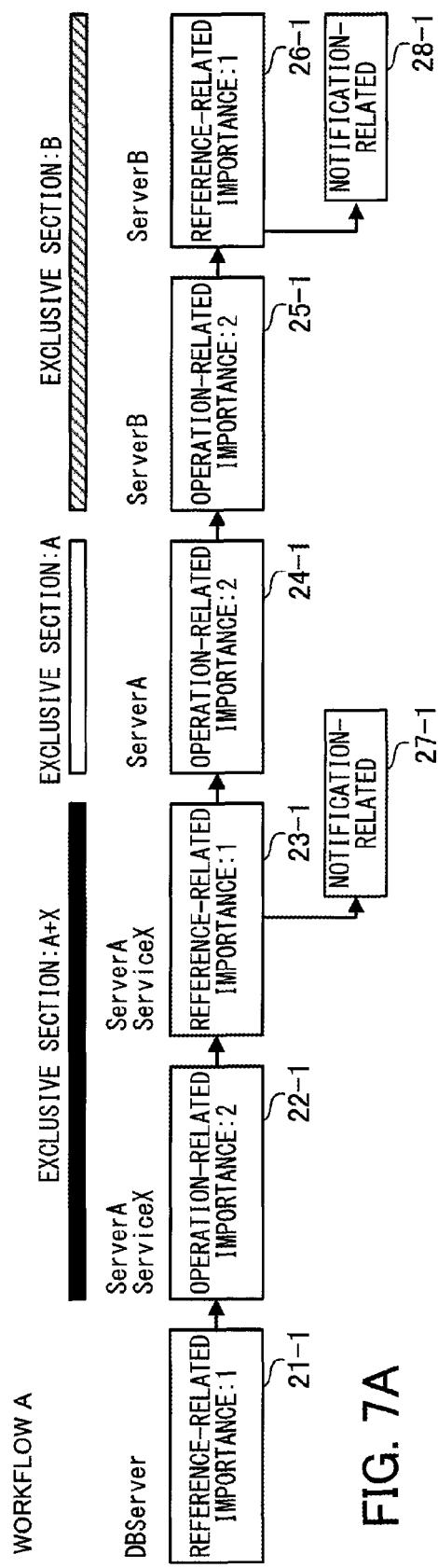
FIGS. 7A and 7B illustrate processing for determining exclusive sections based on the same operation targets and the use of the same variables.
Figure 7B:
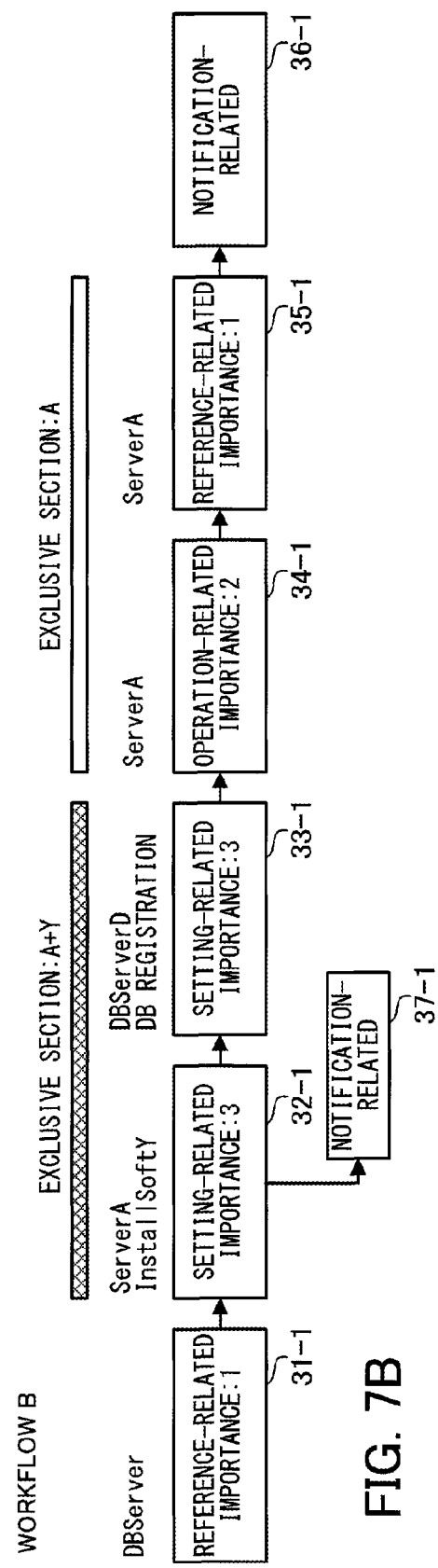

FIGS. 7A and 7B illustrate processing for determining exclusive sections based on the same operation targets and the use of the same variables. According to FIG. 7A, the operation components 22-1 and 23-1 have the same operation target, 'server A', and the same service, 'service X'. In this case, the exclusive control unit 110 determines the operation components 22-1 and 23-1 as [exclusive section: A+X]. The operation target of the operation component 24-1 is server A. In this case, the exclusive control unit 110 determines the operation component 24-1 as [exclusive section: A]. The operation target of the operation components 25-1 and 26-1 is server B. In this case, the exclusive control unit 110 determines the operation components 25-1 and 26-1 as [exclusive section: B]. According to FIG. 7B, the exclusive control unit 110 determines the operation components 32-1 and 33-1 as [exclusive section: A+Y], and determines the operation components 34-1 and 35-1 as [exclusive section: A].

Note that the exclusive control unit 110 may determine exclusive sections based on flows of resources (passing of variables) used by individual operation components. In this processing, the exclusive control unit 110 determines a section for exclusive control based on whether an output value of an operation component is used as an input value of the subsequent operation component. For example, in the case where an event log (log information) acquired from a server (referred to as 'server C') is stored in a database server, the exclusive control unit 110 defines a corresponding section by the notation [exclusive section: C].

Lock contention in each exclusive section occurs if one of the following cases regarding exclusive section names is true:

(i) the name of an exclusive section acquiring an exclusive right at least partially matches the name of an exclusive section having acquired an exclusive right; and (ii) the name of an exclusive section having acquired an exclusive right at least partially matches the name of an exclusive section acquiring an exclusive right.

Therefore, the exclusive control unit 110 determines whether the name of an exclusive section acquiring an exclusive right at least partially matches the name of an exclusive section having acquired an exclusive right, or whether the name of an exclusive section having acquired an exclusive right at least partially matches the name of an exclusive section acquiring an exclusive right. If determining that the name of an exclusive section acquiring an exclusive right at least partially matches the name of an exclusive section having acquired an exclusive right, the exclusive control unit 110 determines the occurrence of exclusive lock contention. Also if determining that the name of an exclusive section having acquired an exclusive right at least partially matches the name of an exclusive section acquiring an exclusive right, the exclusive control unit 110 determines the occurrence of exclusive lock contention.

FIG. 8 illustrates a lock contention relationship of exclusive sections. For example, if the exclusive section having acquired an exclusive right is [exclusive section: A] and the exclusive section acquiring an exclusive right is one of [exclusive section: A], [exclusive section: A+X], and [exclusive section: A+Y], exclusive lock contention occurs. On the other hand, if the exclusive section having acquired an exclusive right is [exclusive section: A] and the exclusive section acquiring an exclusive right is either [exclusive section: B] or [exclusive section: C], extensive lock contention does not take place.

Next explained is the process carried out when a workflow is running. The exclusive-section resetting process (step S13 of FIG. 5) includes the following processing. That is, when a workflow is initiated, the exclusive control unit 110 acquires and analyzes the content of the workflow. Then, the exclusive control unit 110 adjusts and determines exclusive sections of the initiated workflow based on all operation components included in the workflow. The exclusive control unit 100 also adjusts and determines exclusive sections of already running workflows based on all operation components included in the running workflows. Based on the adjustment and determination results, the individual workflow executing units 120 instruct the business servers 210 about the execution of the operation components.

The following gives a detailed description of the process carried out when a workflow is running (i.e., the exclusive-section resetting process).

(1-1) Details of Acquisition and Analysis of Workflow Content

When a workflow is initiated, the exclusive control unit 110 determines the execution priority of the workflow in the following manner. First, the exclusive control unit 110 acquires information of operation components defined in the workflow and resources to be used by the operation components, which information is preliminarily registered in a storage device of the operation automation server 100. Subsequently, based on the information of the resources to be used by the individual operation components (information of operation targets and content of variables), the exclusive control unit 110 carries out the same process as step S12 of FIG. 5 once again and, then, carries out exclusive section resetting in the following cases. That is, when, in exclusive sections in each of which a different variable is used as an input, a change is made in such a manner that the variables have the same value, the exclusive control unit 110 merges the exclusive sections. In addition, when, in an exclusive section set based on the same variable, a change is made to the content of the variable, the exclusive control unit 110 splits the exclusive section.

Figure 9:
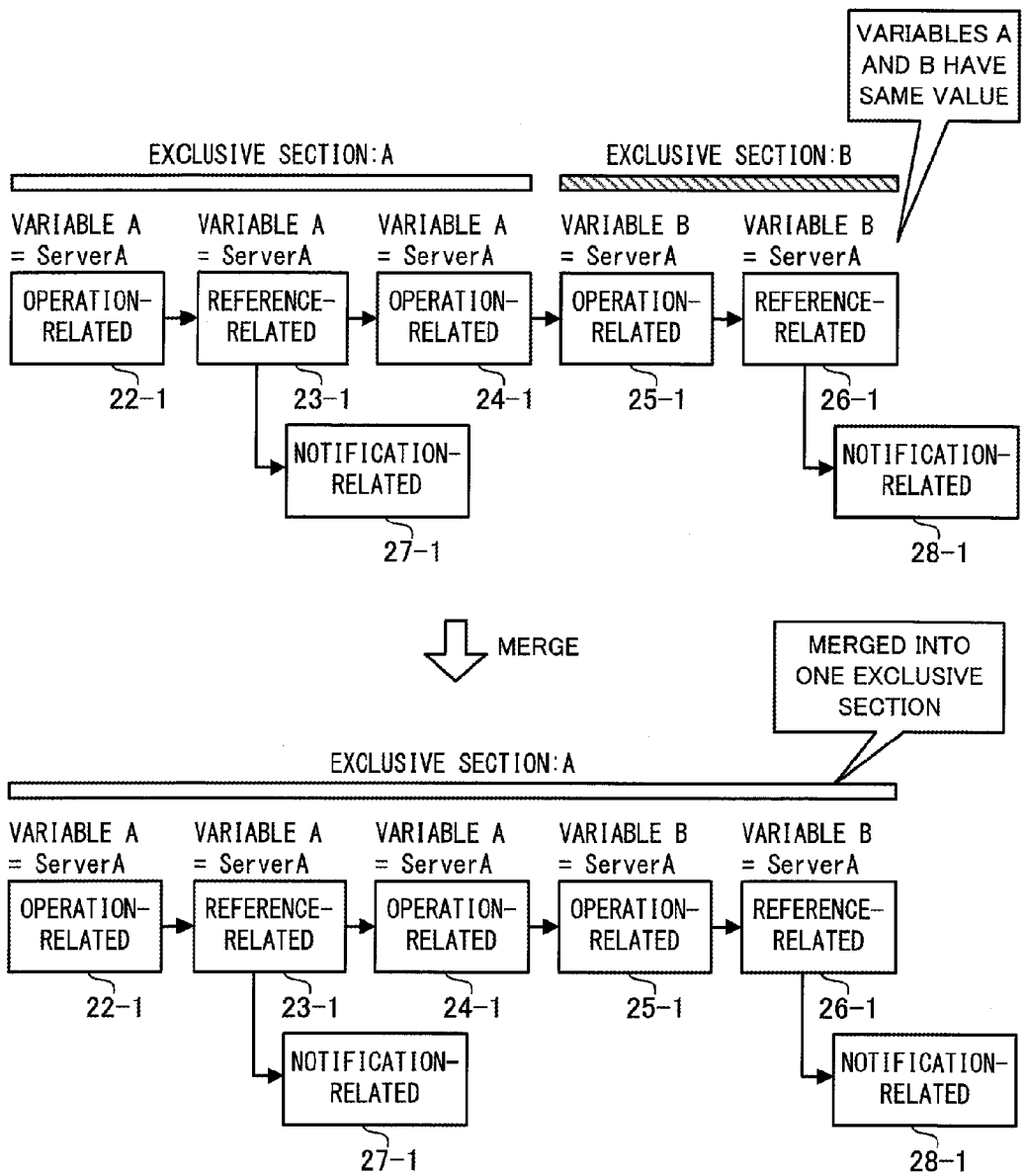
FIG. 9 illustrates an example of merging the exclusive sections.

FIG. 9 illustrates an example of merging exclusive sections. The example of FIG. 9 illustrates the case of merging exclusive sections when, in the exclusive sections set based on different variables, a change is made in such a manner that the variables have the same value. Prior to the mergence of the exclusive sections, the operation components 22-1 to 24-1 are set as [exclusive section: A] and the operation components 25-1 and 26-1 are set as [exclusive section: B]. Assume here that the workflow is subsequently executed and a change is made to the value of a variable. As a result of the change, the value of variable A of the operation components 22-1 to 24-1 is 'ServerA', and the value of variable B of the operation components 25-1 and 26-1 is also 'ServerA'. In this case, because variable A and variable B in the neighboring [exclusive section: A] and [exclusive section: B] have the same value, the exclusive control unit 110 merges [exclusive section: A] and [exclusive section: B] into [exclusive section: A].

Figure 10:
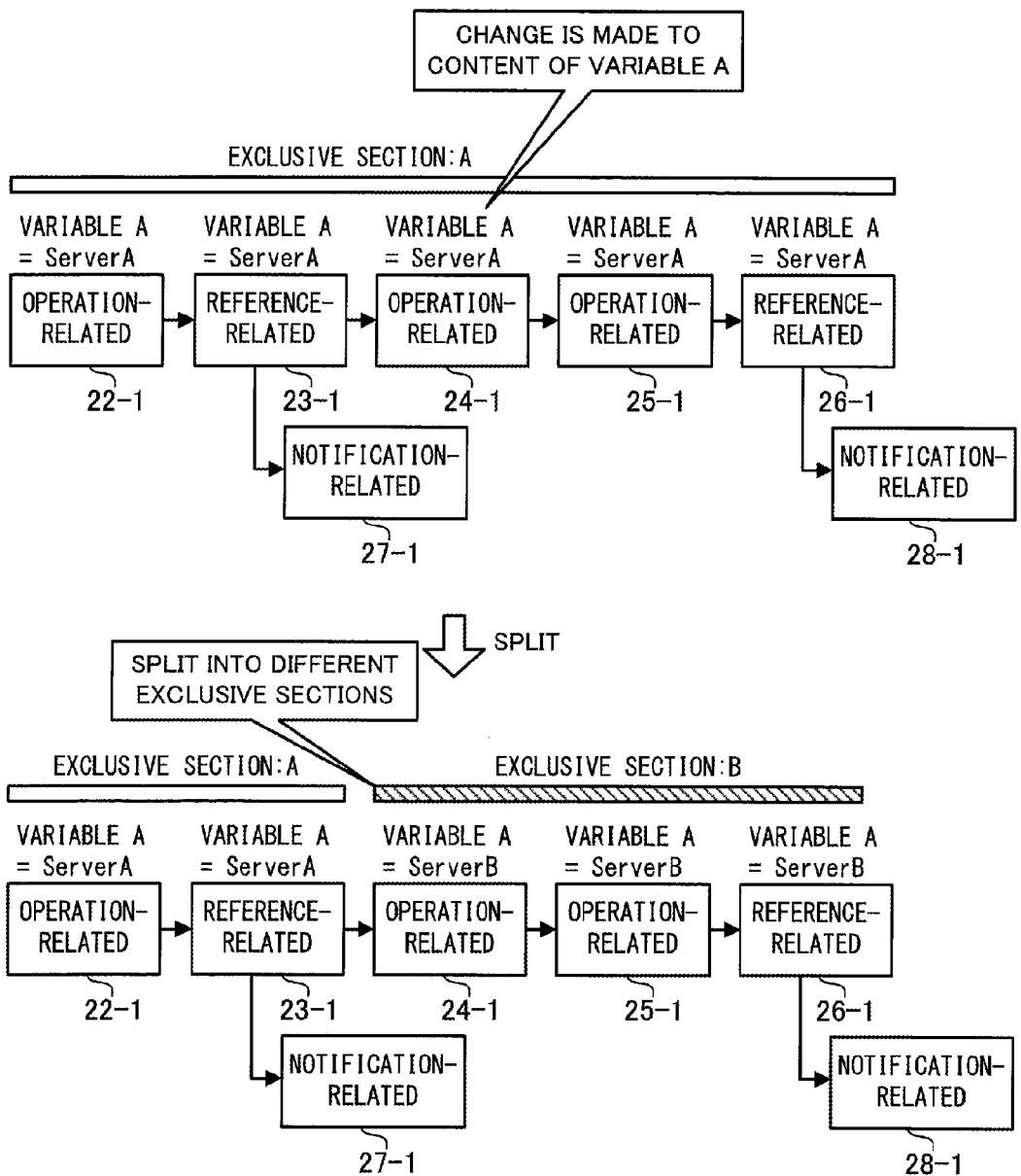
FIG. 10 illustrates an example of splitting an exclusive section.

FIG. 10 illustrates an example of splitting an exclusive section. The example of FIG. 10 illustrates the case of splitting an exclusive section when, in an exclusive section set based on the same variable, a change is made to the content of the variable. Prior to the split of the exclusive section, the operation components 22-1 to 26-1 are set as [exclusive section: A]. Assume here that the workflow is subsequently executed and a change is made to a value of the variable. As a result of the change, the value of variable A of the operation components 22-1 and 23-1 is 'ServerA', and the value of variable A of the operation components 24-1 to 26-1 is 'ServerB'. In this case, because the operation components 22-1 and 23-1 and the operation components 24-1 to 26-1 have different values for variable A, the exclusive control unit 110 splits [exclusive section: A] into [exclusive section: A] and [exclusive section: B].

Next, according to equation (1) below, the exclusive control unit 110 determines the degree of the operational urgency of a workflow based on a user having initiated the workflow, how the workflow has been initiated, and the remaining time before the scheduled time of completion.

$$\text{Degree of Operational Urgency} = \text{User Coefficient} \times \text{Initiation Method Coefficient} \times \text{Time Coefficient} \quad (1)$$

The user coefficient is a coefficient of a user having initiated the workflow. For example, an administration user is assigned a user coefficient of 3.0, and a general user is assigned a user coefficient of 2.0. As for the initiation method coefficient, for example, an initiation method coefficient of 2.0 is assigned in the case where the workflow has been initiated manually. When the workflow has been initiated on schedule at a specified time, an initiation method coefficient of 3.0 is assigned. Also, when the workflow has been initiated with a notice from a monitoring system, an initiation method coefficient of 3.0 is assigned. As for the time coefficient, for example, a time coefficient of 1.5 is assigned when the remaining time before the scheduled time of completion is 10 minutes or less. In other cases, or in the case where the scheduled time of completion is not specified, a time coefficient of 1.0 is assigned.

Next, the exclusive control unit 110 provisionally determines the execution priority of the workflow according to equation (2) below.

$$\text{Execution Priority} = \Sigma(\text{Operational Importance}) \times \text{Degree of Operational Urgency} \quad (2)$$

Here, the calculation of the execution priority to be provisionally determined is demonstrated using an example of workflow A in which an operation-related operation component 1 and a reference-related operation component 2 are designated as an exclusive section. Assume here that workflow A is assigned a user coefficient of 2.0, an initiation method coefficient of 1.0, and a time coefficient of 1.5. The operation importance of the operation component 1 is '2' and that of the operation component 2 is '1', and therefore, the sum of the operational importance, $\Sigma$(operational importance), is: 2+1=3. According to equation (1), the degree of the operational urgency is: 2.0×1.0×1.5=3.0. As a result, according to equation (2), the execution priority is: 3×3.0=9.0.

(1-2) Adjustment and Determination of Provisionally Determined Exclusive Section when Workflow is Running Next, the exclusive control unit 110 adjusts and determines a provisionally determined exclusive section when a workflow is running. When the workflow is running, the exclusive control unit 110 changes the execution priority according to branches in the workflow and processing results of operation components. Then, according to the execution priority, the exclusive control unit 110 determines whether to immediately execute an operation component following a currently executed operation component or keep it wait. The adjustment and determination process is achieved by the following steps (I) to (V).

(I) The exclusive control unit 110 receives predetermined notification from the workflow executing unit 120.

(II) The exclusive control unit 110 carries out the processes described in 'Details of Acquisition and Analysis of Workflow Content' in (1-1) above, to thereby determine exclusive sections and execution priority once again.

(III) The exclusive control unit 110 stores, in a storage device, the exclusive sections and execution priority re-determined in (II) above.

(IV) The exclusive control unit 110 extracts, from workflows currently being executed, an exclusive section having the highest execution priority.

(V) The exclusive control unit 110 determines whether to immediately execute a following operation component of the workflow or keep it wait. At this point, the exclusive control unit 110 causes the operation component to be executed when the workflow is determined to acquire an exclusive right. On the other hand, when another workflow has acquired an exclusive right in preference, the exclusive control unit 110 delays the execution of the operation component.

Figure 11:
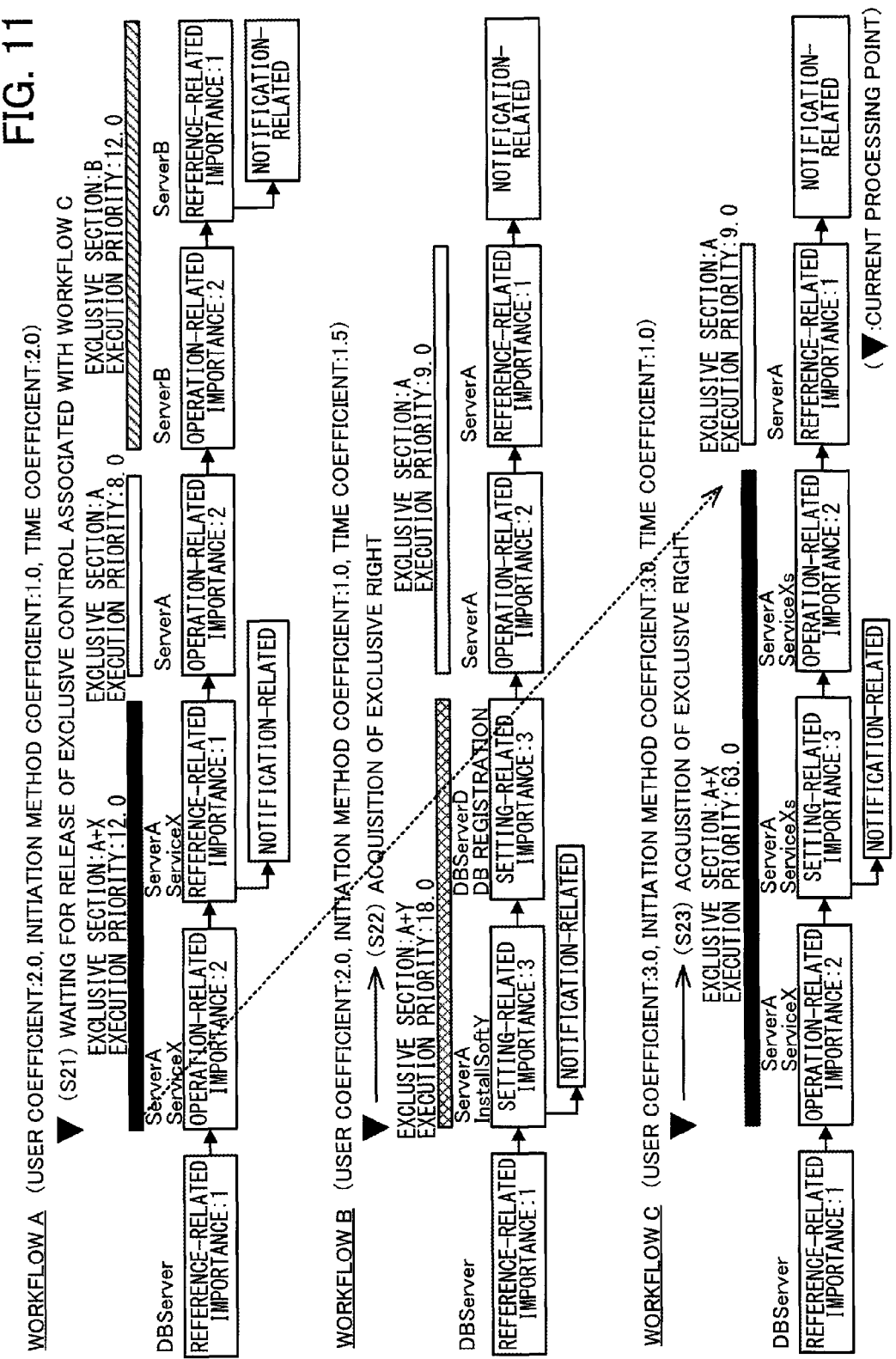
FIG. 11 is a first part illustrating an example of extracting an exclusive section having the highest execution priority and determining a subsequent exclusive section to be executed.
Figure 12:
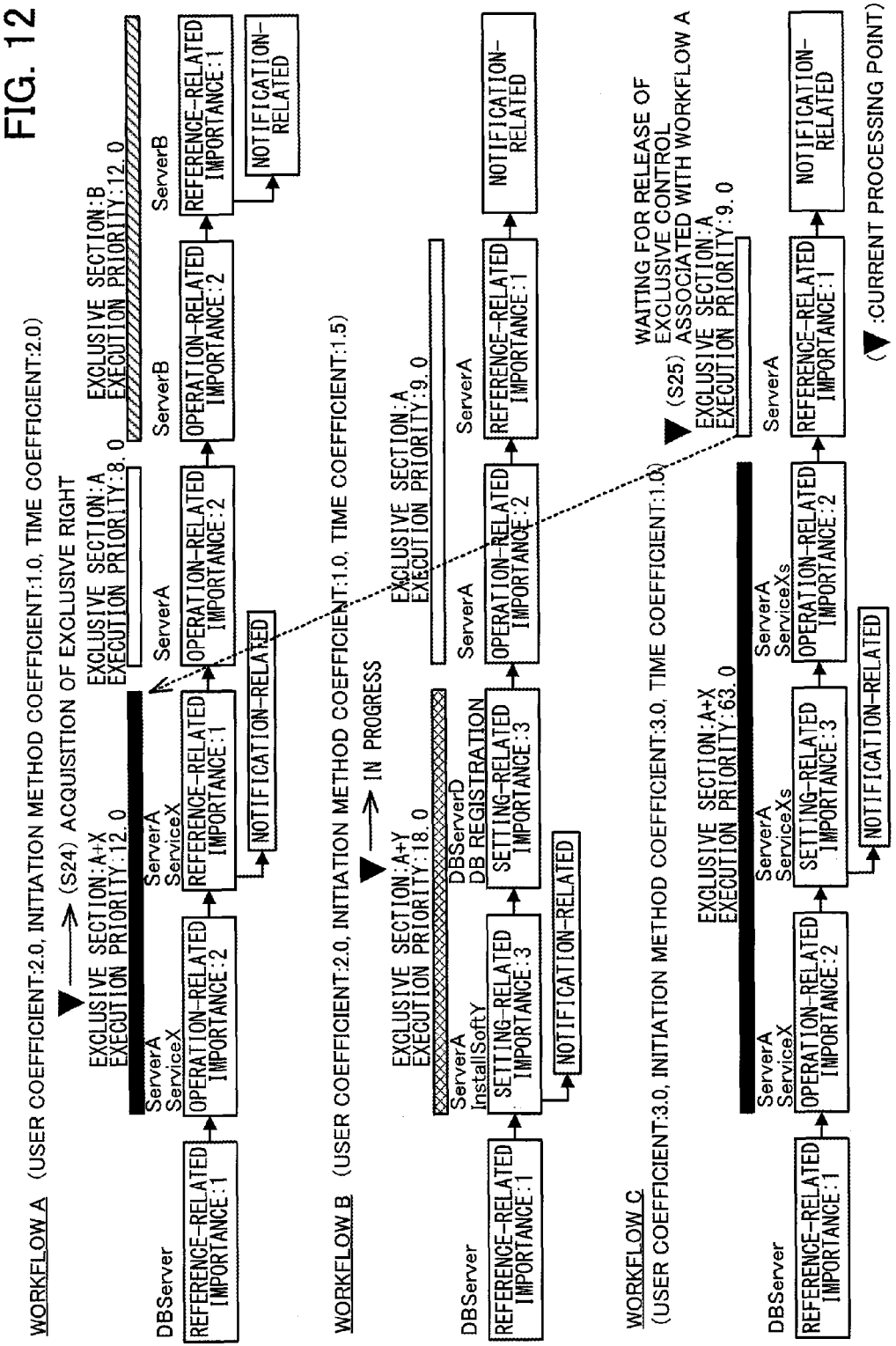
FIG. 12 is a second part illustrating the example of extracting an exclusive section having the highest execution priority and determining a subsequent exclusive section to be executed.

Steps (IV) and (V) above are explained further with reference to FIGS. 11 to 16. FIGS. 11 and 12 illustrate an example of extracting an exclusive section having the highest execution priority and determining whether to execute a following operation component. Assume in FIGS. 11 and 12 that workflows A, B, and C are executed in parallel. In each workflow of FIGS. 11 and 12, an inverted triangle indicates a current processing point in the workflow. While a workflow is holding an exclusive right (execution right) to be described later, the workflow is allowed to execute its operations.

In FIG. 11, when the operation of [exclusive section: A+X] of workflow A is about to be executed, workflow A is placed into a wait state until exclusive control associated with workflow C is released because [exclusive section: A+X] of workflow C has higher execution priority (step S21). Because [exclusive section: A+Y] of workflow B does not conflict with [exclusive section: A+X], workflow B acquires an exclusive right (execution right) (step S22). Because [exclusive section: A+X] of workflow C has the highest execution priority among the exclusive sections of workflows A, B, and C at this point in time, workflow C acquires an exclusive right (execution right) (step S23).

Next, as illustrated in FIG. 12, when the operation of [exclusive section: A+X] of workflow C is completed, the exclusive control associated with [exclusive section: A+X] is released. As a result, workflow A acquires an exclusive right (execution right) (step S24) because [exclusive section: A+X] of workflow A has the highest execution priority. As for [exclusive section: A] of workflow C, workflow C is placed into a wait state until the exclusive control associated with [exclusive section: A+X] of workflow A is released (step S25). Subsequently, when the operation of [exclusive section: A+X] of workflow A is completed, the exclusive control associated with [exclusive section: A+X] is released although no illustration is made in FIG. 12. At this point, if [exclusive section: A] of workflows B and C have the same execution priority, workflow C acquires an exclusive right (execution right) in preference to workflow B because of its administrative privileges (that is, because of having a larger user coefficient).

Figure 13:
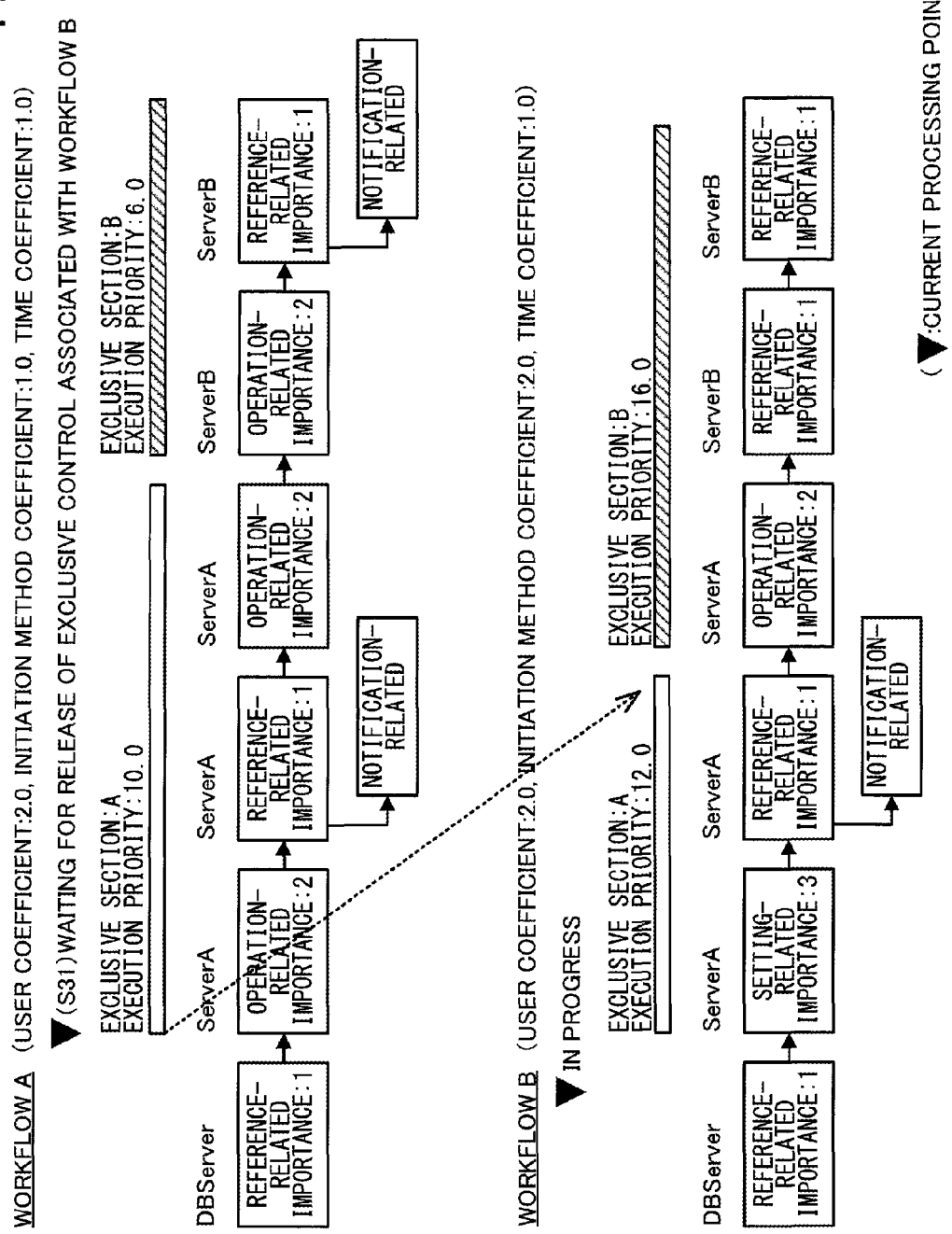
FIG. 13 is a first part illustrating an example of acquisition of an exclusive right (execution right) by a workflow in a case where there is a change in execution priority during execution of workflows.

FIGS. 13 and 14 illustrate an example of acquisition of an exclusive right (execution right) by a workflow in the case where there is a change in the execution priority during execution of workflows. As illustrated in FIG. 13, as for [exclusive section: A], when workflow A is about to acquire an exclusive right (execution right), workflow B has higher execution priority for [exclusive section: A] than workflow A does although the current processing point in workflow B is located prior to its [exclusive section: A]. Therefore, workflow A is placed into a wait state (step S31) until workflow B releases exclusive control associated with [exclusive section: A] after acquiring an exclusive right (execution right) for [exclusive section: A] and then carrying out the operation of [exclusive section: A]. Assume, however, that subsequently the time coefficient changes with time, as illustrated in FIG. 14. As a result, the execution priority of [exclusive section: A] of workflow A is changed. Since the execution priority of [exclusive section: A] of workflow A becomes higher, the workflow A acquires an exclusive right (execution right) and carries out the operation of its [exclusive section: A] (step S32).

As illustrated in FIGS. 11 to 14 above, exclusive sections of individual workflows, which sections use the same resource, are processed sequentially in descending order of the execution priority. If there is a change in the execution priority among the workflows, the execution priority is examined once again, and the operation of an exclusive section having the highest execution priority at that point in time is executed first.

<Operation Procedure Optimization Control by Removing Redundant Operations>

Figure 15:
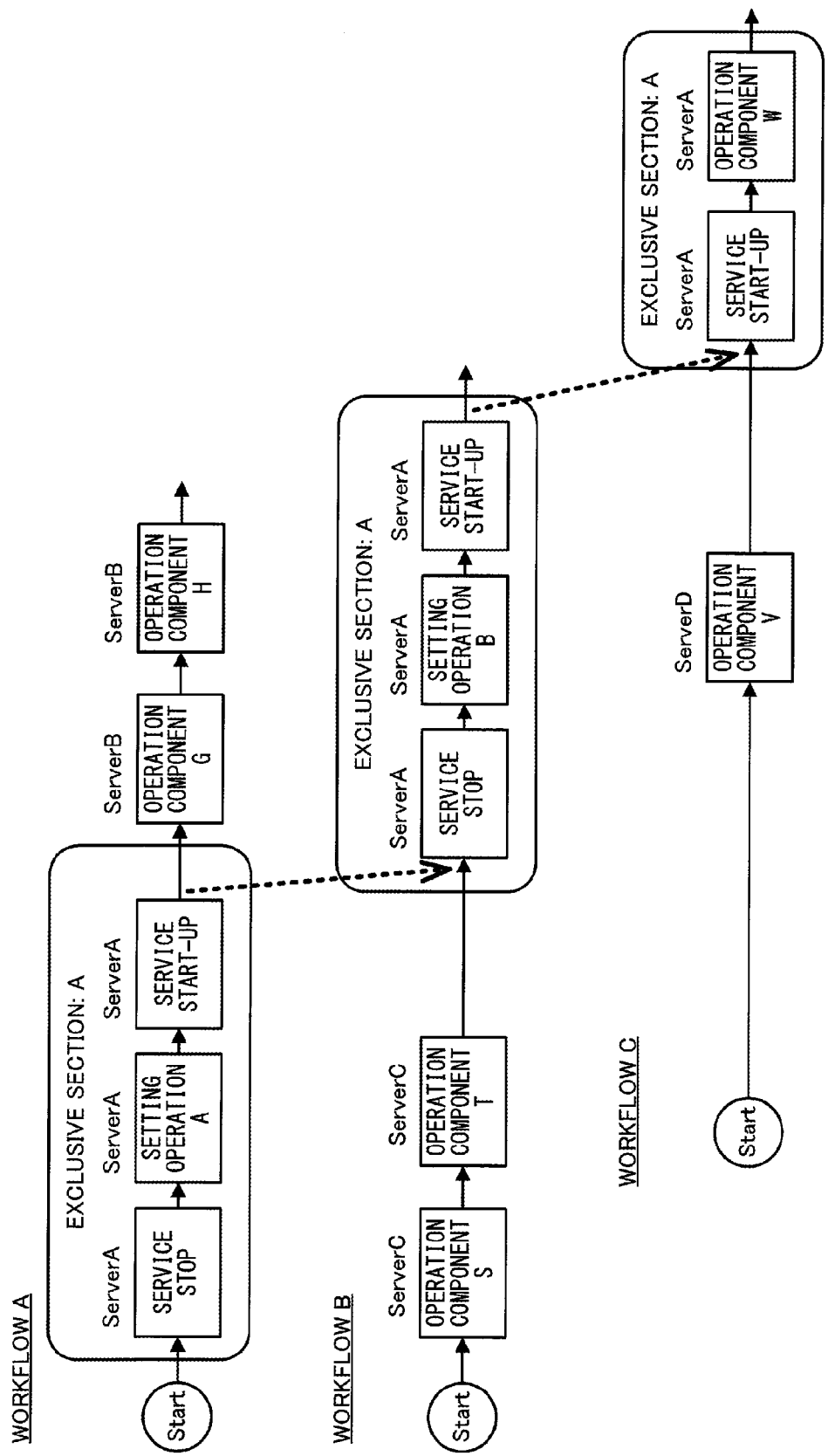
FIG. 15 illustrates an example of a plurality of workflows including redundant operations for the same operation target.

Because workflows are individually defined, a plurality of workflows executed around the same time may include redundant operations for the same operation target. FIG. 15 illustrates an example of a plurality of workflows including redundant operations for the same operation target. For example, the following two cases are considered as the execution of redundant operations: (1) the same operation is carried out consecutively (i.e., in an uninterrupted succession) on the same operation target; and (2) operations opposite to each other are carried out consecutively on the same operation target.

According to the example of FIG. 15, an operation of starting a service is carried out at the end of [exclusive section: A] of workflow B, and then an operation of starting the service is carried out at the beginning of [exclusive section: A] of workflow C. In this case, the same operation of starting the service is performed consecutively and, therefore, redundantly although the operation needs to be executed only once.

In addition, in FIG. 15, an operation of starting the service is carried out at the end of [exclusive section: A] of workflow A, and then an operation of stopping the service is carried out at the beginning of [exclusive section: A] of workflow B. In this case, the opposite operations of starting the service and stopping the service are performed consecutively. However, consecutively executing the opposite operations is unnecessary and, therefore, redundant.

The execution of redundant operations as illustrated in the example of FIG. 15 unnecessarily lengthens the workflow processing time. In the case where workflows are implemented for the purpose of maintaining resources such as business servers and programs, the execution of redundant operations in fact shortens the time for the resources to be used for services, which results in a decrease in service performance. In addition, the execution of redundant operations increases the number of operating instructions to the business servers, putting unnecessary load on the network. Further, unnecessary repetition of service start and stop lengthens the stop time of the service, which also results in a decrease in service performance.

One way to avoid redundant operations from being executed may be, for example, to adopt such measures that eliminate the redundant operations when workflows are developed. Specifically, when developing workflows, the developer removes operational redundancy by sorting out workflows to be executed concurrently and then checking operation contents defined in the individual workflows against the workflow execution schedule. However, it is not easy for the developer to design individual workflows, considering in advance the operation relationship among a plurality of workflows. For example, business operations include not only regularly scheduled services for which set workflows are implemented but also irregular services, for example, for handling troubles and accommodating occasional requests, and workflows corresponding to such irregular services are also executed. Workflows executed at the same time may include those executed irregularly, and in such a case, the developer is not able to comprehend whether redundant operations take place, at the time of workflow development.

Therefore, in order to reliably avoid the execution of redundant operations, it is desired to dynamically detect the redundant operations when workflows are executed and appropriately omit the execution of such redundant operations, to thereby dynamically remove operational redundancy. However, this has challenges, for example, as described in FIGS. 16 and 17 below.

Figure 16:
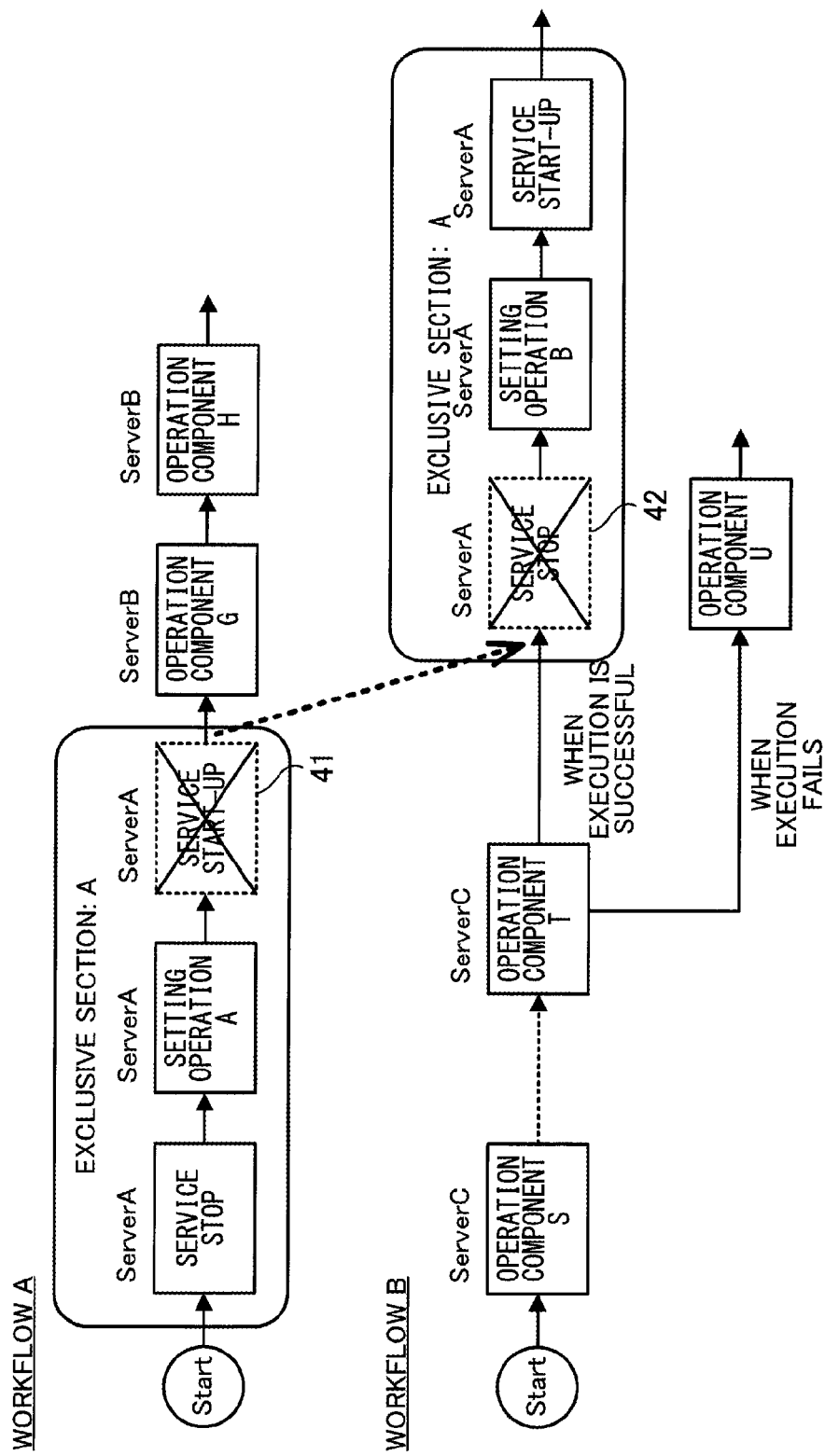
FIG. 16 is a first diagram for illustrating challenges for dynamic detection and omission of the redundant operations.

FIG. 16 is a first diagram for illustrating challenges for dynamic detection and omission of redundant operations. One challenge is how to cope in the case where workflows include an operation component for implementing conditional branching. When there is conditional branching, operation components to be executed are changed according to its branch condition. Therefore, even when there is an apparently redundant operation after conditional branching, the operation may or may not be omissible depending on determination on a branch destination.

For example, in FIG. 16, operation component T included in workflow B implements conditional branching based on, for example, the result of a previously executed operation. Assuming that the branch destination of operation component T is determined to be an operation component 42, [exclusive section: A] of workflow B is executed after [exclusive section: A] of workflow A. In this case, it is possible to omit the execution of opposite operations, an operation component 41 for starting a service and the operation component 42 for stopping the service. However, if the branch destination of operation component T is determined to be operation component U, the execution of the operation component 41 is not omissible. Thus, when there is conditional branching, omissible operations are not detected properly.

In addition, assume that, according to the example of FIG. 16, the execution of the operation component 41 is omitted before the branch destination of operation component T is determined. In this case, if the branch destination of operation component T is determined to be operation component U, the operation component 41 needs to be executed. However, because workflow A has progressed to a point after the operation component 41 when the branch destination is determined to be operation component U, it is not possible to execute the operation component 41 as an operation of workflow A anymore.

The above-described challenge may be solved by uniformly preventing operations from being omitted when workflows include conditional branching. However, because conditional branching is included in many workflows, this method hardly allows for a reduction in the processing time.

Figure 17:
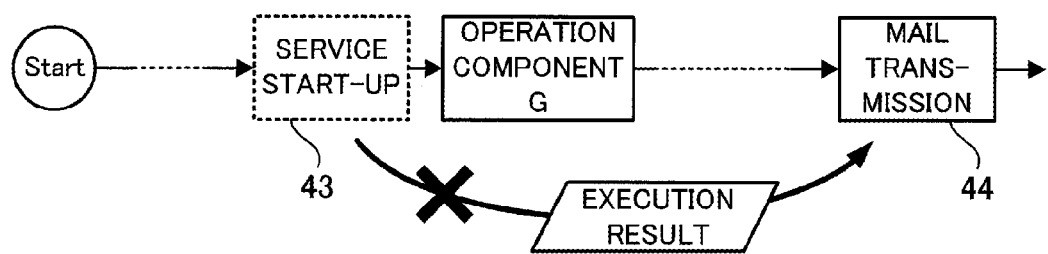
FIG. 17 is a second diagram for illustrating the challenges for dynamic detection and omission of the redundant operations.

FIG. 17 is a second diagram for illustrating the challenges for dynamic detection and omission of redundant operations. Another challenge is that, if the execution of an operation is omitted, the execution result is not available in a subsequent operation.

For example, in FIG. 17, an operation component 44 for transmitting a mail involves reference to the execution result of a preceding operation component 43. In this case, if the operation component 43 is omitted, the subsequent operation component 44 is not able to be executed because there is no information to be referred to. Thus, when an operation is omitted, a workflow may not be continued due to incapability of the execution of a subsequent operation involving reference to an execution result of the operation.

In addition, there is a case where execution information of an operation component is edited by a filter process and then set as a variable to be referred to by a different operation component. In such a case also, the omission of the operation component results in no variable being set for the different operation component to refer to, and therefore the workflow is not continued.

Figure 18:
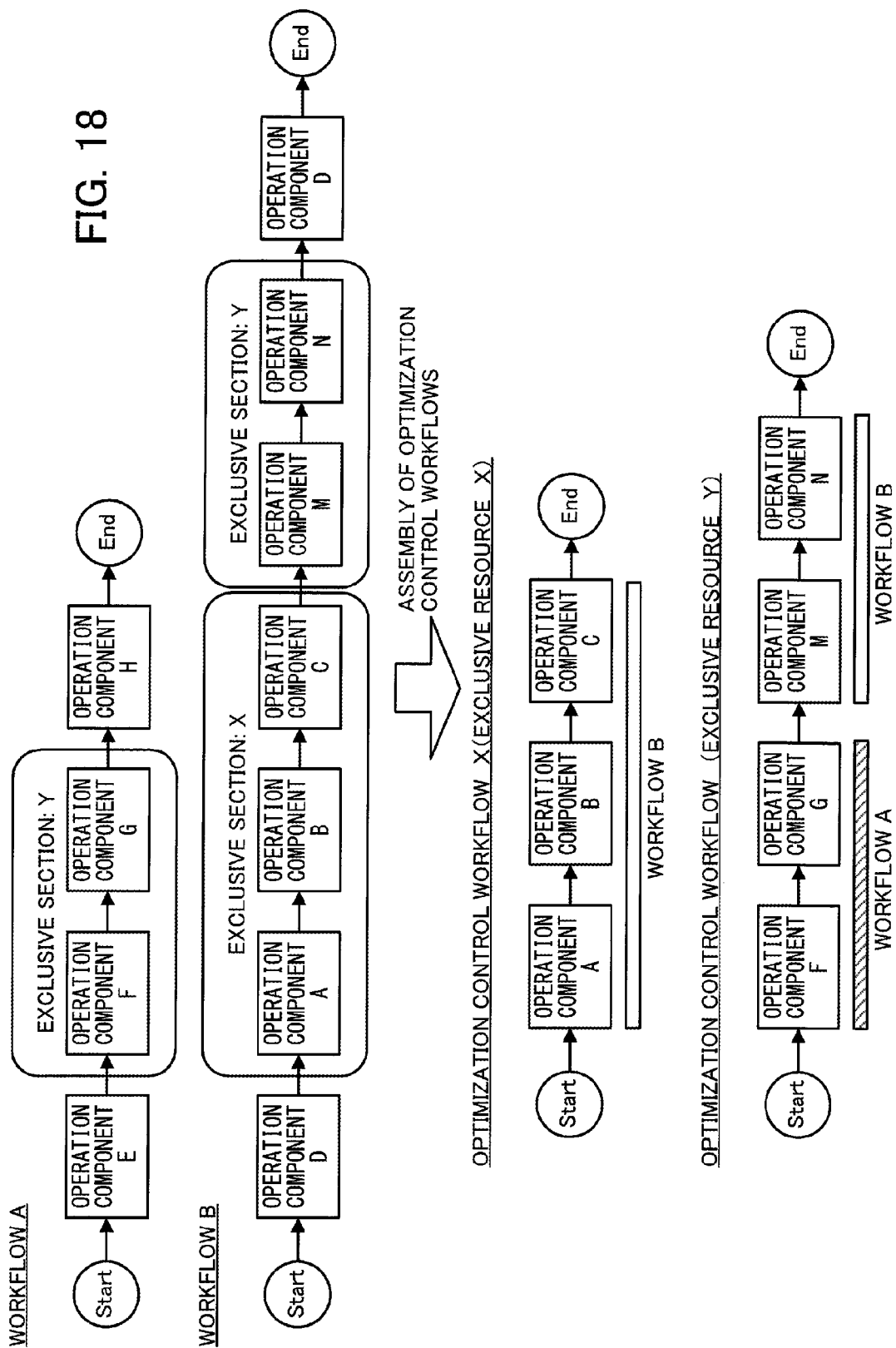
FIG. 18 illustrates an example of assembling optimization control workflows.

In view of the above-described challenges, the operation automation server 100 of this embodiment dynamically detects and omits redundant operations in the following manner, to thereby optimize the operational procedure of workflows. FIG. 18 illustrates an example of assembling optimization control workflows. When a workflow is executed, the exclusive control unit 110 collects operation components for operating the same exclusive resource and assembles virtual workflows for individual exclusive resources. Such a virtual workflow is herein referred to as the 'optimization control workflow'. For example, an optimization control workflow for exclusive resource X is referred to as the 'optimization control workflow X'. Based on optimization control workflows, the exclusive control unit 110 dynamically determines redundancy in executing operation components according to operation content and execution sequences of other workflows when each workflow is executed, and then appropriately omits the execution of redundant operations.

For example, in FIG. 18, workflow A includes [exclusive section: Y] and workflow B includes [exclusive section: X] and [exclusive section: Y]. To carry out control of the exclusive sections, the exclusive control unit 110 collects exclusive information of workflows A and B, and manages the exclusive information using the instance management table 134 and the exclusive information management table 135. The managed exclusive information includes information items of an exclusive resource, an exclusive section, and execution priority.

Based on these exclusive information items, the exclusive control unit 110 assembles optimization control workflows in the following manner when workflows A and B are executed. The exclusive control unit 110 generates an instance of optimization control workflow X for exclusive resource X. The exclusive control unit 110 assembles optimization control workflow X based on the exclusive information of [exclusive section: X] of workflow B, and registers information of optimization control workflow X in the optimization control workflow management table 141.

As for exclusive resource Y, the following process takes place since [exclusive section: Y] is set in more than one workflow. The exclusive control unit 110 generates an instance of optimization control workflow Y for exclusive resource Y. The exclusive control unit 110 determines a processing order for exclusive resource Y based on the execution priority of the exclusive sections of workflows A and B. Based on the exclusive information of [exclusive section: Y] of workflow A and [exclusive section: Y] of workflow B, the exclusive control unit 110 assembles optimization control workflow Y, and registers information of optimization control workflow Y in the optimization control workflow management table 141.

Next, the workflow executing units 120 individually in charge of each of workflows A and B check with the exclusive control unit 110 regarding acquisition of an exclusive right when executing each operation component. At this point, the exclusive control unit 110 determines, in an optimization control workflow for a corresponding exclusive resource, the previous and following operation components of the operation component, and determines whether one of the following optimization conditions (that is, conditions for execution omission) is met:

consecutive execution condition, in which the same operation is consecutively executed on the same operation target; and opposite operation condition, in which operations opposite to each other are consecutively executed on the same operation target.

These optimization conditions are determined based on the optimization target component definition table 140. The optimization target component definition table 140 holds lists of operation components targeted for optimization, and includes two tables (optimization target component definition tables) individually corresponding to each of the two optimization conditions above. One of the tables includes operation components subject to the consecutive execution condition, and the other table includes paired operation components for carrying out opposite operations, subject to the opposite operation condition.

Figure 19:
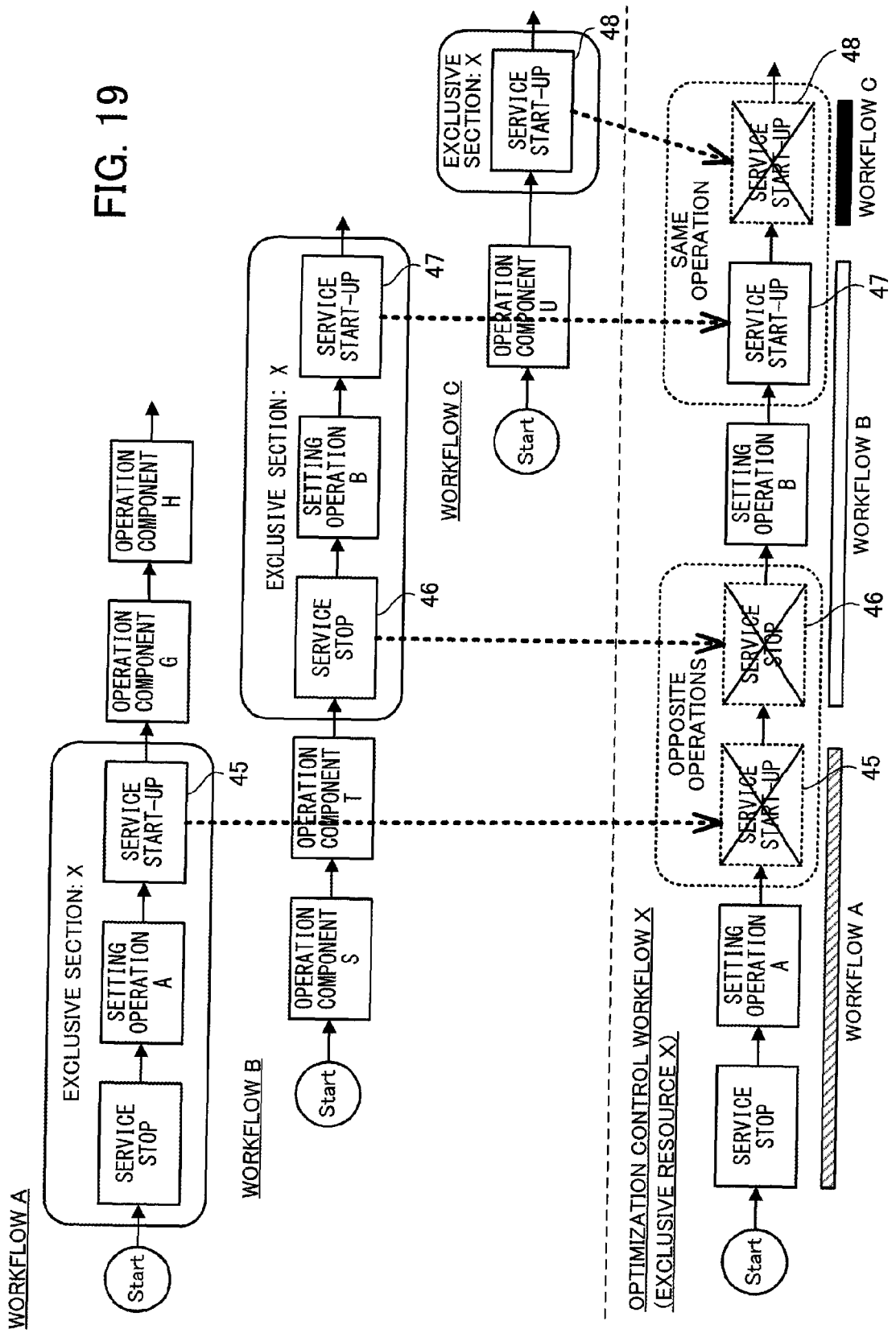
FIG. 19 illustrates an example of omitting operations based on optimization conditions.

FIG. 19 illustrates an example of omitting operations based on optimization conditions. According to FIG. 19, workflows A, B, and C individually include [exclusive section: X]. Assume here that [exclusive section: X] of workflow A, [excusive section: X] of workflow B, and [exclusive section: X] of workflow C are executed in the stated order according to the execution priority. In this case, in optimization control workflow X for exclusive resource X, two opposite operations including an operation component 45 for starting a service and an operation component 46 for stopping the service take place consecutively. Therefore, the operation components 45 and 46 satisfy the opposite operation condition. In addition, in optimization control workflow X, operation components 47 and 48 both for starting a service take place consecutively. Therefore, the operation components 47 and 48 satisfy the consecutive execution condition.

As for operation components satisfying one of the optimization conditions, the following processes are carried out: (2-1) omission of execution of operation component; (2-2) setting of execution result for omitted operation component; and (2-3) implementation of post-process for omitted operation component. The following gives a detailed description of each of the processes (2-1), (2-2), and (2-3).

(2-1) Omission of Execution of Operation Component

As for operation components carrying out the same operation and satisfying the consecutive execution condition, the exclusive control unit 110 causes only one of the operation components to be executed. According to this embodiment, the execution of the latter one of the consecutive operation components is omitted. In the example of FIG. 19, the operation component 47 is executed while the execution of the operation component 48 is omitted.

As for a pair of operation components satisfying the opposite operation condition, the exclusive control unit 110 causes the execution of both the operation components to be omitted. In the example of FIG. 19, the execution of both the operation components 45 and 46 is omitted.

Note that when the execution of operation components satisfying the opposite operation condition is omitted, the following process is carried out on a workflow including the foregoing one of the operation components (workflow A including the operation component according to the example of FIG. 19) prior to the process of (2-2). That is, the workflow executing unit 120 in charge of the workflow omits the execution of an operation component instructed by the exclusive control unit 110, and carries out the remaining processes of (2-2) and (2-3) as if the operation component has been executed successfully.

Note however that the following process may be carried out in the case where the same operation component as the one omitted is defined in the optimization control workflow. That is, the exclusive control unit 110 puts a workflow including the omitted operation component into an execution wait state until the same operation component is executed. Then, once the same operation component is executed, the exclusive control unit 110 instructs the workflow executing unit 120 in charge of the workflow in an execution wait state to release the workflow from the wait state. Upon receiving the instruction, the workflow executing unit 120 sets, in an execution history database, a result obtained by executing the same operation component prior to the workflow being released from the wait state as an execution result of the omitted operation component. Subsequently, the workflow executing unit 120 carries out the process of (2-3), using the execution result set in the execution history database. Note that this process by the workflow executing unit 120 is performed in place of the process of (2-2).

According to the example of FIG. 19, after the execution of the operation component 45 is omitted, workflow A is put into a wait state until the operation component 47 of workflow B is executed. Then, when the operation component 47 is executed, workflow A is released from the wait state, and a result obtained by actually executing the operation component 47 is set in the execution history database as an execution result of the omitted operation component 45.

(2-2) Setting of Execution Result for Omitted Operation Component

The execution result of an operation component may be used when a subsequent operation component is executed. For this reason, a value indicating successful operation also needs to be set for an omitted operation component as its execution history.

When the execution of an operation component satisfying the consecutive execution condition is omitted, the same operation component as the one omitted is always executed immediately before the omission. Therefore, the workflow executing unit 120 sets a result obtained by executing the same operation component immediately before the omitted operation component as the execution result of the omitted operation component. According to the example of FIG. 19, when the execution of the operation component 48 of workflow C is omitted, the execution result of the operation component 47 of workflow B is set as the execution result of the omitted operation component 48.

In addition, when the execution of an operation component satisfying the opposite operation condition is omitted, the workflow executing unit 120 sets an execution result for the omitted operation component in the following manner. In the case where the same operation component as the one omitted has been executed at least once in the same workflow after the system is started, the workflow executing unit 120 sets the result of the already executed operation component as the execution result of the omitted operation component. On the other hand, in the case where the same operation component has not been executed even once in the same workflow, the workflow executing unit 120 sets a prepared execution result as the execution result of the omitted operation component.

Figure 20:
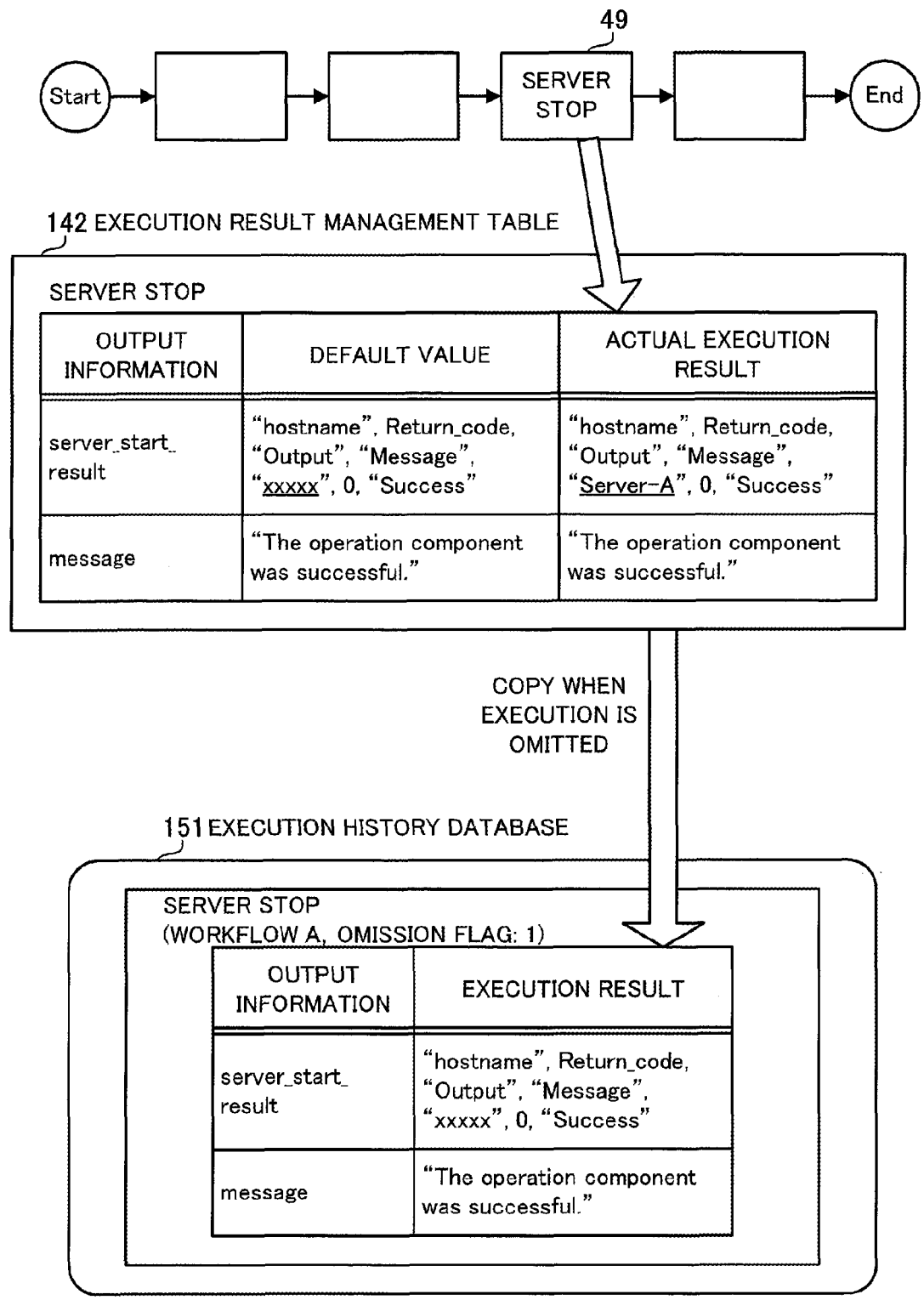
FIG. 20 illustrates an example of setting an execution result for an omitted operation component.

FIG. 20 illustrates an example of setting an execution result for an omitted operation component. According to this embodiment, the execution result management table 142 prestores, in a column headed 'default value', execution results for operation components that are omissible according to the opposite operation condition. Subsequently, when such operation components are individually executed for the first time after corresponding workflows are initiated, the execution results are registered in a column headed 'actual execution result' of the execution result management table 142, for example, with respect to each workflow. Then, when omitting the execution of an operation component satisfying the opposite operation condition, the workflow executing unit 120 reads a corresponding execution result from the execution result management table 142 and sets the read execution result in an execution history database 151.

Note that if the same operation component as the one omitted has been executed at least once in any workflow (i.e., either in the same or a different workflow) after the system is started, the workflow executing unit 120 may set a result obtained by the execution as the execution result of an omitted operation component. In addition, when executing an operation component implementing a given operation for the first time, for example, after a corresponding workflow is initiated or in any workflow after the system is started, the workflow executing unit 120 may not omit but always execute the operation component. In this case, there is no need to prepare execution results in advance, and results obtained by actually executing operation components are used.

Note that the execution history database 151 may be configured, for example, as a part of the workflow management table 131. In the execution history database 151, execution results are set, for example, with respect to each workflow and each operation component. Also, the execution history database 151 may include an omission flag for each operation component, which omission flag indicates that the execution of the operation component has been omitted or not.

(2-3) Implementation of Post-process for Omitted Operation Component

In the workflow definition information, a filter process (editing process) for an execution result of an operation component may be defined to be performed as a post-process of the operation component. Even when the execution of an operation component for which a filter process has been defined is omitted, the workflow executing unit 120 does not omit but executes the filter process. At that time, an execution result obtained in the above-described procedure is used.

Figure 21:
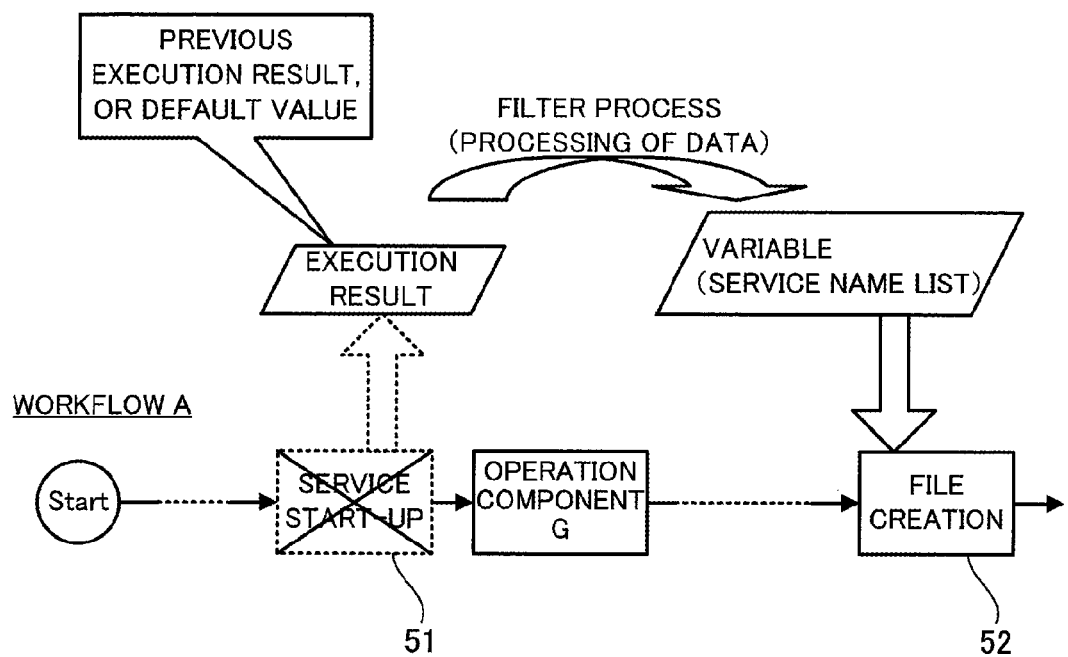
FIG. 21 illustrates an example of a filter process performed when the execution of an operation component is omitted.

FIG. 21 illustrates an example of a filter process performed when the execution of an operation component is omitted. In workflow A of FIG. 21, a variable obtained by filtering the execution result of an operation component 51 for starting a service is subsequently referred to when an operation component 52 for creating a file is executed. According to the example of FIG. 21, when the operation component 52 is executed, the variable obtained by processing an execution result of the operation component 51 by a filter process is set in the file of a service name list. Therefore, if the execution of the operation component 51 is omitted, information needed when the operation component 52 is executed is not obtained.

In view of this, when omitting the execution of the operation component 51, the workflow executing unit 120 in charge of workflow A acquires a result obtained by previously executing the same operation component or a prepared execution result (default value) according to the above-described procedure. Then, the workflow executing unit 120 carries out a filter process on the acquired execution result, and stores a variable obtained from the filter process in the workflow management table 131. This enables the needed information to be referenced without any trouble when the operation component 52 is executed.

As explained above, the operation automation server 100 assembles an optimization control workflow for each exclusive resource by referencing exclusive information of individual workflows collected for exclusive control. Then, based on the optimization control workflows, the operation automation server 100 identifies, across a plurality of workflows, operations carried out on the same exclusive resources and easily detects omissible, redundant operations among the identified operations. The operation automation server 100 also easily detects omissible, redundant operations, for example, by referring to the optimization target component definition table 140.

Omission of the execution of the detected redundant operations streamlines the processing of workflows, which shortens the entire processing time of the workflows. As a result, it is possible to avoid a situation, for example, where service performance decreases due to prolonged downtime of servers and services caused by unnecessary repetition of start and stop of the servers and services. In addition, the number of operating instructions to the business servers is reduced, which reduces the load on the network. Further, because unnecessary operations are not executed, the time for acquiring an exclusive right is reduced, which also results in reducing the entire processing time of the workflows.

In addition, even when omitting the execution of a redundant operation, the operation automation server 100 registers execution result information for the omitted operation in the execution history database 151 by referencing the execution result management table 142. Further, in the case where a post-process, such as a filter process, needs to be performed using the execution result of an operation, the operation automation server 100 generates the execution result and executes the post-process even when the execution of the operation has been omitted.

The processes described above ensure the successful execution of each subsequent operation that references the execution result of an omitted operation. That is, the operation automation server 100 is able to omit the execution of redundant operations without affecting the execution of subsequent operations.

Next explained is reassembly of an optimization control workflow. The exclusive control unit 110 reassembles an optimization control workflow when one of the following events occurs:

the execution of an exclusive section is cancelled due to conditional branching; and the execution sequence is changed according to a change in the execution priority.

Figure 22:
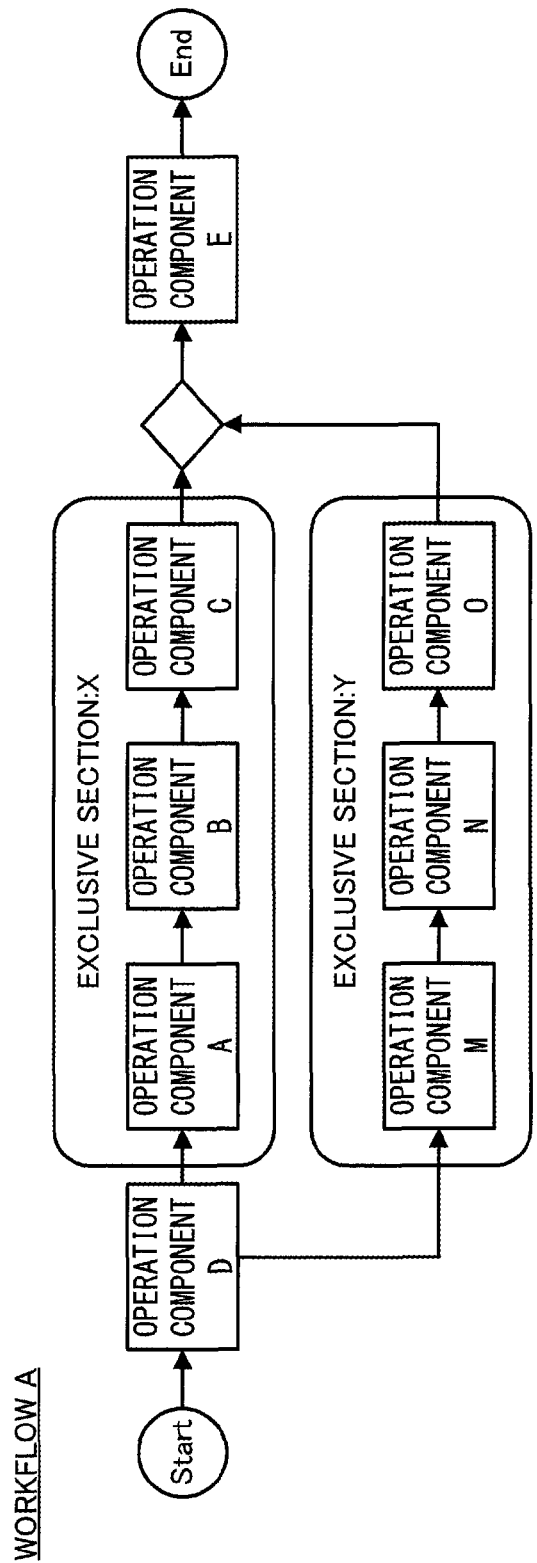
FIG. 22 illustrates an example of a workflow including conditional branching.

FIG. 22 illustrates an example of a workflow including conditional branching. In workflow A of FIG. 22, operation component D implements conditional branching. According to the execution result of operation component D, either one of [exclusive section: X] and [exclusive section: Y] is executed. When the execution of workflow A is started (that is, prior to the execution of operation component D), the exclusive control unit 110 registers exclusive information of both the branches of the conditional branching (that is, exclusive information of the individual exclusive resources X and Y) in the exclusive information management table 135. The exclusive control unit 110 assembles an optimization control workflow for each of exclusive resources X and Y. Subsequently, when the execution of operation component D is completed, one of [exclusive section: X] and [exclusive section: Y] is determined not to be executed.

Thus, in the case where the execution of operation components of an entire exclusive section is cancelled, an optimization control workflow for an exclusive resource corresponding to the exclusive section needs to be reassembled.

Figure 23:
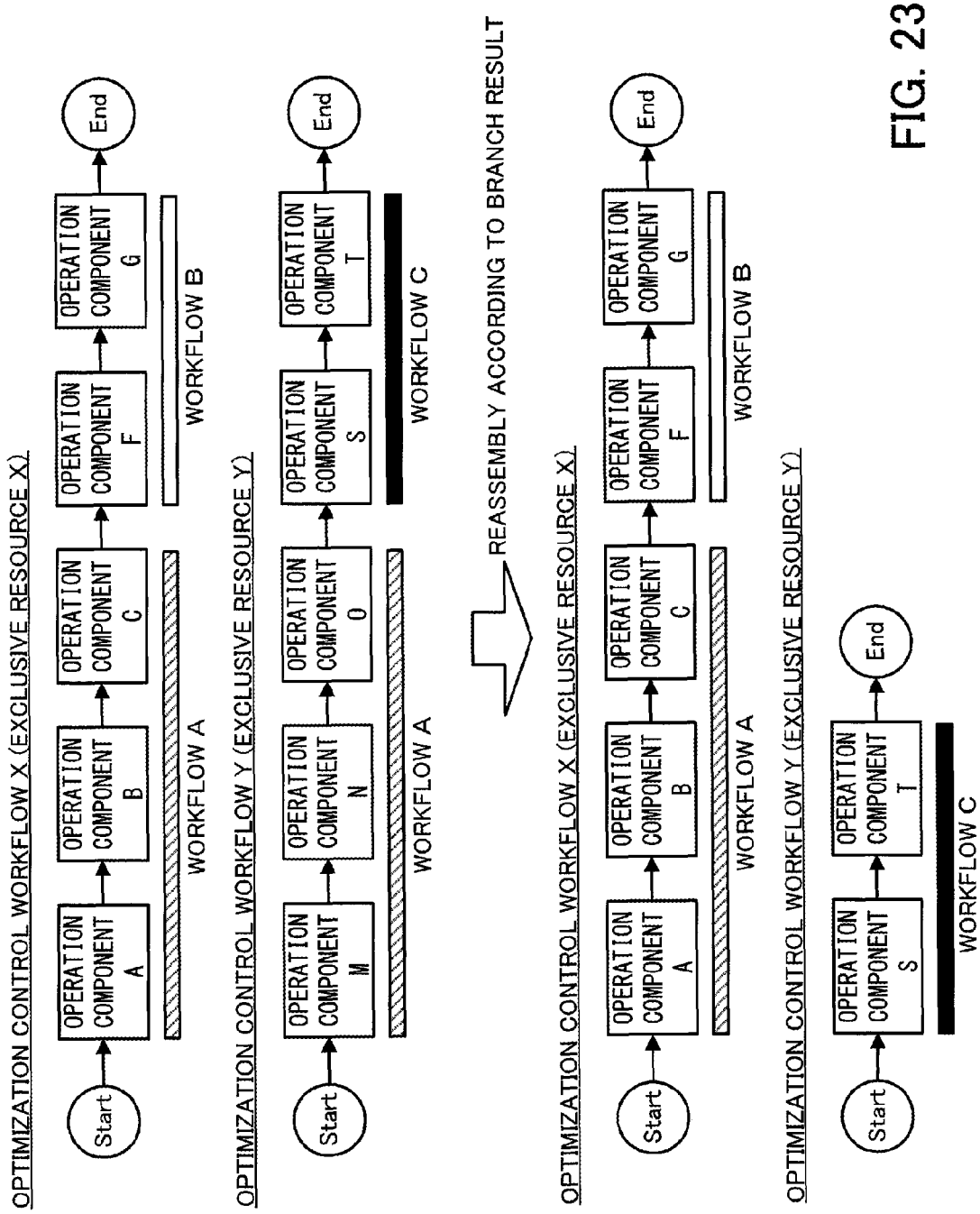
FIG. 23 illustrates an example of reassembling an optimization control workflow in association with the conditional branching.

FIG. 23 illustrates an example of reassembling an optimization control workflow in association with conditional branching. The example of FIG. 23 illustrates a case where workflows B and C are executed with workflow A of FIG. 22. Prior to the execution of operation component D (refer to FIG. 22) for implementing conditional branching, optimization control workflow X for exclusive resource X and optimization control workflow Y for exclusive resource Y are assembled, as illustrated in the upper part of FIG. 23.

Subsequently, for example, when the execution of operation component A is determined according to an execution result of operation component D, the workflow executing unit 120 in charge of workflow A requests the exclusive control unit 110 to delete information of operation components M, N, and O. Upon receiving the deletion request, the exclusive control unit 110 deletes the information of operation components M, N, and O from the workflow management table 131, and also reassembles optimization control workflow Y for exclusive resource Y. As illustrated in the lower part of FIG. 23, the information of operation components M, N, and O included in workflow A is deleted from optimization control workflow Y.

Thus, when an operation component for implementing conditional branching is executed and then a branch destination is determined, an optimization control workflow is reassembled if it includes an exclusive section whose execution has been cancelled due to the destination determination. Herewith, even when workflows include an operation component for implementing conditional branching, the operation automation server 100 is able to identify omissible, redundant operations properly. In addition, the operation automation server 100 is able to identify omissible, redundant operations properly while causing individual workflows to be executed, without the need to wait for a branch destination of each conditional branching in the workflows to be determined. Therefore, it is possible to properly identify redundant operations and omit the execution of the redundant operations without a decrease in the execution efficiency of each workflow.

Figure 24:
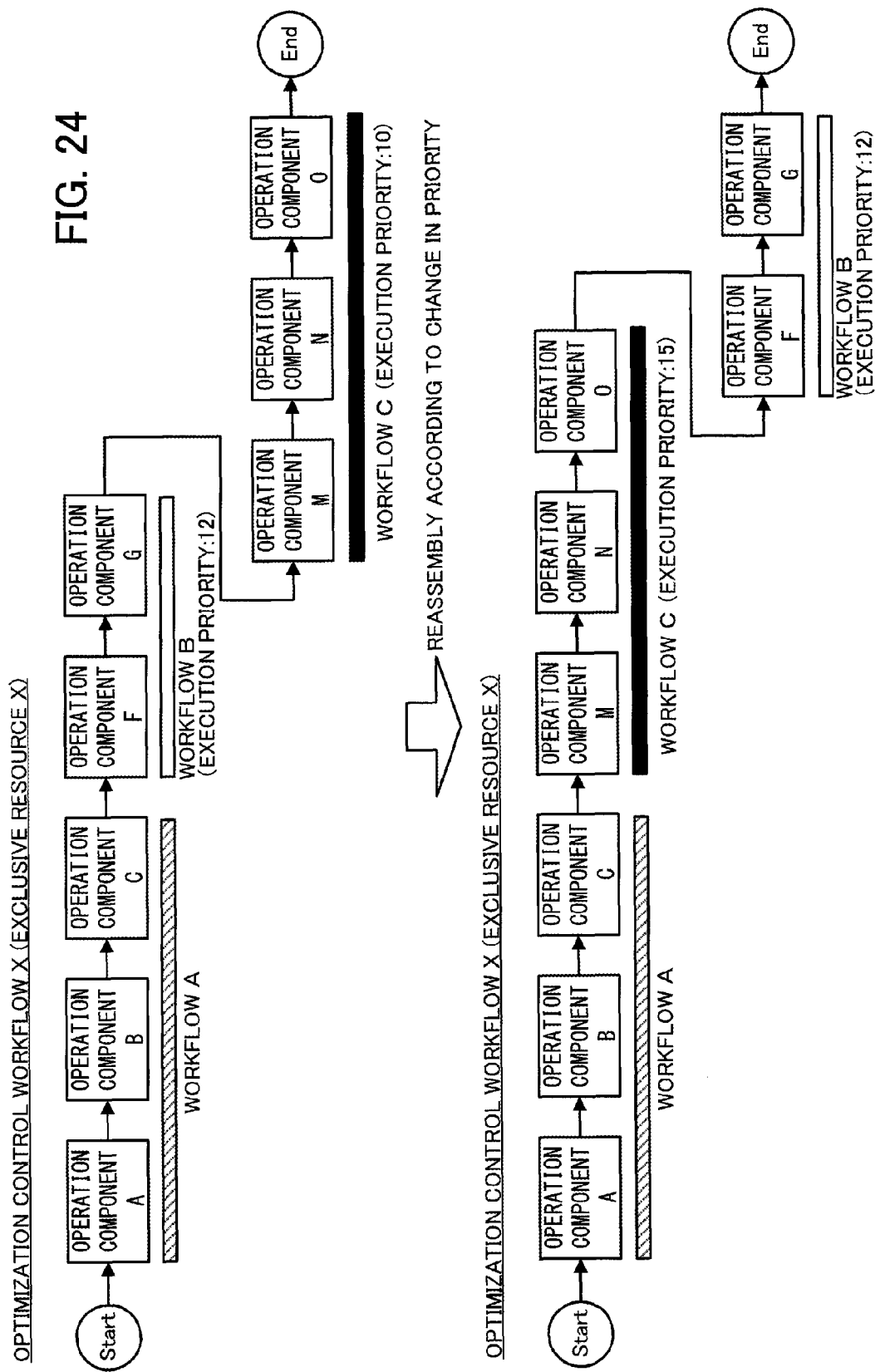
FIG. 24 illustrates an example of reassembling the optimization control workflow in response to a change in execution priority.

FIG. 24 illustrates an example of reassembling an optimization control workflow in response to a change in the execution priority. As mentioned above, the execution priority of individual exclusive sections in running workflows continually changes according to the operational importance, the remaining time before the scheduled time of completion, and the like. Such a change in the execution priority may cause a change in the execution sequence of the exclusive sections. Also, when there is a change in the execution sequence according to a change in the execution priority, a corresponding optimization control workflow needs to be reassembled.

Assume in the example of FIG. 24 that, when optimization control workflow X for exclusive resource X is assembled for the first time, the exclusive section of workflow B has higher execution priority than that of workflow C. In this case, as for the execution sequence in optimization control workflow X, operation components F and G included in workflow B come before operation components M, N, and O included in workflow C, as illustrated in the upper part of FIG. 24.

Assume that subsequently there is a change in the execution priority of the exclusive section of workflow C and, then, the exclusive section of workflow C has higher execution priority than that of workflow B. In this case, optimization control workflow X is reassembled in such a manner that operation components F and G of workflow B come after operation components M, N, and O of workflow C, as illustrated in the lower part of FIG. 24.

Thus, even when a change in the execution status of workflows causes a change in the execution priority of exclusive sections of the workflows, the operation automation server 100 reassembles a corresponding optimization control workflow, to thereby properly identify omissible, redundant operations. Note that also in the case where a new workflow including operation components for operating the same exclusive resource is initiated, a corresponding optimization control workflow is reassembled in view of the execution priority of an exclusive section of the new workflow.

Figure 25:
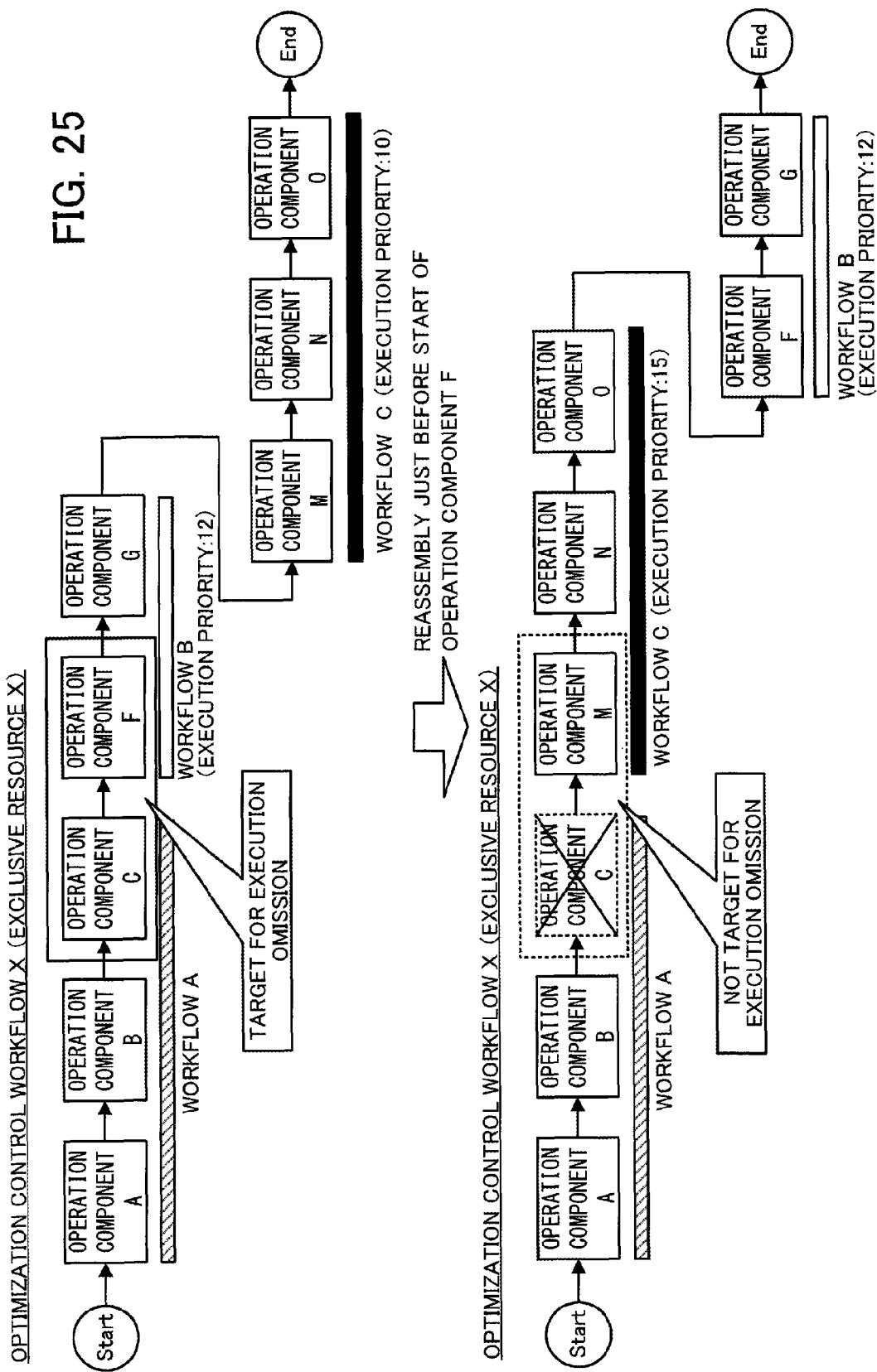
FIG. 25 illustrates an example of a change in a target for execution omission due to reassembly of the optimization control workflow.

Next descried are correction processes in response to a change in a target for execution omission. FIG. 25 illustrates an example of a change in a target for execution omission due to reassembly of an optimization control workflow. When an optimization control workflow is reassembled according to the execution of conditional branching or a change in the execution priority, as described above, an operation component targeted for execution omission may change due to a change in the execution sequence of operation components. For example, as illustrated in FIG. 25, an operation component having been a target for execution omission may become no longer a target for execution omission.

Assume in FIG. 25 that operation component C of workflow A and operation component F of workflow B implement, for example, operations opposite to each other, and therefore both of these are targets for execution omission prior to a change in the execution priority. Subsequently, when the execution of operation component C is omitted, the exclusive section of workflow C has higher execution priority than the exclusive section of workflow B. At this point in time, reassembly of optimization control workflow takes place, and the operation component to be executed following operation component C is changed from operation component F to operation component M of workflow C.

Due to such a change in the execution sequence, operation component C becomes no longer a target for execution omission. In this case, operation component C whose execution has been once omitted needs to be executed in order to ensure successful execution of workflow C. Operation component C is originally an operation component to be executed as a part of workflow A. However, the processing of workflow A has proceeded as if the execution of operation component C was completed successfully. Therefore, operation component C may not be executed as a part of workflow A anymore.

In view of this, one of the following correction processes is carried out in order to execute an operation component whose execution has been omitted. Assume here that an operation component whose execution was omitted but has become needed, (that is, an operation component needing correction) is 'operation component C' and a workflow including operation component C is 'workflow A'.

(Correction Process 1)

In the case where, in workflow A, an operation component following operation component C is in a state waiting for acquiring an exclusive right over a different exclusive resource, the exclusive control unit 110 brings the control of workflow A back to the previous operation component (i.e., operation component C). In this case, the workflow executing unit 120 in charge of workflow A executes operation component C.

(Correction Process 2)

In the case where, in workflow A, an activity involving a process according to an operation by a person is defined after operation component C and the activity is in a state waiting for the operation of a person to be made, the exclusive control unit 110 cancels the execution of the activity and brings the control of workflow A back to the previous operation component (i.e., operation component C). In this case also, the workflow executing unit 120 in charge of workflow A executes operation component C.

(Correction Process 3)

In the case where the processing of workflow A has been further ahead of the operation component following operation component C, or where the execution of workflow A has already been completed, the exclusive control unit 110 executes operation component C on behalf of the workflow executing unit 120.

The individual correction processes above enable the operation automation server 100 to omit the execution of redundant operations while stopping the processing of workflows as little as possible. In addition, even when omitting the execution of redundant operations in this manner, it is possible to ensure performance of operation targets according to workflows. For example, the likelihood of operations of operation target servers and services being interfered is reduced.

Figure 26:
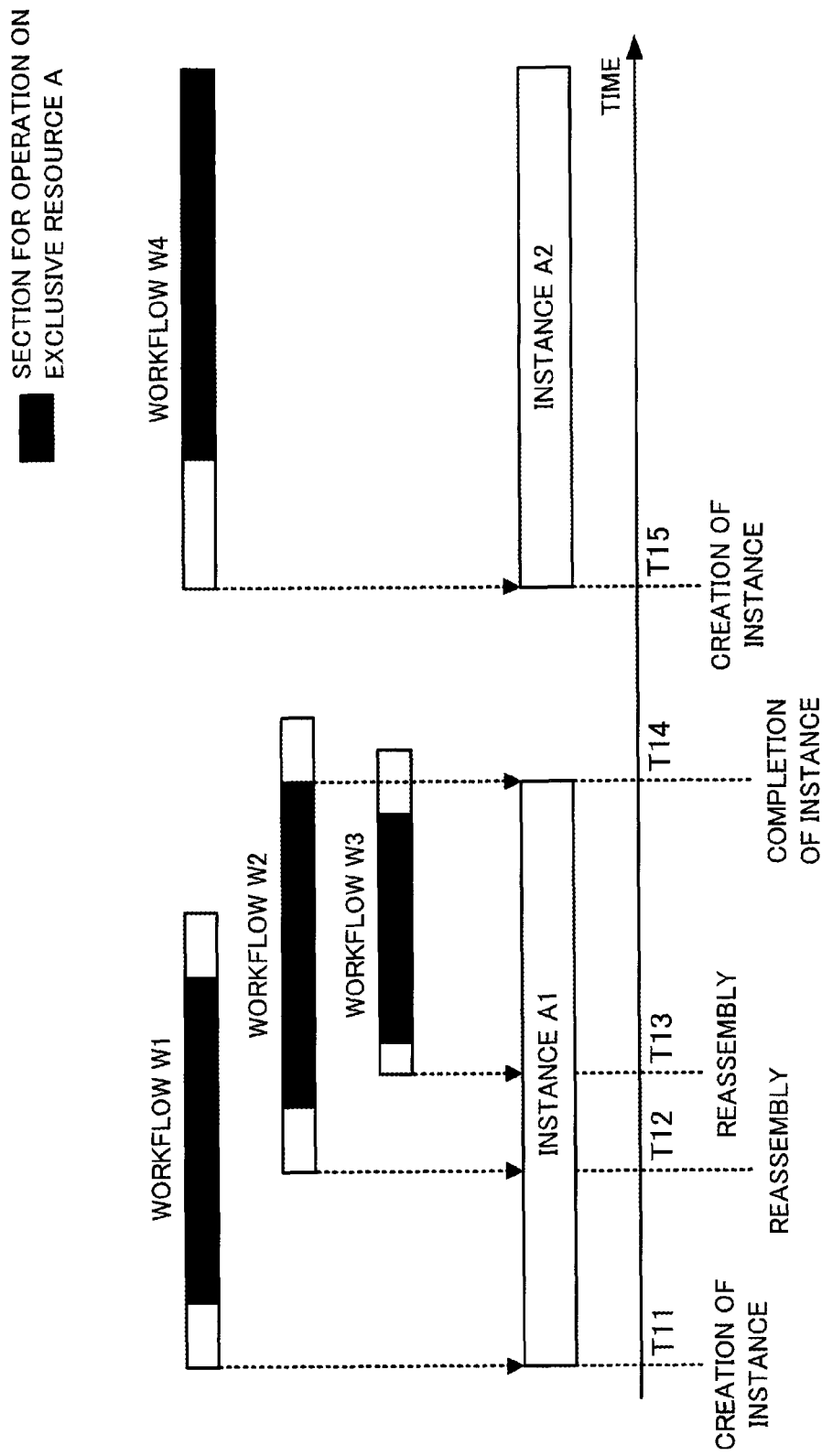
FIG. 26 illustrates timing for assembling the optimization control workflow.

FIG. 26 illustrates timing for assembling an optimization control workflow. Optimization control workflows are managed in the following manner with respect to individual exclusive resources. As an example, an optimization control workflow for exclusive resource A is described here. When the execution of workflow W1 including operation components for operating exclusive resource A is started, the exclusive control unit 110 creates instance A1 of the optimization control workflow for exclusive resource A, and registers the information in the optimization control workflow management table 141 (time T11). Subsequently, when new workflows (workflows W2 and W3 according to the example of FIG. 26) including operation components for operating exclusive resource A are individually executed, the exclusive control unit 110 reassembles the optimization control workflow for exclusive resource A (times T12 and T13).

When no more operation component for operating exclusive resource A is running, the exclusive control unit 110 ends instance A1 of the optimization control workflow for exclusive resource A (time T14). Then, when the execution of new workflow W4 including operation components for operating exclusive resource A is started, the exclusive control unit 110 creates instance A2 of an optimization control workflow for exclusive resource A, and registers the information in the optimization control workflow management table 141 (time T15).

As just described, when the execution of even one workflow including operation components for operating an exclusive resource is started, an optimization control workflow corresponding to the exclusive resource is assembled. In addition, each time a new workflow including operation components for operating the same exclusive resource is executed, the optimization control workflow is reassembled. In this manner, omissible, redundant operations are detected dynamically.

Next described is a process of displaying execution results of optimization control workflows. The exclusive control unit 110 stores execution information of each optimization control workflow in the execution history database 151. The execution information includes, for example, execution results of corresponding operation components, information regarding execution omission for each of the operation components (for example, an omission flag), and information indicating workflows having actually processed the operation components. Based on information stored in the execution history database 151, the exclusive control unit 110 sends the execution information of optimization control workflows to a terminal of an administrator, to thereby cause the execution information to be displayed on a screen of the terminal. This allows the administrator to easily check the execution information. The information to be displayed includes the execution status of the optimization, the presence or absence of operation components executed by correction control, and results of the execution by correction control.

FIG. 27 illustrates an example of a display of an optimization control workflow list. An optimization control workflow list display screen 61 of FIG. 27 includes columns for individual data items of exclusive resource name; instance name; data and time of execution; and status. In the exclusive resource name column, each entry contains a name for identifying an exclusive resource. In the instance name column, each entry contains a name for identifying an instance of a corresponding optimization control workflow. In the date and time of execution column, each entry contains a date and time of execution of a corresponding instance. The date and time of execution stored in each entry may indicate the date and time of the start and end of the execution. In the status column, each entry contains status information indicating whether a corresponding instance has been completed or is running. One or more entries in the instance name column are associated with each entry in the exclusive resource name column. Each entry in the date and time of execution column and the status column is associated with a corresponding entry in the instance name column.

The optimization control workflow list display screen 61 described above allows the administrator to easily understand how many optimization control workflows have been assembled for each exclusive resource and what the status of each optimization control workflow is.

Figure 28:
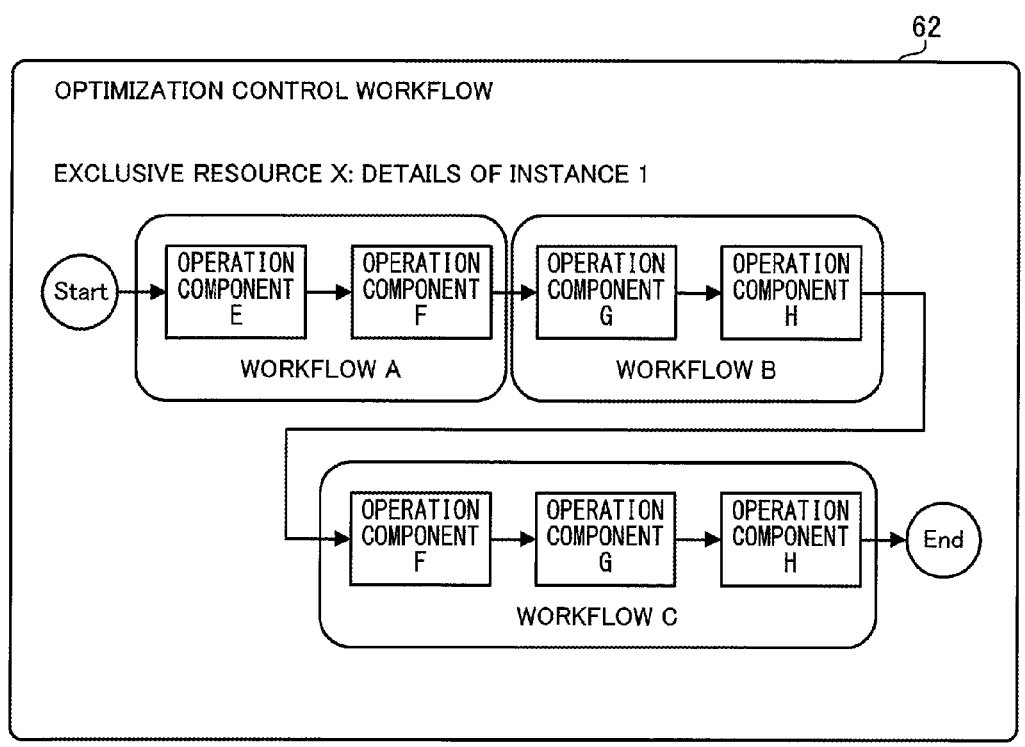
FIG. 28 illustrates a display example of content of the optimization control workflow.

FIG. 28 illustrates a display example of content of an optimization control workflow. An optimization control workflow display screen 62 of FIG. 28 displays information of operations included in an optimization control workflow, with respect to each instance for each exclusive resource. This allows the administrator to easily understand the content of each optimization control workflow. According to the example of FIG. 28, the optimization control workflow display screen 62 includes a list of operation components included in the optimization control workflow and the execution sequence of the operation components. On the optimization control workflow display screen 62, operation components whose execution has been omitted may be displayed in a different color, for example, to facilitate the administrator to visually distinguish the omitted operation components from others.

Next described are examples of information tables used in the processing of the operation automation server 100.

FIG. 29 illustrates an example of a workflow management table. The workflow management table 131 is used to manage operation components included in individual workflows and generated when the workflows are registered. The workflow management table 131 includes columns for individual data items of workflow number (No.); component number; operation component name; operation target; operation service or resource; output; and next component number.

In the workflow number column, each entry contains the number for identifying a workflow. In the component number column, each entry contains the number of an operation component included in a corresponding workflow. In the operation component name column, each entry contains the name of a corresponding operation component (operation content).

In the operation target column, each entry contains, as an input value, a variable corresponding to the name of an operation target server, device, or the like. In the operation service or resource column, each entry contains, as an input value, a variable corresponding to the name of a service or resource to be operated. In the output column, each entry contains the variable to which an output value is assigned. In the next component number column, each entry contains the number indicating an operation component to be executed next in a corresponding workflow.

FIG. 30 illustrates an example of an operation component definition table. The operation component definition table 132 prestores therein definition information of operation components. The operation component definition table 132 includes columns for individual data items of operation component name; component type; operation/confirmation target; and operational importance.

In the operation component name column, each entry contains the name of an operation component (operation content). In the component type column, each entry contains the type of a corresponding operation component. Operation components are classified into, for example, the following types: operation-related; confirmation-related; notification-related; and setting-related. In the operation/confirmation target column, each entry contains the operation target or confirmation target of a corresponding operation component. In the operational importance column, each entry contains information indicating operational importance of a corresponding operation component.

Figure 31:
FIG. 31 illustrates an example of a variable management table.

FIG. 31 illustrates an example of a variable management table. The variable management table 133 is a table for managing variable names and variable values used by instances, which are information identifying entities of defined workflow information. The variable management table 133 includes columns for individual data items of instance number; workflow number; variable name; and variable value. In the instance number column, each entry contains the number for identifying an instance. In the workflow number column, each entry contains the number for identifying a workflow. In the variable name column, each entry contains a variable name. In the variable value column, each entry contains a value set for a corresponding variable.

FIG. 32 illustrates an example of an instance management table. The instance management table 134 stores therein information managed for each instance. The instance management table 134 includes columns for individual data items of instance number; workflow number; component number (currently being executed); host name; service name; user identifier (ID); initiation method coefficient; exclusive section number'; and 'scheduled time of completion.

In the instance number column, each entry contains the number for identifying an instance. In the workflow number column, each entry contains the number for identifying a workflow. In the component number (currently being executed) column, each entry contains the number for identifying, within a corresponding workflow, an operation component corresponding to the current processing point. In the host name column, each entry contains the name of a host. In the service name column, each entry contains the name of a service. In the user identifier column, each entry contains information for identifying a user (user identifier). In the initiation method coefficient column, each entry contains an initiation method coefficient. In the exclusive section number column, each entry contains the number for identifying an exclusive section. In the scheduled time of completion column, each entry contains the scheduled time for completing a corresponding workflow.

FIG. 33 illustrates an example of an exclusive information management table. The exclusive information management table 135 is used to manage information of exclusive sections. The exclusive information management table 135 includes columns for individual data items of exclusive section number; component number (lock start); component number (lock release); execution priority; and operational urgency. In the exclusive section number column, each entry contains the number for identifying an exclusive section. In the component number (lock start) column, each entry contains the number for identifying the first operation component of a corresponding exclusive section. In the component number (lock release) column, each entry contains the number for identifying the last operation component of a corresponding exclusive section. In the execution priority column, each entry contains the degree of execution priority of a corresponding exclusive section. In the operational urgency column, each entry contains the degree of operational urgency of a corresponding exclusive section.

FIG. 34 illustrates an example of an exclusive right acquisition history table. The exclusive right acquisition history table 136 manages information on exclusive right (execution right) acquisition history of exclusive sections. The exclusive right acquisition history table 136 includes columns for individual data items of instance number; workflow number; exclusive section number; start-waiting time; start time; and completion time.

In the instance number column, each entry contains the number for identifying an instance. In the workflow number column, each entry contains the number for identifying a workflow. In the exclusive section number column, each entry contains the number for identifying an exclusive section. In the start-waiting time column, each entry contains the waiting time until a corresponding exclusive section acquires an exclusive right (execution right). In the start time column, each entry contains the time when a corresponding exclusive section acquires an exclusive right (execution right). In the completion time column, each entry contains the completion time of operations of a corresponding exclusive section after the exclusive section acquires an exclusive right (execution right) and executes the operations.

FIG. 35 illustrates an example of a user coefficient table. The user coefficient table 137 prestores therein user coefficients for individual users. The user coefficient table 137 includes columns for individual data items of user identifier; and user coefficient. In the user identifier column, each entry contains information for identifying a user (user identifier). In the user coefficient column, each entry contains the user coefficient of a corresponding user identifier.

FIG. 36 illustrates an example of an initiation method coefficient table. The initiation method coefficient table 138 prestores therein initiation method coefficients for individual initiation methods. The initiation method coefficient table

138 includes columns for individual data items of initiation method; and initiation method coefficient. In the initiation method column, each entry contains a workflow initiation method. In the initiation method coefficient column, each entry contains the coefficient of a corresponding initiation method.

Figure 37:
FIG. 37 illustrates an example of a time coefficient table.

FIG. 37 illustrates an example of a time coefficient table. The time coefficient table 139 prestores therein time coefficients for individual periods of time. The time coefficient table 139 includes columns for individual data items of remaining time; and time coefficient. In the remaining time column, each entry contains the remaining time until a scheduled time of completion. In the time coefficient column, each entry contains the time coefficient of corresponding remaining time.

Next described is the optimization target component definition table 140. As described above, the optimization target component definition table 140 holds lists of operation components targeted for optimization, and includes the following two tables.

FIG. 38 illustrates an example of one of the optimization target component definition tables. An optimization target component definition table 140*a* prestores therein operation components subject to the consecutive execution condition. The optimization target component definition table 140*a* includes columns for individual data items of operation component; and option.

In the operation component column, each entry contains the name of an operation component (operation content) subject to the consecutive execution condition. In the option column, each entry contains the variable assignable to a corresponding operation component. A plurality of entries in the option column may be associated with each entry in the operation component column.

When extracting two consecutive operation components having the same name from an optimization control workflow, the exclusive control unit 110 determines that the execution of the latter one of the operation components is omissible if the name has been registered in the optimization target component definition table 140*a*.

FIG. 39 illustrates an example of the other optimization target component definition table. An optimization target component definition table 140*b* prestores therein operation components subject to the opposite operation condition. The optimization target component definition table 140*b* includes columns for individual data items of Go; and Back, each of which is provided with columns for individual data items of operation component; and option.

In the operation component column, each entry contains the name of an operation component (operation content). In the option column, each entry contains the variable assignable to a corresponding operation component. A plurality of entries in the option column may be associated with each entry in the operation component column. An operation component registered in the Go column and a corresponding operation component registered in the Back column form a pair of operation components carrying out operations opposite to each other.

The exclusive control unit 110 identifies omissible operation components satisfying the opposite operation condition, for example, in the following procedure. The exclusive control unit 110 identifies, in an optimization control workflow, an operation component registered in the Go column of the optimization target component definition table 140*b*. Then, the exclusive control unit 110 determines whether an operation component following the identified operation component in the optimization control workflow has been registered in the Back column, in association with the identified operation component. If such an operation component has been registered in the Back column, the exclusive control unit 110 determines that the execution of the identified operation component and the following operation component is omissible.

FIG. 40 illustrates an example of an optimization control workflow management table. The optimization control workflow management table 141 is used to manage optimization control workflows, and includes columns for individual data items of optimization control workflow number; component number; operation component; workflow number; omission flag; execution wait; next component number; and next component number after omission.

In the optimization control workflow number column, each entry contains the number for identifying an optimization control workflow. In the component number column, each entry contains the number for identifying an operation component included in a corresponding optimization control workflow. In the operation component column, each entry contains the name of a corresponding operation component (operation content). In the workflow number column, each entry contains the number for identifying a workflow actually including a corresponding operation component.

In the omission flag column, each entry contains information indicating whether the execution of a corresponding operation component is omissible. When indicating that the execution is omissible, the information also indicates whether the operation component satisfies the consecutive execution condition or the opposite operation condition. In the execution wait column, each entry contains the number for identifying an operation component whose execution is waited for.

In the next component number column, each entry contains the number indicating an operation component to be executed next in a corresponding optimization control workflow. In the next component number after omission column, each entry contains the number indicating an operation component to be executed next in a corresponding optimization control workflow in the case where omission of operation component execution takes place.

FIG. 41 illustrates an example of an execution result management table. The execution result management table 142 stores therein information of execution results for individual operation components targeted for execution omission according to the opposite operation condition. The execution result management table 142 includes columns for individual data items of operation component; output information; default value; and actual execution result.

In the operation component column, each entry contains the name of an operation component (operation content) targeted for execution omission according to the opposite operation condition. In the output information column, each entry contains the variable to which an output value (execution result) is assigned. A plurality of entries in the output information column may be associated with each entry in the operation component column. In the default value column, each entry contains the default value to be assigned to the variable registered in a corresponding entry in the output information column. Information is prestored in each entry of the operation component, output information, and default value columns.

In the actual execution result column, each entry contains the value (actual result) assigned, by actual processing, to the variable registered in a corresponding entry in the output information column. According to this embodiment, when each omission target operation component is executed for the first time after the system is started, the execution result is stored in a corresponding entry of the actual execution result column. Alternatively, each time an omission target operation component is executed, the latest execution result may be stored in a corresponding entry of the actual execution result column.

Note that the data item of 'actual execution result' may be provided for each workflow. In this case, when each omission target operation component is executed for the first time in a workflow, the execution result is stored in a corresponding entry of the actual execution result column associated with the workflow. Alternatively, each time an omission target operation component is executed in a workflow, the latest execution result may be stored in a corresponding entry of the actual execution result column associated with the workflow.

Next described are processes carried out by the operation automation server 100 with reference to flowcharts.

Figure 42:
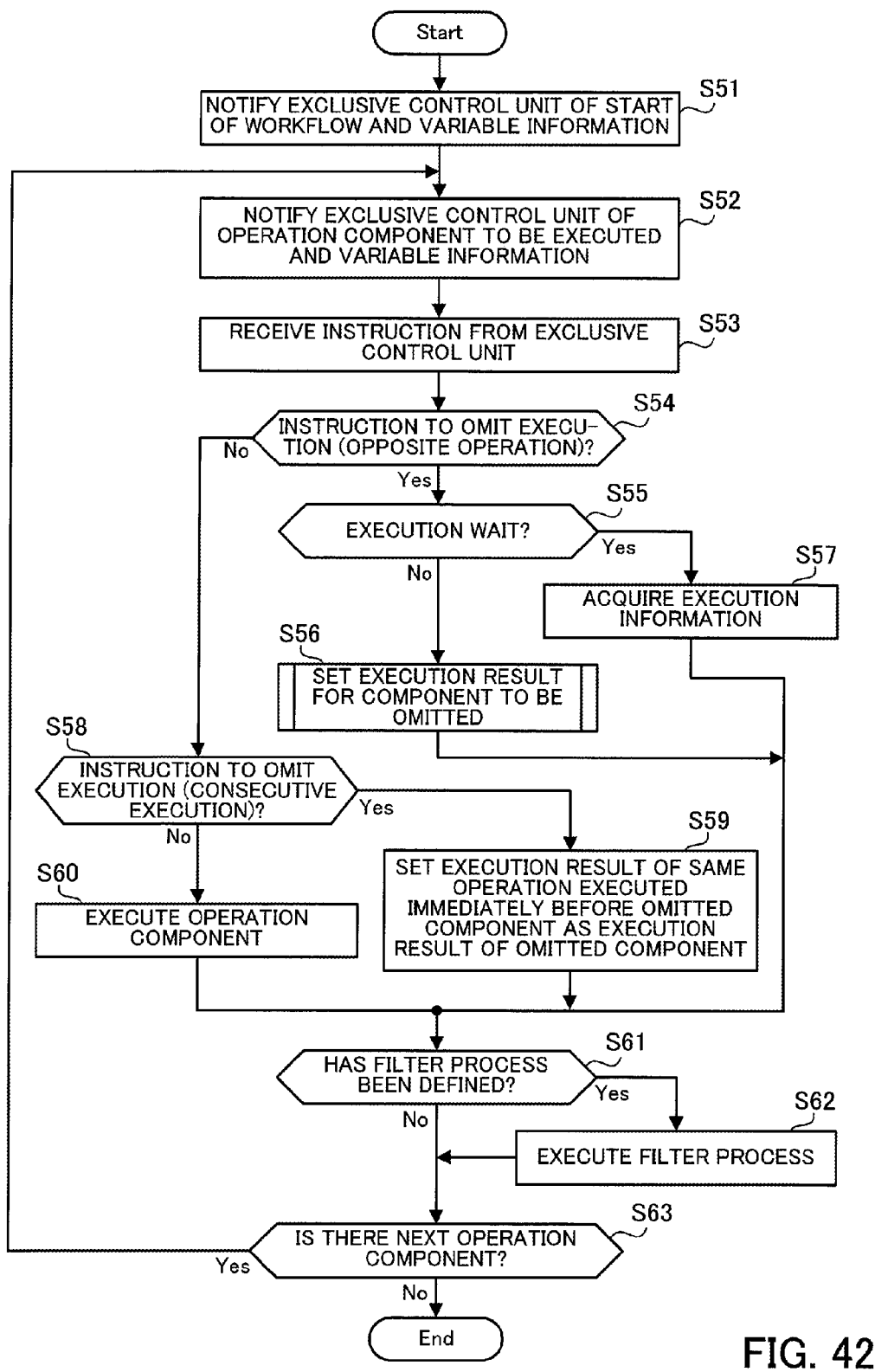
FIG. 42 is a flowchart illustrating an example of a process carried out by a workflow executing unit.

FIG. 42 is a flowchart illustrating an example of a process carried out by a workflow executing unit. The process of FIG. 42 is performed for each workflow by the workflow executing unit 120 in charge of the workflow.

[Step S51] When starting the processing of the workflow, the workflow executing unit 120 notifies the exclusive control unit 110 of the start of the workflow and information of variables to be used in the execution of the workflow. The information of variables includes, for example, a user identifier of a user who has initiated the workflow and a workflow initiation method.

[Step S52] The workflow executing unit 120 determines an operation component to be executed next by referring to the workflow management table 131, and then notifies the exclusive control unit 110 of the start of the execution of the operation component. Specifically, the workflow executing unit 120 notifies the exclusive control unit 110 of the identification number of the operation component to be executed and information of variables to be used by the operation component. After notifying the exclusive control unit 110 of these items, the workflow executing unit 120 enters a state waiting for an instruction from the exclusive control unit 110.

The exclusive control unit 110 determines whether the operation component notified in step S52 is omissible, and issues an instruction according to the determination result to the workflow executing unit 120. The instruction is one of the following: an execution instruction; an instruction to omit the execution according to the consecutive execution condition; and an instruction to omit the execution according to the opposite operation condition. In addition, the instruction to omit the execution according to the opposite operation condition includes information indicating whether to put a corresponding workflow into an execution wait state.

[Step S53] The workflow executing unit 120 receives an instruction from the exclusive control unit 110. The workflow executing unit 120 determines content of the instruction (steps S54, S55, and S58) and carries out processing according to the instruction content.

[Step S54] If the instruction received in step S53 is an instruction to omit the execution according to the opposite operation condition, the process moves to step S55. If the received instruction is other than an instruction to omit the execution according to the opposite operation condition, the process moves to step S58.

[Step S55] If the instruction to omit the execution according to the opposite operation condition indicates to put the workflow into an execution wait state, the process moves to step S57. If not, the process moves to step S56.

[Step S56] The workflow executing unit 120 sets, in the execution history database 151, an execution result for the operation component to be omitted. Details of the process are described in FIG. 43.

[Step S57] An execution wait is indicated by the instruction when, in an optimization control workflow including the operation component whose execution has been instructed to be omitted, there is the same operation component included in a different workflow. In this case, when the same operation component included in the different workflow is executed, the exclusive control unit 110 instructs the workflow executing unit 120 to cancel the execution wait and also passes the execution result of the different workflow to the workflow executing unit 120. The workflow executing unit 120 sets the execution result acquired from the exclusive control unit 110 in the execution history data base 151 as an execution result of the operation component whose execution has been omitted.

[Step S58] If the instruction received in step S53 is an instruction to omit the execution according to the consecutive execution condition, the process moves to step S59. On the other hand, if the received instruction is an execution instruction, the process moves to step S60.

[Step S59] The workflow executing unit 120 acquires, from the execution history database 151, an execution result of the same operation component having been executed immediately before the operation component whose execution has been instructed to be omitted. The workflow executing unit 120 sets the acquired execution result in the execution history database 151 as an execution result of the operation component whose execution is omitted.

[Step S60] The workflow executing unit 120 causes the business server 210 to execute an operation corresponding to the operation component, and then sets the execution result in the execution history database 151.

In addition, if the executed operation component is an operation component subject to the opposite operation condition, registered in the optimization target component definition table 140*b*, the workflow executing unit 120 carries out the following process. That is, if, within the execution result management table 142, no information is set in an entry corresponding to the operation component under the column headed 'actual execution result', the workflow execution unit 120 sets the execution result in the entry of the actual execution result column.

[Step S61] The workflow executing unit 120 determines whether a filter process has been defined for the operation component. If a filter process has been defined, the process moves to step S62. If not, the process moves to step S63.

Note that the content of a filter process corresponding to each operation component may be defined, for example, in the operation component definition table 132 or the workflow management table 131 in association with the operation component.

[Step S62] The workflow executing unit 120 carries out the defined filter process on the execution result.

[Step S63] The workflow executing unit 120 notifies the exclusive control unit 110 of the end of the execution of the operation component. At the same time, based on the workflow management table 131, the workflow executing unit 120 determines whether a next operation component has been registered in the workflow. If there is a next operation component, the processing starting from step S52 is executed for the next operation component. On the other hand, if a next operation component is not present, the workflow executing unit 120 notifies the exclusive control unit 110 of the completion of the workflow and then ends the process.

Figure 43:
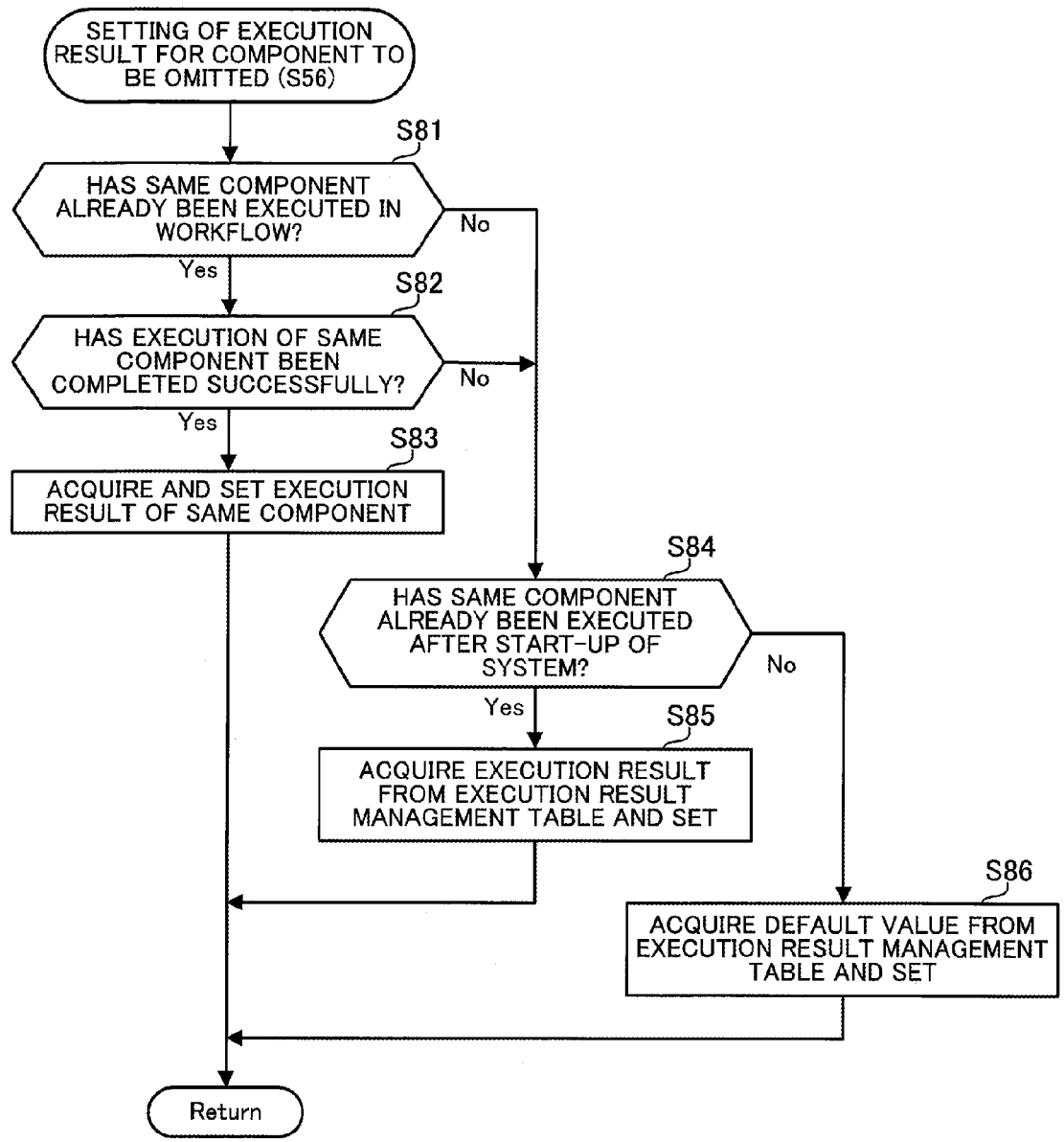
FIG. 43 is a flowchart illustrating an example of a process of setting output information of an operation component whose execution is omitted.

FIG. 43 is a flowchart illustrating an example of a process of setting output information of an operation component whose execution is omitted. The process of FIG. 43 corresponds to step S56 of FIG. 42.

[Step S81] The workflow executing unit 120 determines whether, in a workflow including the operation component whose execution is omitted, the same operation component has already been executed. If the same operation component has already been executed, the process moves to step S82. If not, the process moves to step S84.

[Step S82] The workflow executing unit 120 determines whether the execution of the same operation component has been completed successfully. If the execution has been completed successfully, the process moves to step S83. If not, the process moves to step S84.

[Step S83] The workflow executing unit 120 acquires an execution result of the already executed operation component from the execution history database 151 and, then, sets the acquired execution result in the execution history database 151 as an execution result of the operation component whose execution is omitted.

[Step S84] The workflow executing unit 120 determines whether the same operation component as the operation component whose execution is omitted has already been executed after the system is started. If, within the execution result management table 142, information has been registered in an entry corresponding to the operation component under the column headed 'actual execution result', the workflow executing unit 120 determines that the same operation component has already been executed. If the same operation component has already been executed, the process moves to step S85. If not, the process moves to step S86.

[Step S85] The workflow executing unit 120 reads, from the execution result management table 142, information registered in an entry corresponding to the operation component under the column headed 'actual execution result' and, then, sets the read information in the execution history database 151 as an execution result of the operation component whose execution is omitted.

[Step S86] The workflow executing unit 120 reads, from the execution result management table 142, information registered in an entry corresponding to the operation component under the column headed 'default value' and, then, sets the read information in the execution history database 151 as an execution result of the operation component whose execution is omitted.

Figure 44:
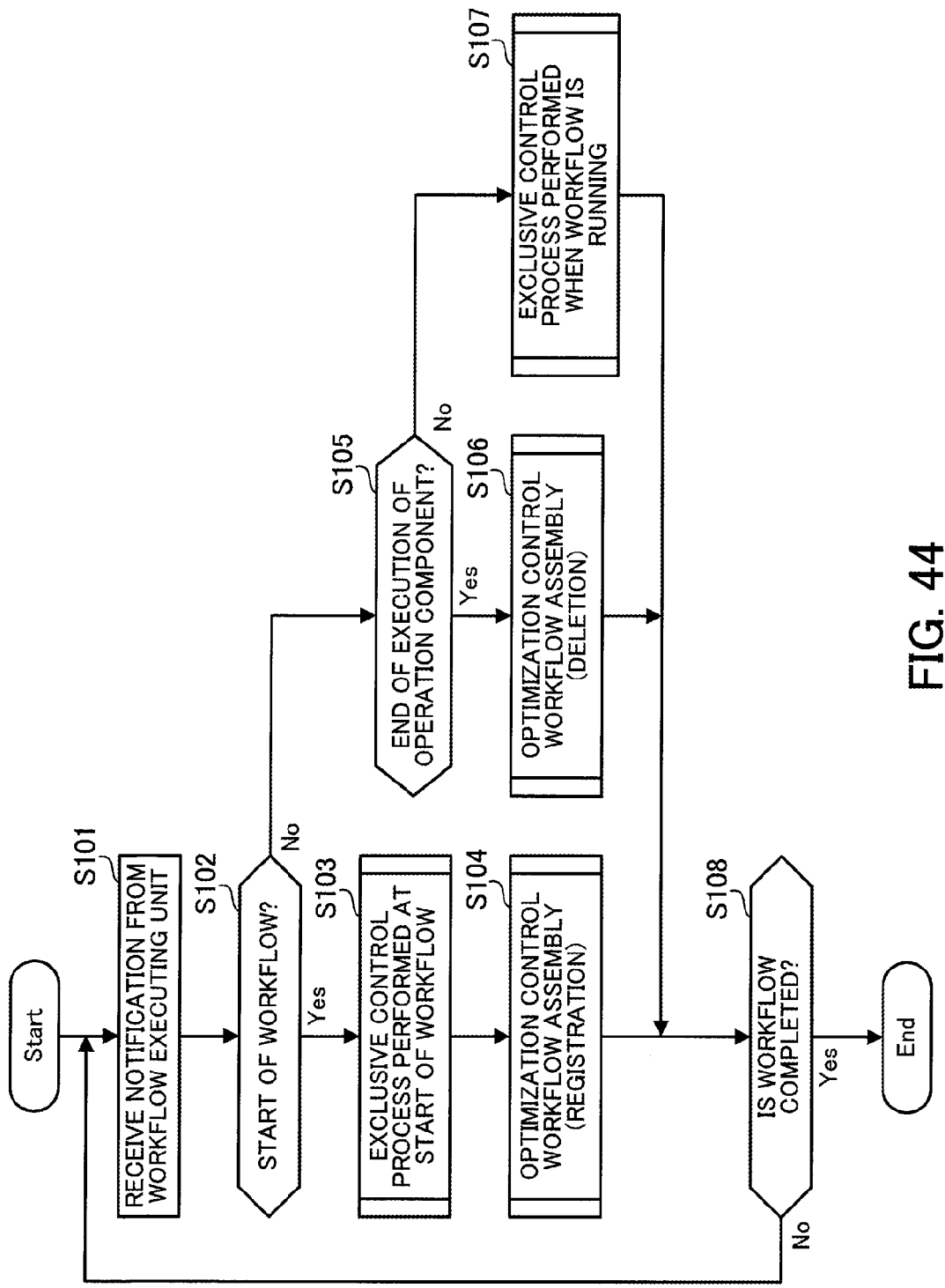
FIG. 44 is a flowchart illustrating an example of a process carried out by an exclusive control unit.

FIG. 44 is a flowchart illustrating an example of a process carried out by an exclusive control unit. The process of FIG. 44 is carried out for each workflow.

[Step S101] The exclusive control unit 110 waits for notification sent from the workflow executing unit 120. When the exclusive control unit 110 receives notification from the workflow executing unit 120, the process moves to a subsequent step S102.

[Step S102] If the notification received by the exclusive control unit 110 is the notification of the start of a workflow output in step S51 of FIG. 42, the process moves to step S103. In the notification is other kind of notification, the process moves to step S105.

[Step S103] The exclusive control unit 110 executes an exclusive control process designed for the case where the workflow is started. Details of the process are described in FIG. 45.

[Step S104] The exclusive control unit 110 executes an optimization control workflow assembling process (registration). Details of the process are described in FIG. 50.

[Step S105] If the notification received by the exclusive control unit 110 is the notification of ending the execution of an operation component, output in step S63 of FIG. 42, the process moves to step S106. On the other hand, if the notification received by the exclusive control unit 110 is the notification of starting the execution of an operation component, output in step S52 of FIG. 42, the process moves to step S107.

[Step S106] The exclusive control unit 110 executes an optimization control workflow assembling process (deletion). Details of the process are described in FIG. 52.

[Step S107] The exclusive control unit 110 executes an exclusive control process designed for the case where a workflow is running. Details of the process are described in FIG. 48.

[Step S108] If the workflow has yet to be completed, the process returns to step S101. On the other hand, if the workflow is completed, the exclusive control unit 110 ends the process for the workflow. The exclusive control unit 110 determines completion of the workflow by receiving the notification of the completion of the workflow, output in step S63 of FIG. 42.

Figure 45:
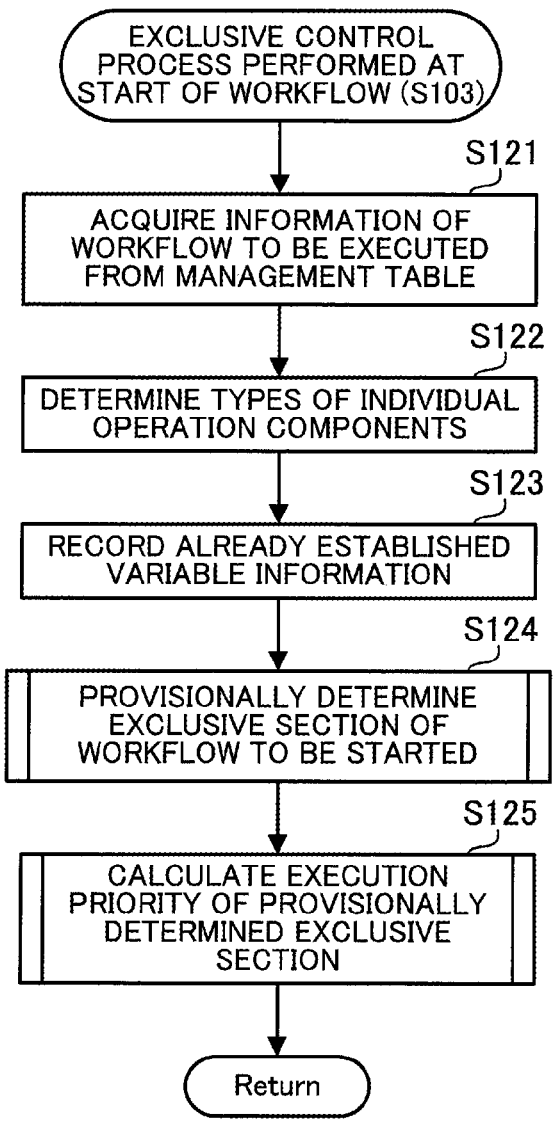
FIG. 45 is a flowchart illustrating an example of an exclusive control process performed at start of a workflow.

FIG. 45 is a flowchart illustrating an example of the exclusive control process performed at the start of a workflow.

[Step S121] The exclusive control unit 110 acquires, from the workflow management table 131, information of an execution target workflow (i.e., the workflow, the execution start of which is notified in step S101 of FIG. 44).

[Step S122] The exclusive control unit 110 acquires, from the operation component definition table 132, 'component types' corresponding to 'operation component names' included in the execution target workflow information. Herewith, the exclusive control unit 110 determines types of operation components included in the execution target workflow information.

[Step S123] The exclusive control unit 110 records, in the variable management table 133, variable information already established at the start of the workflow. The variable information already established at the start of the workflow is, for example, variables to which values are assigned in advance and variables supplied by the workflow executing unit 120.

[Step S124] The exclusive control unit 110 provisionally determines an exclusive section of the workflow to be started. Details of the process are described in FIG. 46.

[Step S125] The exclusive control unit 110 calculates execution priority of the provisionally determined exclusive section. Details of the process are described in FIG. 47.

Figure 46:
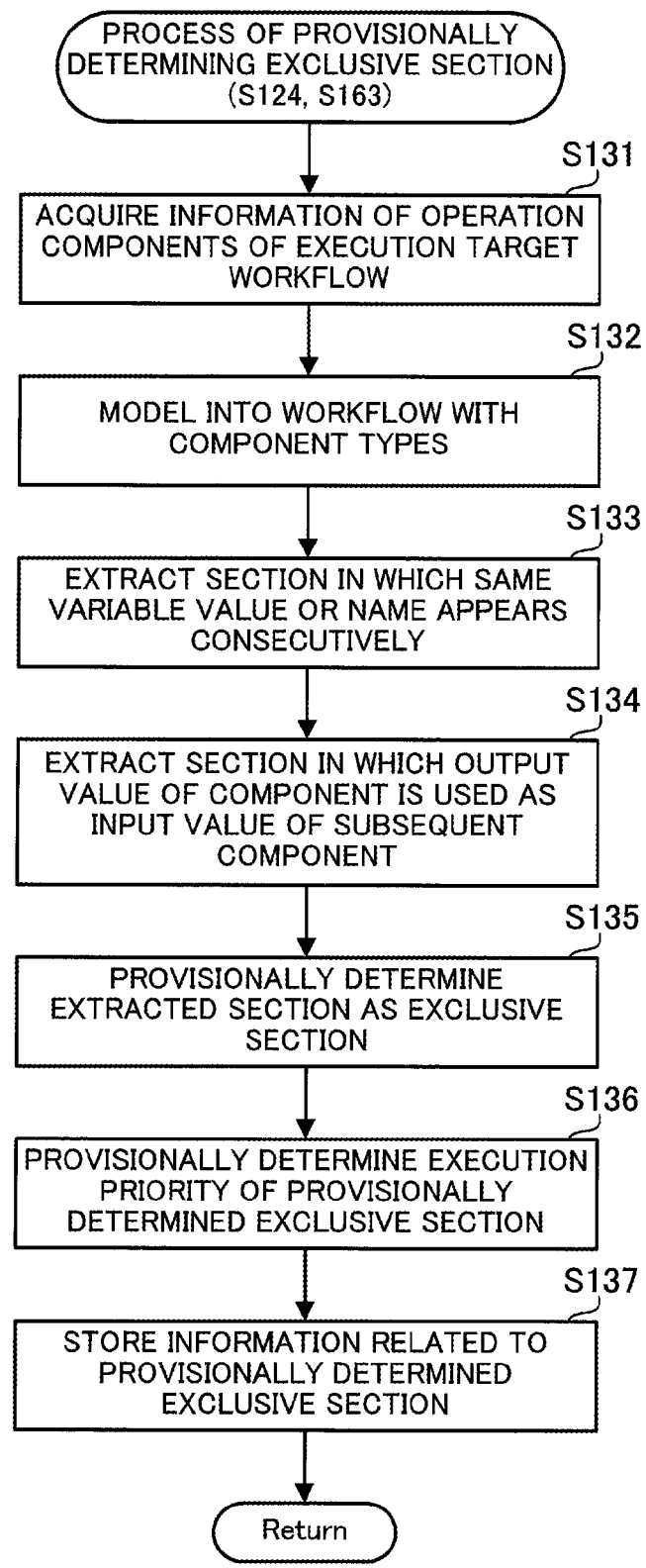
FIG. 46 is a flowchart illustrating an example of a process of provisionally determining an exclusive section.

FIG. 46 is a flowchart illustrating an example of a process of provisionally determining an exclusive section. The process of FIG. 46 corresponds to each of step S124 of FIG. 45 and step S163 of FIG. 48 to be described later.

[Step S131] The exclusive control unit 101 acquires, from the workflow management table 131, information of operation components included in the execution target workflow.

[Step S132] The exclusive control unit 110 models the operation components of the execution target workflow based on the operation component definition table 132. That is, based on the operation component definition table 132, the exclusive control unit 110 converts the operation components of the execution target workflow into corresponding component types.

[Step S133] Using the workflow management table 131 and the variable management table 133, the exclusive control unit 110 extracts consecutive operation components having the same variable value or variable name from the execution target workflow. That is, based on entries in the component number column and the next component number column of the workflow management table 131, the exclusive control unit 110 determines the operation order of the component types (modeled operation components) of the execution target workflow. Then, based on the variable management table 133, the exclusive control unit 110 determines whether the same variable value or variable name appears in consecutive operation components in the operation order. As a result, the exclusive control unit 110 extracts, from the workflow management table 131, a section of consecutive operation components having the same variable value or the same variable name in the operation order.

[Step S134] Using the data items under the columns headed 'operation target', 'operation service or resource', and 'output' in the workflow management table 131, the exclusive control unit 110 extracts, according to the operation order, a section in which an output value (execution result) of an operation component is used as an input value of the subsequent operation component.

[Step S135] The exclusive control unit 110 provisionally determines the section extracted in step S133 or S134 as an exclusive section.

[Step S136] The exclusive control unit 110 provisionally determines execution priority of the provisionally determined exclusive section based on the operation component definition table 132, the user coefficient table 137, the initiation method coefficient table 138, and the time coefficient table 139.

That is, the exclusive control unit 110 acquires, from the operation component definition table 132, operational importance corresponding to the individual component types included in the provisionally determined exclusive section, and sums the operational importance. In addition, the exclusive control unit 110 acquires, from the user coefficient table 137, a user coefficient corresponding to a user ID of a user who has initiated the workflow. The exclusive control unit 110 also acquires, from the initiation method coefficient table 138, an initiation method coefficient corresponding to an initiation method of the workflow.

Further, the exclusive control unit 110 calculates the remaining time until a scheduled time of completion of the workflow by subtracting the current time from the scheduled time of completion. At this point, the exclusive control unit 110 may calculate the scheduled time of completion of the workflow based on preliminarily registered time needed for completion of each operation component. Alternatively, the exclusive control unit 110 may use completion time acquired from history information of workflows executed in the past (for example, the exclusive right acquisition history table 136) as the scheduled time of completion. The exclusive control unit 110 acquires, from the time coefficient table 139, a time coefficient corresponding to the calculated remaining time. Subsequently, the exclusive control unit 110 calculates the operational urgency using equation (1) above, and then calculates the execution priority using equation (2) above.

[Step S137] The exclusive control unit 110 stores, in the instance management table 134 and the exclusive information management table 135, information related to the provisionally determined exclusive section (i.e., information used in steps S133 to S136, including the provisionally determined exclusive section, the execution priority, the user coefficient, the initiation method coefficient, and the operational urgency).

Figure 47:
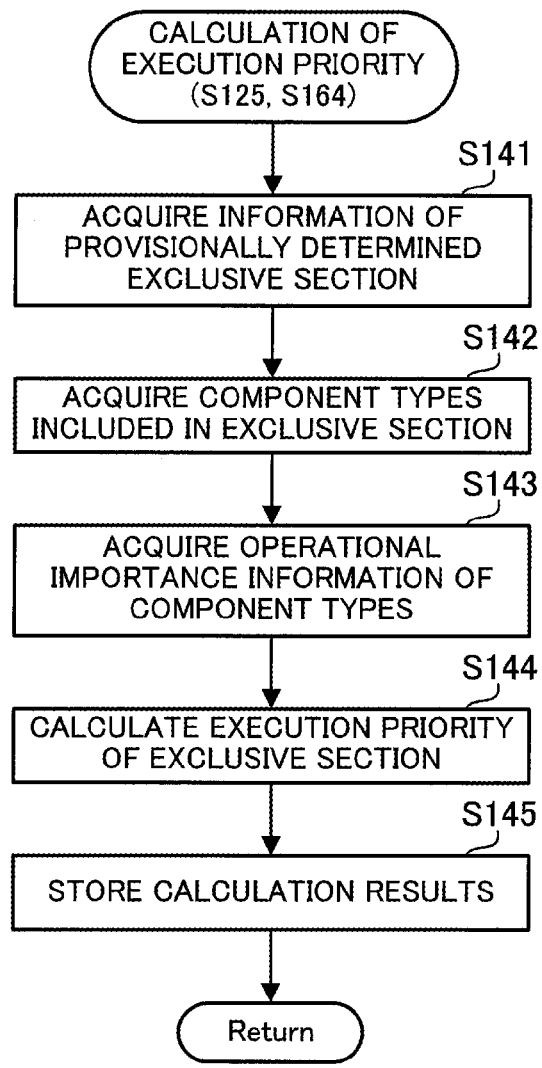
FIG. 47 is a flowchart illustrating an example of a process of calculating the execution priority of the exclusive section.

FIG. 47 is a flowchart illustrating an example of a process of calculating execution priority of an exclusive section. The process of FIG. 47 corresponds to each of step S125 of FIG. 45 and step S164 of FIG. 48 to be described later.

[Step S141] The exclusive control unit 110 acquires, from the instance management table 134 and the user coefficient table 137, information related to the provisionally determined exclusive section (such as a user coefficient, an initiation method coefficient, an exclusive section number, and scheduled time of completion).

[Step S142] The exclusive control unit 110 acquires, from the operation component definition table 132, component types included in an exclusive section corresponding to the exclusive section number.

[Step S143] The exclusive control unit 110 acquires, from the operation component definition table 132, information of operational importance for the exclusive section corresponding to the exclusive section number.

Note that the operation order of steps S142 and S143 may be reversed.

[Step S144] The exclusive control unit 110 calculates remaining time until the scheduled time of completion by subtracting the current time from the scheduled time of completion acquired in step S141, and then acquires a time coefficient corresponding to the calculated remaining time from the time coefficient table 139. The exclusive control unit 110 calculates the operational urgency using equation (1) above, and then calculates the execution priority using equation (2) above.

[Step S145] The exclusive control unit 110 stores the calculated operational urgency and execution priority in the exclusive information management table 135.

Figure 48:
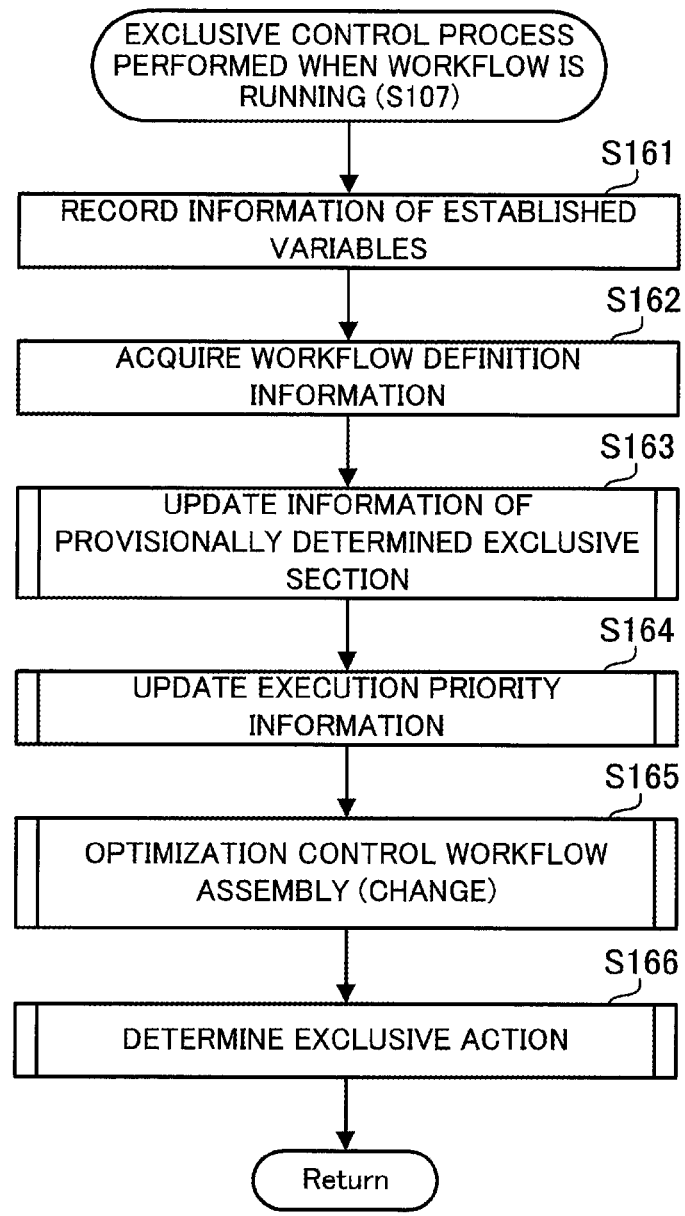
FIG. 48 is a flowchart illustrating an example of the exclusive control process performed when a workflow is running.

FIG. 48 is a flowchart illustrating an example of the exclusive control process performed when a workflow is running. The process of FIG. 48 corresponds to step S107 of FIG. 44.

[Step S161] The exclusive control unit 110 stores, in the variable management table 133, information of variables included in information notified by the workflow executing unit 120 (i.e., information of established variables) or variables whose values have been assigned in advance.

[Step S162] The exclusive control unit 110 acquires workflow definition information from the instance management table 134.

[Step S163] The exclusive control unit 110 updates information of the provisionally determined exclusive section. Details of the processing of step S163 are the same as in FIG. 46.

[Step S164] The exclusive control unit 110 updates the execution priority information. Details of the processing of step S164 are the same as in FIG. 47.

[Step S165] The exclusive control unit 110 executes an optimization control workflow assembling process (change). Details of the process are described in FIG. 51.

[Step S166] The exclusive control unit 110 determines an exclusive action. Details of the process are described in FIG. 49.

Figure 49:
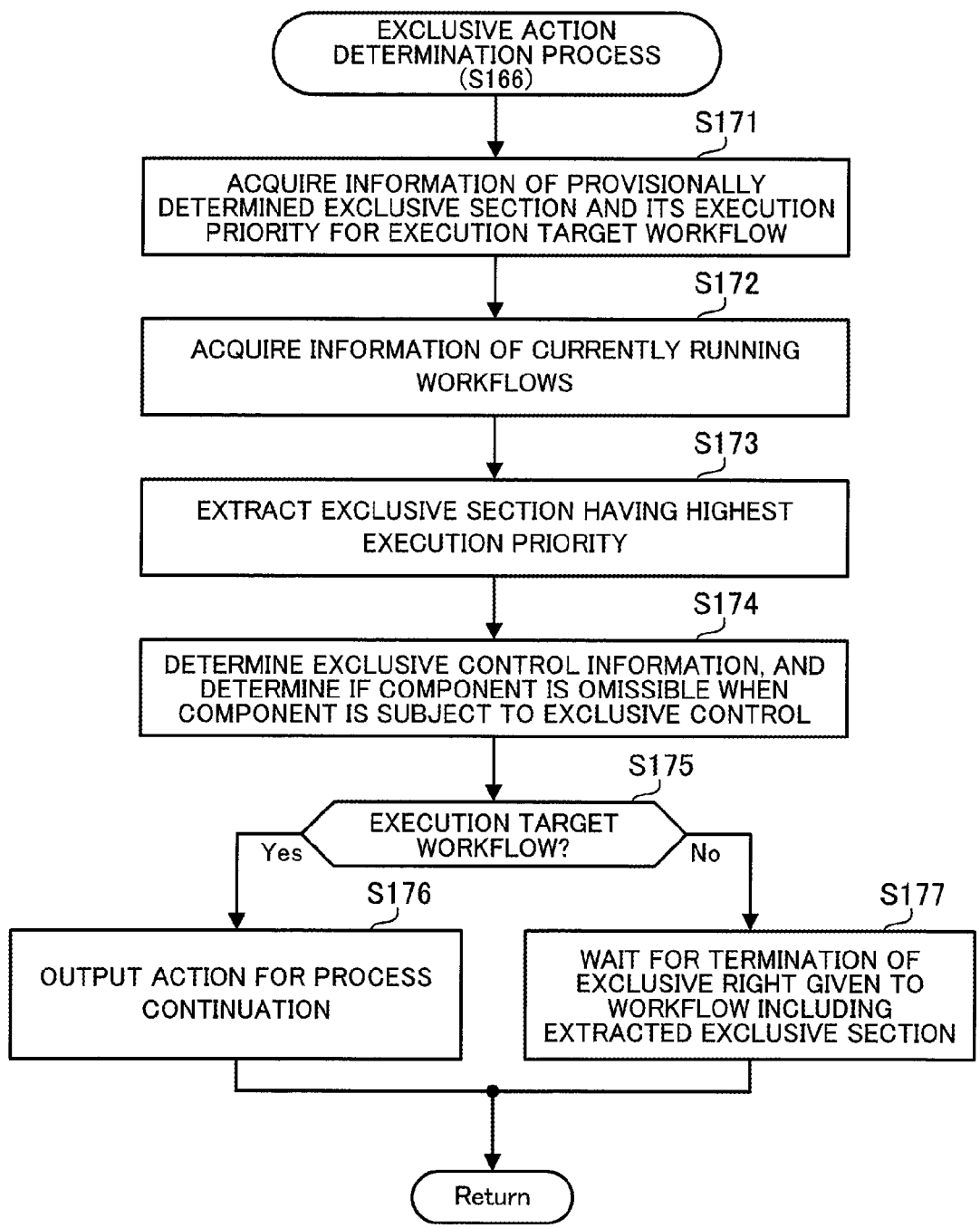
FIG. 49 is a flowchart illustrating an example of an exclusive action determination process.

FIG. 49 is a flowchart illustrating an example of an exclusive action determination process. The process of FIG. 49 corresponds to step S166 of FIG. 48.

[Step S171] With respect to the execution target workflow, the exclusive control unit 110 acquires information of the provisionally determined exclusive section and execution priority information. At this point, the exclusive control unit 110 acquires, from the instance management table 134, information related to the provisionally determined exclusive section of the execution target workflow (such as an exclusive section number). The exclusive control unit 110 acquires the execution priority from the exclusive information management table 135 using the exclusive section number as a key.

[Step S172] With respect to workflows currently running, the exclusive control unit 110 acquires execution status of the workflows, information of a currently executed exclusive section and corresponding execution priority information, and information of scheduled provisionally-determined exclusive sections and corresponding execution priority information. At this point, the exclusive control unit 110 loads the instance management table 134 to thereby acquire the execution status of the workflows.

As for the currently running workflows (except for the execution target workflow, the execution start of which is notified in step S101 of FIG. 44), the exclusive control unit 110 acquires the information of the currently executed exclusive section from the instance management table 134 and the exclusive information management table 135. Specifically, the exclusive control unit 110 first determines a currently targeted operation component (current processing point) in each of the workflows by referring to a corresponding entry under the column headed 'component number (currently being executed)' in the instance management table 134. Next, based on the instance management table 134 and the workflow management table 131, the exclusive control unit 110 determines which exclusive section the operation component (current processing point) is included in. The exclusive control unit 110 acquires the execution priority from the exclusive information management table 135 using an exclusive section number of the determined exclusive section as a key.

[Step S173] As for the currently running workflows (except for the execution target workflow, the execution start of which is notified in step S101 of FIG. 44), the exclusive control unit 110 acquires information of provisionally determined exclusive sections from the instance management table 134 and the exclusive information management table 135. Specifically, the exclusive control unit 110 first acquires, from the instance management table 134, information of exclusive sections other than exclusive sections to which the currently targeted operation components (current processing points) in the workflows belong. Next, the exclusive control unit 110 acquires corresponding execution priority from the exclusive information management table 135 using exclusive section numbers of the exclusive sections as keys. The exclusive control unit 110 extracts an exclusive section having the highest execution priority from all exclusive sections included in the execution target workflow and the workflows whose information is acquired in step S172.

[Step S174] With reference to the instance management table 134 and the exclusive information management table 135, the exclusive control unit 110 checks exclusive control information of an execution target operation component (i.e., an operation component, the execution start of which is notified in relation to the latest process of step S101 in FIG. 44).

If the execution target operation component is subject to exclusive control (that is, if the operation component is included in an exclusive section), the exclusive control unit 110 determines whether the execution of the operation component is omissible, based on a corresponding entry under the column headed 'omission flag' in the optimization control workflow management table 141. In addition, when the execution is omissible, the exclusive control unit 110 also determines which one of the consecutive execution condition and the opposite operation condition the omission of the operation component is based on.

[Step S175] If a workflow to which the exclusive section extracted in step S173 belongs is the execution target workflow, the execution start of which is notified in step S101 of FIG. 44, the process moves to step S176. On the other hand, if the workflow is not the execution target workflow, the process moves to step S177.

[Step S176] The exclusive control unit 110 outputs notification, called Action, indicting continuation of the operation of the execution target workflow to the workflow executing unit 120 in charge of the execution target workflow. With the Action, the exclusive control unit 110 instructs the workflow executing unit 120 to carry out a process in the following manner.

In the case where the execution target operation component is determined in step S174 to be not omissible, the exclusive control unit 110 instructs the workflow executing unit 120 to execute the operation component. On the other hand, in the case where the execution target operation component is determined to be omissible, the exclusive control unit 110 issues an instruction to the workflow executing unit 120 in the following manner.

In the case where two consecutive operation components including the execution target operation component and its foregoing or following operation component satisfy the consecutive execution condition, the exclusive control unit 110 instructs the workflow executing unit 120 to omit the execution according to the consecutive execution condition.

In the case where the omission is based on the opposite operation condition, the exclusive control unit 110 issues an instruction to the workflow executing unit 120 in the following manner. When two consecutive operation components including the execution target operation component and its foregoing operation component satisfy the opposite operation condition, the exclusive control unit 110 instructs the workflow executing unit 120 to omit the execution according to the opposite operation condition. When two consecutive operation components including the execution target operation component and its following operation component satisfy the opposite operation condition, the exclusive control unit 110 issues an instruction to the workflow executing unit 120 in the following manner.

When an optimization control workflow including the execution target operation component does not include the same operation component as the execution target operation component, which same operation component is included in a different workflow and appears after the execution target operation component within the optimization control workflow, the exclusive control unit 110 instructs the workflow executing unit 120 to omit the execution according to the opposite operation condition.

On the other hand, when an optimization control workflow including the execution target operation component includes such an operation component, the exclusive control unit 110 instructs the workflow executing unit 120 to put a corresponding workflow into an execution wait state. In this case, when the same operation component is executed, the exclusive control unit 110 instructs the workflow executing unit 120 to cancel the execution wait and also outputs the execution result.

Alternatively, in the case where two consecutive operation components including the execution target operation component and its foregoing or following operation component satisfy the opposite operation condition, the exclusive control unit 110 may uniformly instruct the workflow executing unit 120 to omit the execution according to the opposite operation condition.

The exclusive control unit 110 outputs an Action as described above, and also registers information according to the content of the instruction issued to the workflow executing unit 120 in an entry corresponding to the execution target operation component under the column headed 'omission flag' of the optimization control workflow management table 141.

[Step S177] The exclusive control unit 110 does not output an Action to the workflow executing unit 120 until an exclusive right (execution right) given to a workflow including the exclusive section extracted in step S173 is terminated, to thereby put the execution target workflow into a process wait state.

Note that, in steps S176 and S177, the exclusive control unit 110 newly registers or updates information in the exclusive right acquisition history table 136 as needed basis. For example, if an exclusive section acquires an exclusive right and the operation of the exclusive section is completed, the exclusive control unit 110 updates information corresponding to the exclusive section under the column headed 'completion time'. In addition, if an exclusive section including the execution target operation component is in a state waiting for exclusive control to be released, the exclusive control unit 110 updates information corresponding to the exclusive section under the column headed 'start-waiting time'.

Figure 50:
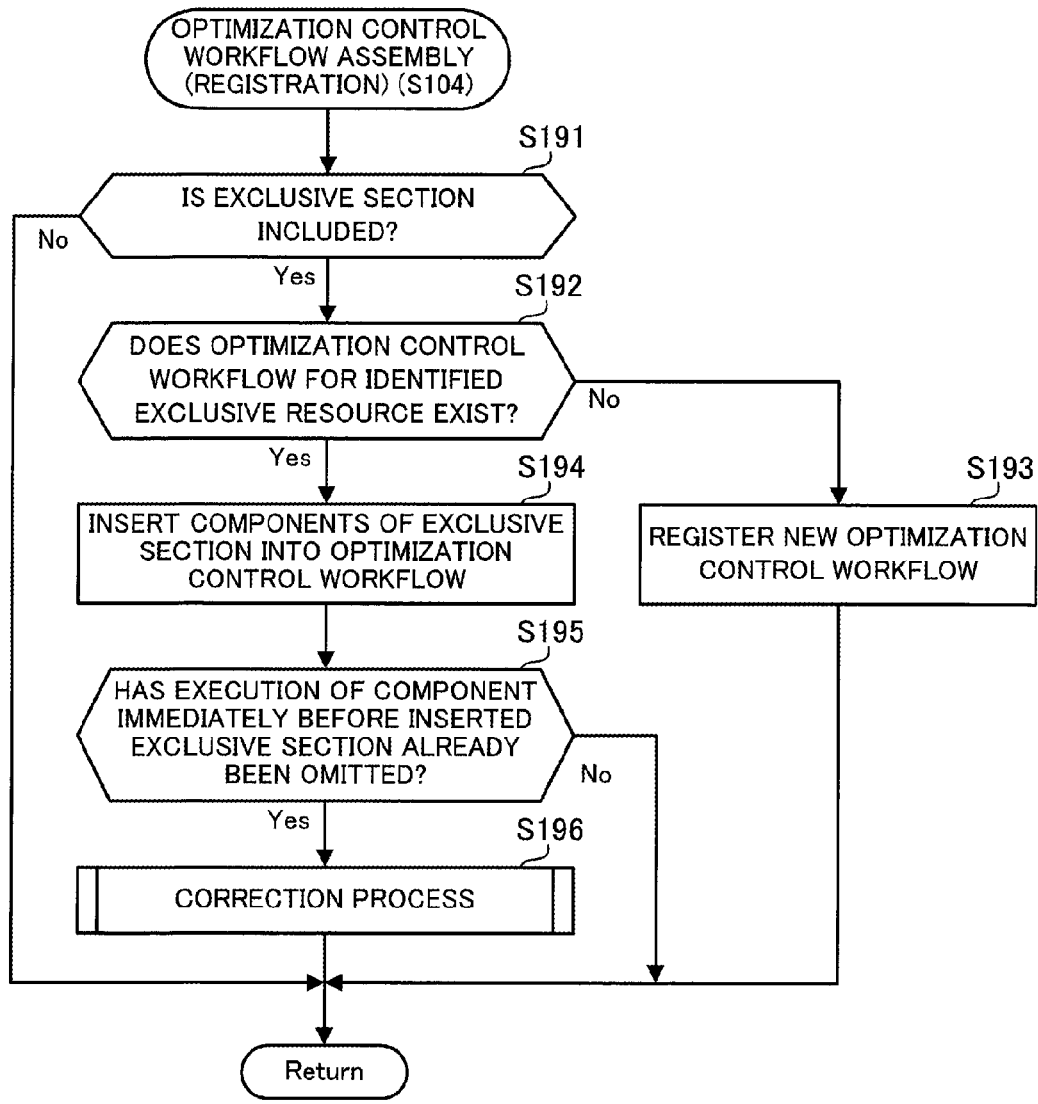
FIG. 50 is a flowchart illustrating an example of a process of optimization control workflow assembly (registration)

FIG. 50 is a flowchart illustrating an example of a process of optimization control workflow assembly (registration). The process of FIG. 50, corresponding to step S104 of FIG. 44, is performed when the exclusive control unit 110 receives the notification of the start of a workflow from the workflow executing unit 120.

[Step S191] The exclusive control unit 110 determines whether the execution target workflow includes an exclusive section. The execution target workflow is determined to include an exclusive section if an exclusive section is extracted in step S124 of FIG. 45 and then information of the exclusive section is registered in the instance management table 134 and the exclusive information management table 135. If an exclusive section is included, the process moves to step S192. If not, the process is ended.

[Step S192] The exclusive control unit 110 identifies an exclusive resource to be an operation target in the exclusive section of the execution target workflow. Then, the exclusive control unit 110 determines whether an optimization control workflow corresponding to the identified exclusive resource has been registered in the optimization control workflow management table 141. If the optimization control workflow has been registered, the process moves to step S194. If not, the process moves to step S193.

[Step S193] The exclusive control unit 110 newly registers, in the optimization control workflow management table 141, an instance of an optimization control workflow corresponding to the exclusive resource identified in step S192. In this instance, information of operation components of the exclusive section included in the execution target workflow is registered.

[Step S194] The exclusive control unit 110 updates the optimization control workflow management table 141 in such a manner that the operation components of the exclusive section included in the execution target workflow are inserted into an existing optimization control workflow corresponding to the exclusive resource identified in step S192. With this, the existing optimization control workflow is reassembled.

In this reassembling step, as for the exclusive section included in the execution target workflow and exclusive sections of individual workflows included in the existing optimization control workflow, the exclusive control unit 110 reads their execution priority from the exclusive information management table 135 and, then, compares the execution priority among these exclusive sections. Based on the comparison result, the exclusive control unit 110 inserts the exclusive section of the execution target workflow into the existing optimizationcontrol workflow in such a manner that the compared exclusive sections are arranged in descending order of the execution priority.

In addition, based on the optimization target component definition table 140, the exclusive control unit 110 identifies again, within the reassembled optimization control workflow, operation components whose execution is omissible. The exclusive control unit 110 updates entries under the column headed 'omission flag' in the optimization control workflow management table 141. Specifically, the exclusive control unit 110 updates entries under the column headed 'omission flag' corresponding to operation components whose execution omission propriety has been changed as well as omissible operation components with a change in their optimization condition (i.e., a change from the consecutive execution condition to the opposite operation condition and vice versa).

[Step S195] Based on the execution history database 151, the exclusive control unit 110 determines whether, in the reassembled optimization control workflow, the execution of an operation component immediately before the inserted exclusive section has already been omitted. If the execution has already been omitted, the process moves to step S196. If not, the process is ended.

[Step S196] The exclusive control unit 110 executes a correction process for the operation component whose execution has been omitted. Details of the process are described in FIG. 53.

Figure 51:
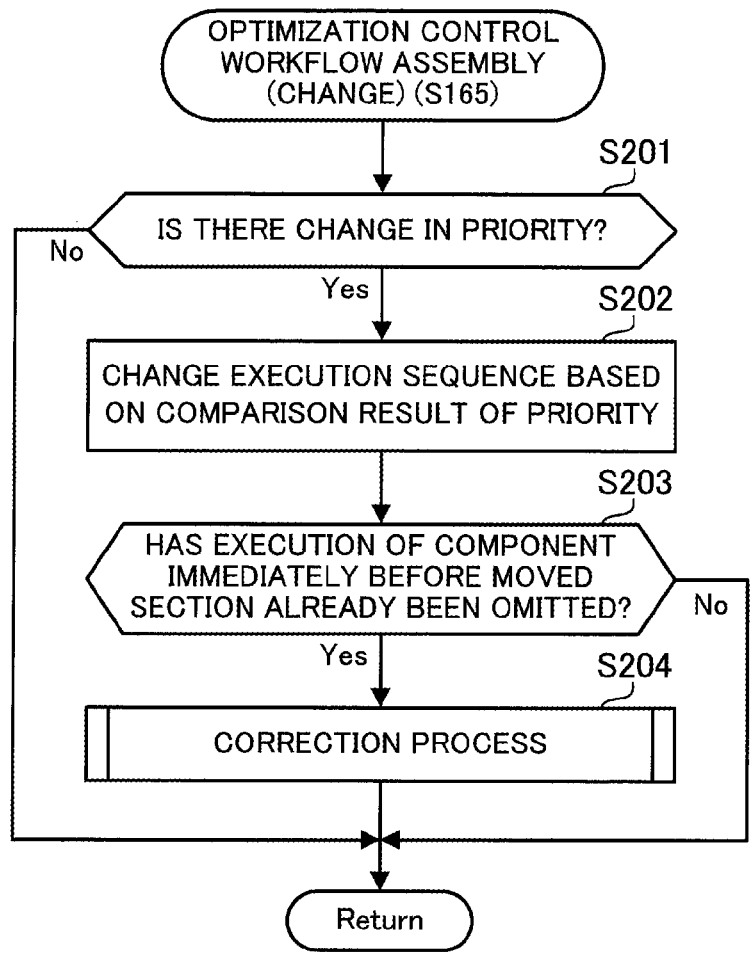
FIG. 51 is a flowchart illustrating an example of a process of optimization control workflow assembly (change)

FIG. 51 is a flowchart illustrating an example of a process of optimization control workflow assembly (change). The process of FIG. 51, corresponding to step S165 of FIG. 48, is performed when the exclusive control unit 110 receives the notification of the execution start of an operation component from the workflow executing unit 120.

[Step S201] As for workflow-based exclusive sections belonging to an optimization control workflow including the execution target operation component, the exclusive control unit 110 determines whether there is a change in the execution priority of at least one of the exclusive sections. If there is a change in the execution priority of at least one of the exclusive sections, the process moves to step S202. If there is no change in the execution priority, the process is ended.

[Step S202] The exclusive control unit 110 identifies, in the optimization control workflow management table 141, an optimization control workflow including the execution target operation component. Based on the exclusive information management table 135, the exclusive control unit 110 compares the execution priority of individual exclusive sections included in the identified optimization control workflow.

When the sequence of the exclusive sections needs to be changed as a result of the comparison, the exclusive control unit 110 reassembles the optimization control workflow and updates the optimization control workflow management table 141. In this reassembling step, the exclusive control unit 110 changes the sequence of the exclusive sections in the optimization control workflow in such a manner that the exclusive sections are arranged in descending order of the execution priority.

After reassembling the optimization control workflow, the exclusive control unit 110 identifies again operation components whose execution is omissible within the reassembled optimization control workflow, based on the optimization target component definition table 140. The exclusive control unit 110 updates entries under the column headed 'omission flag' in the optimization control workflow management table 141. Specifically, the exclusive control unit 110 updates entries under the column headed 'omission flag' corresponding to operation components whose execution omission propriety has been changed as well as omissible operation components with a change in their optimization condition (i.e., a change from the consecutive execution condition to the opposite operation condition and vice versa).

[Step S203] Based on the execution history database 151, the exclusive control unit 110 determines whether, in the optimization control workflow reassembled in step S202, the execution of an operation component immediately before each exclusive section whose position in the sequence has been changed has already been omitted. If the execution has already been omitted, the process moves to step S204. If not, the process is ended.

[Step S204] The exclusive control unit 110 executes a correction process for the operation component whose execution has been omitted. Details of the process are described in FIG. 53.

Figure 52:
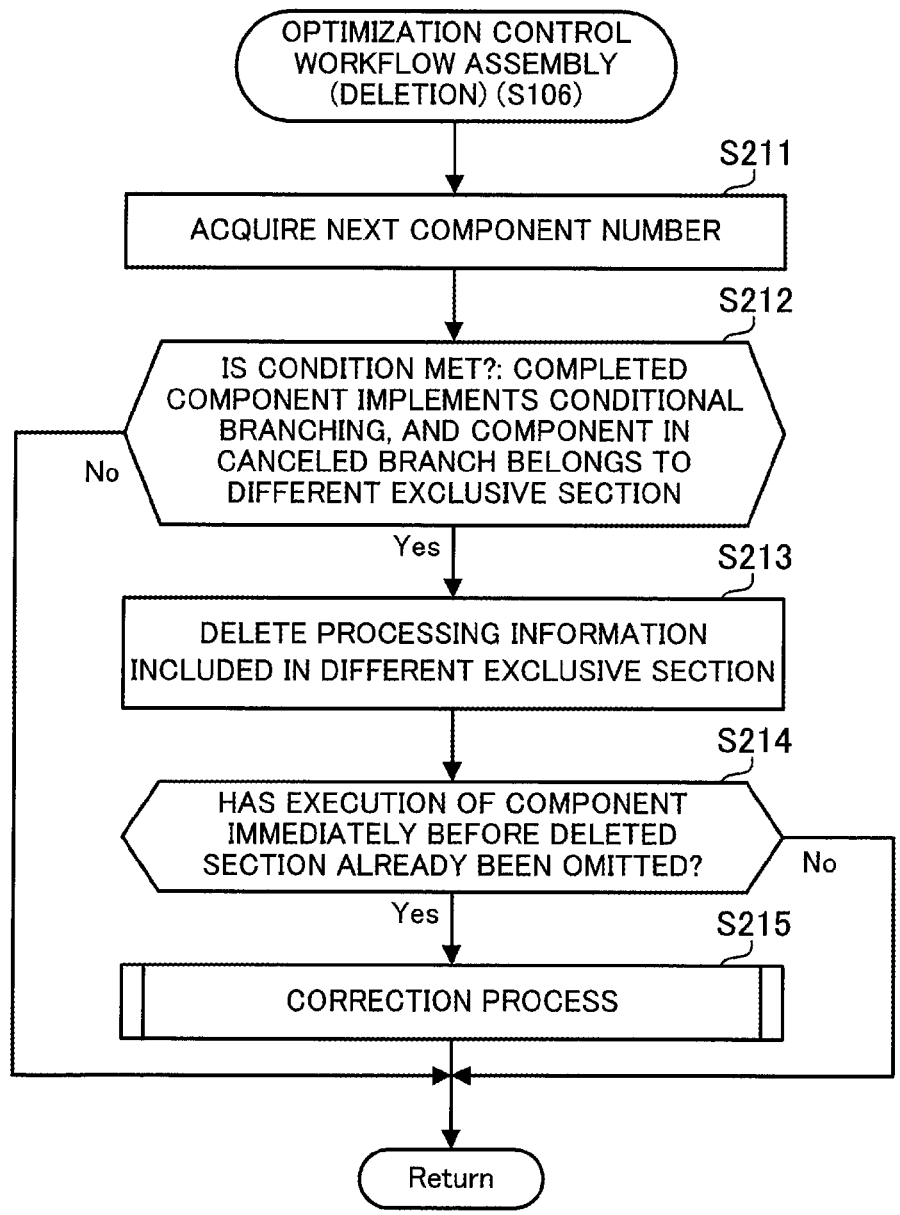
FIG. 52 is a flowchart illustrating an example of a process of optimization control workflow assembly (deletion)

FIG. 52 is a flowchart illustrating an example of a process of optimization control workflow assembly (deletion). The process of FIG. 52, corresponding to step S106 of FIG. 44, is performed when the exclusive control unit 110 receives the notification of the execution completion of an operation component from the workflow executing unit 120.

[Step S211] The exclusive control unit 110 acquires the component number of an operation component to be executed following the operation component whose execution completion has been notified (hereinafter, referred to as the 'completed operation component') by referring to an entry corresponding to the completed operation component under the column headed 'next component number' in the workflow management table 131.

[Step S212] The exclusive control unit 110 determines whether the following condition is met: a plurality of component numbers are acquired in step S211 (that is, the completed operation component is an operation component for implementing conditional branching), and one of operation components included in a branch determined not to be taken according to the execution result of the conditional branching belongs to an exclusive section different from the exclusive section including the completed operation component. If this condition is satisfied, the process moves to step S213. If not, the process is ended.

[Step S213] The exclusive control unit 110 deletes, from the optimization control workflow management table 141, processing information included in the different exclusive section including the operation components of the branch determined not to be taken. With this, the optimization control workflow having included the deletion target exclusive section is reassembled.

In addition, based on the optimization target component definition table 140, the exclusive control unit 110 identifies again, within the reassembled optimization control workflow, operation components whose execution is omissible.

The exclusive control unit 110 updates entries under the column headed 'omission flag' in the optimization control workflow management table 141. Specifically, the exclusive control unit 110 updates entries under the column headed 'omission flag' corresponding to operation components whose execution omission propriety has been changed as well as omissible operation components with a change in their optimization condition (i.e., a change from the consecutive execution condition to the opposite operation condition and vice versa).

[Step S214] Based on the execution history database 151, the exclusive control unit 110 determines whether, in the optimization control workflow from which the processing information has been deleted, the execution of an operation component immediately before the deleted exclusive section has already been omitted. If the execution has already been omitted, the process moves to step S215. If not, the process moves to step S108.

[Step S215] The exclusive control unit 110 executes a correction process for the operation component whose execution has been omitted. Details of the process are described in FIG. 53.

Figure 53:
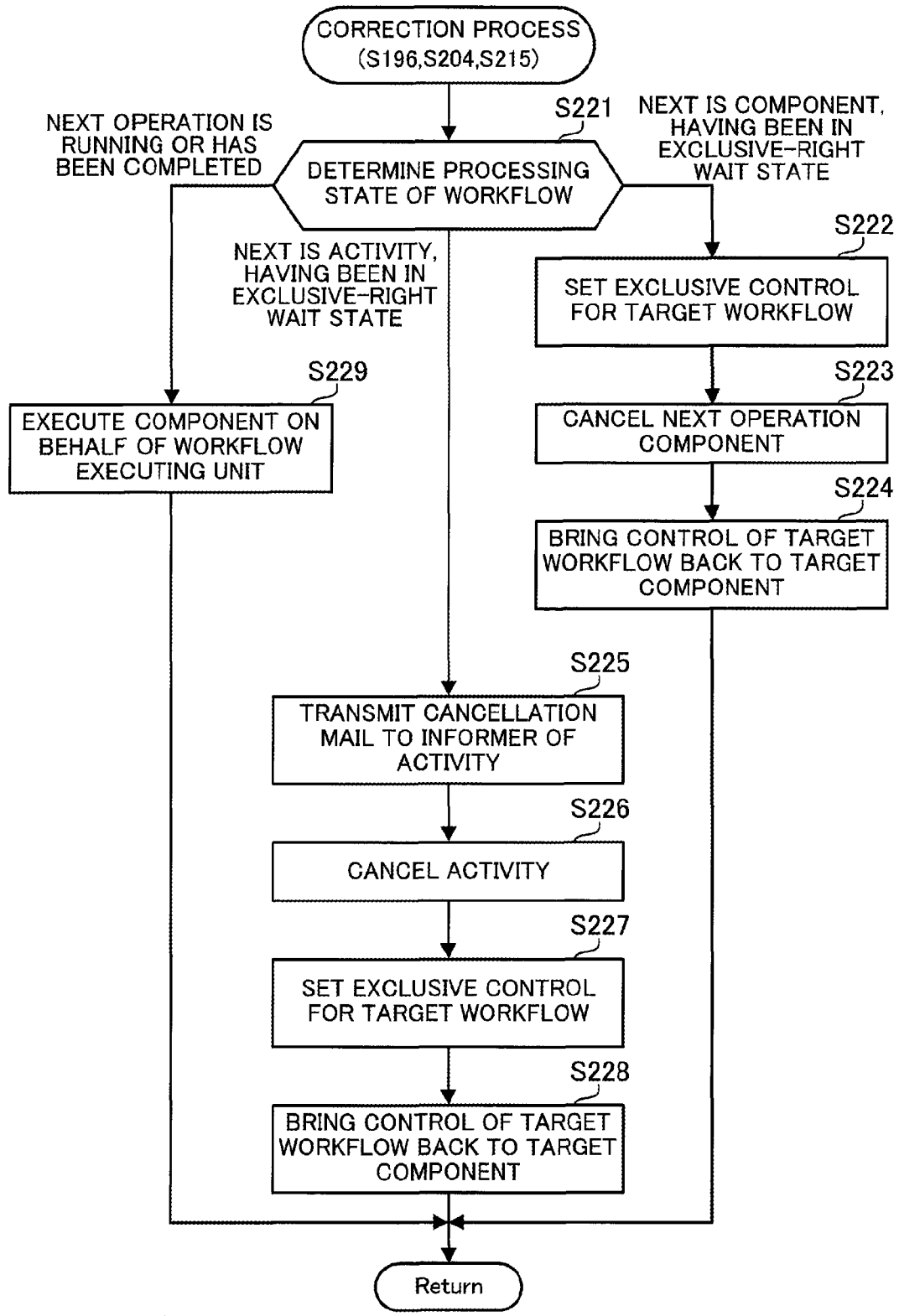
FIG. 53 is a flow chart illustrating an example of a correction process.

FIG. 53 is a flow chart illustrating an example of a correction process. The process of FIG. 53 corresponds to each of step S196 of FIG. 50, step S204 of FIG. 51, and step S215 of FIG. 52. Note that a workflow including a correction target operation component (that is, an operation component whose execution has been omitted) is referred to as the 'correction target workflow').

[Step S221] The exclusive control unit 110 determines the processing state of the correction target workflow. In the case where an operation following the correction target operation component is to be implemented by an operation component and this operation component has been in a state waiting for acquisition of an exclusive right, the process moves to step S222. If the operation following the correction target operation component is to be implemented by an activity and the activity has been in a state waiting for acquisition of an exclusive right, the process moves to step S225. If the operation following the correction target operation component is running or has already been completed, the process moves to step S229.

[Step S222] The exclusive control unit 110 sets exclusive control for the correction target workflow.

[Step S223] The exclusive control unit 110 instructs the workflow executing unit 120 in charge of the correction target workflow to cancel the operation component following the correction target operation component.

Note that the processing order of steps S222 and S223 may be reversed.

[Step S224] The exclusive control unit 110 instructs the workflow executing unit 120 to bring the control of the workflow back to the correction target operation component. Upon receiving the instruction, the workflow executing unit 120 newly executes the once omitted operation component.

[Step S225] The exclusive control unit 110 notifies an informer in the activity following the correction target operation component (that is, a person performing an input operation related to, for example, an approval action during the execution of the activity) of cancellation of the execution of the activity. For example, the informer is notified of the cancellation by email.

[Step S226] The exclusive control unit 110 instructs the workflow executing unit 120 in charge of the correction target workflow to cancel the activity following the correction target operation component.

[Step S227] The exclusive control unit 110 sets exclusive control for the correction target workflow.

Note that the processing order of steps S225, S226, and S227 may be changed. However, steps S225 and S226 are preferably executed with a time interval therebetween as short as possible.

[Step S228] The exclusive control unit 110 instructs the workflow executing unit 120 to bring the control of the workflow back to the correction target operation component. Upon receiving the instruction, the workflow executing unit 120 newly executes the once omitted operation component.

[Step S229] Because, in the correction target workflow, at least the operation following the correction target operation component has already been executed, the exclusive control unit 110 is not able to cause the workflow executing unit 120 in charge of the correction target workflow to execute the correction target operation component. Therefore, the exclusive control unit 110 executes the correction target operation component on behalf of the workflow executing unit 120, and then sets the execution result in the execution history database 151.

Examples of different workflow configurations are described next, along with a process of building exclusive sections of each workflow into corresponding optimization control workflows.

Figure 54:
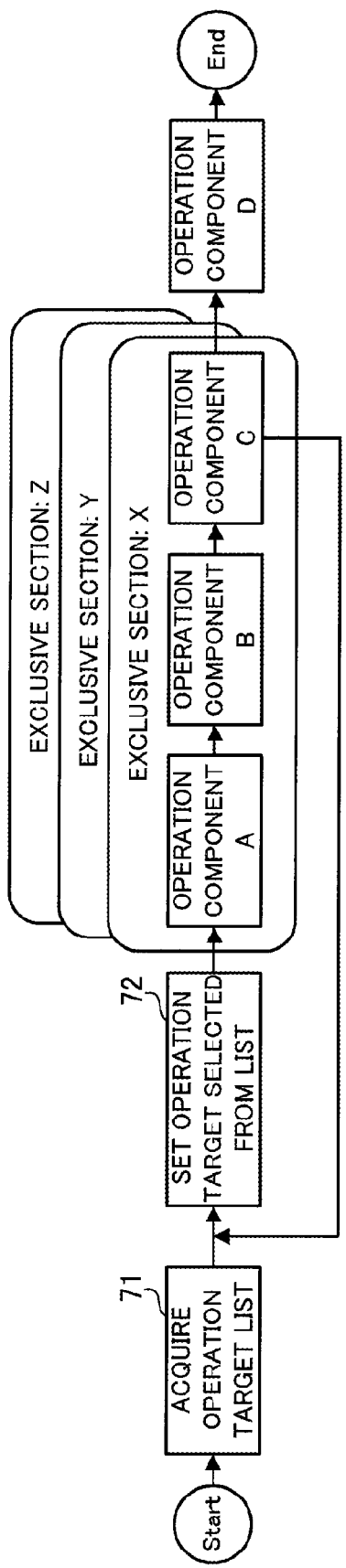
FIG. 54 illustrates an example of a workflow in which loops of different exclusive sections may occur.

FIG. 54 illustrates an example of a workflow in which loops of different exclusive sections may occur. In the workflow of FIG. 54, an operation target list is acquired by an operation component 71, and an operation target is set (selected) from the list by an operation component 72. As a result of the setting made by the operation component 72, operation components corresponding to the set operation target are dynamically set and then executed. That is, the operation component 72 is followed by an exclusive section corresponding to the set operation target. For example, in the case where exclusive resource X is set as the operation target, the operation component 72 is followed by [exclusive section: X].

The last operation component in each exclusive section implements conditional branching, after which one branch leads to operation component D and another branch leads to the operation component 72. That is, a processing loop occurs when the process moves to the operation component 72 after the conditional branching, and the process leaves the loop when having moved to operation component D.

With such a workflow, it is not possible to predict that operation components corresponding to which one of the exclusive resources will be executed and how many times the execution of these operation components will be repeated. In view of this, once the operation component 72 is executed and then the variable indicating an operation target is set, the exclusive control unit 110 builds operation components included in the following exclusive section into an optimization control workflow corresponding to the operation target. That is, each time a loop is executed, an optimization control workflow corresponding to the set operation target is reassembled. This enables operation components in a loop section to be targets for execution omission.

Figure 55:
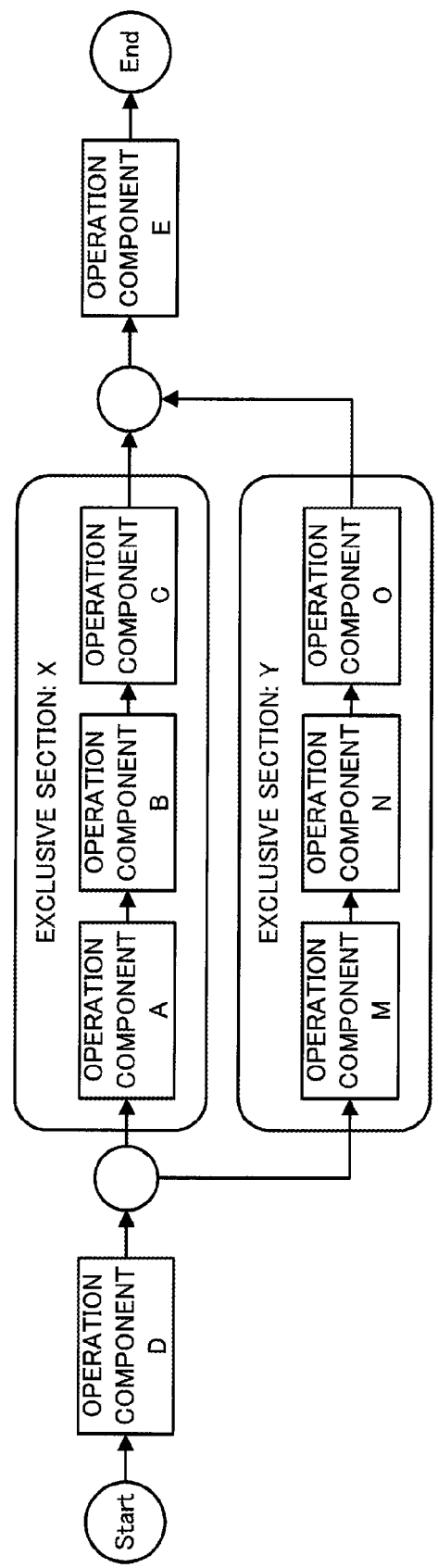
FIG. 55 illustrates an example of a workflow including parallel branches.

FIG. 55 illustrates an example of a workflow including parallel branches. In the workflow of FIG. 55, [exclusive section: X] and [exclusive section: Y] are executed in parallel after the execution of operation component D. In this case, the exclusive control unit 110 builds operation components included in [exclusive section: X] into an optimization control workflow corresponding to exclusive resource X, and also builds operation components included in [exclusive section: Y] into an optimization control workflow corresponding to exclusive resource Y.

Thus, in the case where individual exclusive sections for operating different exclusive resources are executed in parallel, operation components are registered in an optimization control workflow with respect to each exclusive resource. This enables all the operation components of the exclusive sections to be targets for execution omission.

Note that when an exclusive section contains a parallel execution section, the exclusive control unit 110 simply registers, in a corresponding optimization control workflow, information of operation components included in the excusive section, which information is defined in the workflow management table 131.

FIG. 22 above illustrates a workflow in which an operation component for implementing conditional branching is located outside exclusive sections, however, conditional branching may occur inside an exclusive section. In this case, the exclusive control unit 110 registers, in a corresponding optimization control workflow, information of all the operation components of the exclusive section including the conditional branching. For example, in the case where all operation components A to E and M to O of FIG. 22 are included in the same [exclusive section: X], information of all the operation components is registered in an optimization control workflow corresponding to exclusive resource X. In the case where operation components D, A, and M of FIG. 22 are included in the same [exclusive section: X], information of operation components D, A, and M is registered in an optimization control workflow corresponding to exclusive resource X. In the case where operation components D, and A to C of FIG. 22 are included in the same [exclusive section: X], information of operation components D, and A to C is registered in an optimization control workflow corresponding to exclusive resource X. Such processing enables operation components included in branches after conditional branching to be targets for execution omission.

Note that the processing functions of the apparatuses (such as the workflow control apparatus 1 and the operation automation server 100) described in each of the embodiments above may be achieved by a computer. In this case, a program is provided which describes processing contents of the functions to be implemented by each of the apparatuses. By executing the program on the computer, the above-described processing functions are achieved on the computer. The program in which the processing contents are described may be recorded on computer-readable recording media. Such computer-readable recording media include a magnetic storage device, an optical disk, a magneto-optical recording medium, and a semiconductor memory. Examples of the magnetic storage device are a hard disk drive (HDD), a flexible disk (FD), and a magnetic tape. Examples of the optical disk are a digital versatile disc (DVD), a DVD-RAM, a compact disc-read only memory (CD-ROM), a CD-recordable (CD-R) and a CD-rewritable (CD-RW). An example of the magneto-optical recording medium is a magneto-optical disk (MO).

To distribute the program, for example, portable recording media, such as DVDs and CD-ROMs, on which the program is recorded are sold. In addition, the program may be stored in a storage device of a server computer and then transferred from the server computer to another computer via a network.

The computer for executing the program stores, for example, in its own storage device, the program which is originally recorded on a portable recording medium or transferred from the server computer. Subsequently, the computer reads the program from its own storage device and performs processing according to the program. Note that the computer is able to read the program directly from the portable recording medium and perform processing according to the program. In addition, the computer is able to sequentially perform processing according to a received program each time such a program is transferred from the server computer connected via the network.

According to one aspect, it is possible to identify omissible operations in a plurality of workflows.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing therein a computer program that causes a computer to perform a procedure comprising:
   identifying resources which are respectively used upon execution of tasks included in a plurality of workflows, based on workflow definition information that defines content of each of the tasks included in the plurality of workflows;
   identifying, among the tasks included in the plurality of workflows, tasks that operate on a same exclusive resource, based on a result of the identifying of resources;
   determining an execution sequence of the identified tasks, based on the content of each of the identified tasks, the execution sequence including exclusive control on the exclusive resource to be operated by the identified tasks;
   identifying, among the identified tasks, one or more first tasks whose execution is omissible based on the content of each of the identified tasks and the execution sequence; and
   executing one or more second tasks and skipping execution of each of the one or more first tasks, the one or more second tasks being other than the one or more first tasks among the tasks included in the plurality of workflows.

2. The computer-readable storage medium according to claim 1, wherein the procedure further includes:
   storing, in a storage apparatus, a processing result generated for each of the one or more first tasks whose execution has been skipped.

3. The computer-readable storage medium according to claim 2, wherein:
   the storing includes storing a processing result predetermined with respect to the content of each task as the processing result of each of the one or more first tasks.

4. The computer-readable storage medium according to claim 2, wherein:
   the storing includes storing, when a task whose content is the same as the content of one of the one or more first tasks has previously been executed, a processing result of the previously executed task as the processing result of the one of the one or more first tasks.

5. The computer-readable storage medium according to claim 2, wherein:
   when need of a processing-result editing process is defined for each of the one or more first tasks whose execution has been skipped, the processing-result editing process is performed on the processing result generated for the one or more first tasks.

6. The computer-readable storage medium according to claim 2, wherein the procedure further includes:
   re-determining the execution sequence of the identified tasks according to execution status of each of the plurality of workflows,
   re-identifying one or more first tasks whose execution is omissible based on the re-determined execution sequence, and
   executing one of the re-identified one or more first tasks whose execution has been skipped, when the execution of the one of the re-identified one or more first tasks becomes no longer omissible after the re-identifying.

7. The computer-readable storage medium according to claim 1, wherein:
   the procedure further includes calculating execution priority scores for individual divided sections formed by dividing, with respect to each of the plurality of workflows, a section in which the identified tasks are executed; and
   the determining includes determining an execution sequence of the divided sections based on the execution priority scores.

8. The computer-readable storage medium according to claim 7, wherein the procedure further includes:
   re-determining, when there is a change in the execution priority scores, the execution sequence of the divided sections, based on the changed execution priority scores, and
   re-identifying one or more first tasks whose execution is omissible based on the re-determined execution sequence.

9. The computer-readable storage medium according to claim 1, wherein the procedure further includes:
   re-identifying, when a conditional branching task is included in the plurality of workflows and then a task using the identical resource is included in a non-selected branch immediately following the conditional branching task after the conditional branching task is executed, one or more first tasks whose execution is omissible after removing tasks included in the non-selected branch from the identified tasks.

10. The computer-readable storage medium according to claim 1, wherein:
    the identifying of one or more first tasks includes identifying, among the identified tasks, two consecutive tasks for implementing processes opposite to each other on the identical resource as the one or more first tasks.

11. The computer-readable storage medium according to claim 1, wherein:
    the identifying of one or more first tasks includes extracting, from the identified tasks, two consecutive tasks for individually implementing a same process on the identical resource and identifying one of the consecutive tasks as the one or more first tasks.

12. A workflow control apparatus comprising:
    a processor configured to perform a procedure including:
       identifying resources which are respectively used upon execution of tasks included in a plurality of workflows, based on workflow definition information that defines content of each of the tasks included in the plurality of workflows;

identifying, among the tasks included in the plurality of workflows, tasks that operate on a same exclusive resource, based on a result of the identifying of resources;

determining an execution sequence of the identified tasks, based on the content of each of the identified tasks, the execution sequence including exclusive control on the exclusive resource to be operated by the identified tasks;

identifying, among the identified tasks, one or more first tasks whose execution is omissible based on the content of each of the identified tasks and the execution sequence; and executing one or more second tasks and skipping execution of each of the one or more first tasks, the one or more second tasks being other than the one or more first tasks among the tasks included in the plurality of workflows.

13. The workflow control apparatus according to claim 12, wherein the procedure further includes:

storing, in a storage apparatus, a processing result generated for each of the one or more first tasks whose execution has been skipped.

14. The workflow control apparatus according to claim 13, wherein:

the storing includes storing a processing result predetermined with respect to the content of each task as the processing result of each of the one or more first tasks.

15. The workflow control apparatus according to claim 13, wherein:

the storing includes storing, when a task whose content is the same as the content of one of the one or more first tasks has previously been executed, a processing result of the previously executed task as the processing result of the one of the one or more first tasks.

16. The workflow control apparatus according to claim 12, wherein:

the procedure further includes calculating execution priority scores for individual divided sections formed by dividing, with respect to each of the plurality of workflows, a section in which the identified tasks are executed; and the determining includes determining an execution sequence of the divided sections based on the execution priority scores.

17. The workflow control apparatus according to claim 12, wherein:

the identifying of one or more first tasks includes identifying, among the identified tasks, two consecutive tasks for implementing processes opposite to each other on the identical resource as the one or more first tasks.

18. A workflow control method comprising:

identifying, by a computer, resources which are respectively used upon execution of tasks included in a plurality of workflows, based on workflow definition information that defines content of each of the tasks included in the plurality of workflows;

identifying, by the computer, tasks that operate on a same exclusive resource, among the tasks included in the plurality of workflows, based on a result of the identifying of resources;

determining, by the computer, an execution sequence of the identified tasks, based on the content of each of the identified tasks, the execution sequence including exclusive control on the exclusive resource to be operated by the identified tasks;

identifying, by the computer, one or more first tasks whose execution is omissible among the identified tasks based on the content of each of the identified tasks and the execution sequence, and executing, by the computer, one or more second tasks and skipping, by the computer, execution of each of the one or more first tasks, the one or more second tasks being other than the one or more first tasks among the tasks included in the plurality of workflows.

* * * * *